(12) United States Patent
Barry

(10) Patent No.: US 12,477,973 B2
(45) Date of Patent: Nov. 25, 2025

(54) AGRICULTURAL HIGH SPEED ROW UNIT

(71) Applicant: Ag Leader Technology, Ames, LA (US)

(72) Inventor: Alan Barry, Nevada, IA (US)

(73) Assignee: Ag Leader Technology, Ames, IA (US)

( * ) Notice: Subject to any disclaimer, the term of this patent is extended or adjusted under 35 U.S.C. 154(b) by 1012 days.

(21) Appl. No.: 17/526,947

(22) Filed: Nov. 15, 2021

(65) Prior Publication Data

US 2022/0151138 A1    May 19, 2022

Related U.S. Application Data

(60) Provisional application No. 63/212,909, filed on Jun. 21, 2021, provisional application No. 63/113,566, filed on Nov. 13, 2020.

(51) Int. Cl.
*A01C 7/20* (2006.01)
*A01C 5/06* (2006.01)

(52) U.S. Cl.
CPC .............. *A01C 7/205* (2013.01); *A01C 5/064* (2013.01); *A01C 5/068* (2013.01); *A01C 7/203* (2013.01)

(58) Field of Classification Search
CPC ......... A01C 7/201; A01C 7/203; A01C 7/205; A01C 7/006; A01C 5/062; A01C 5/064; A01C 5/068
See application file for complete search history.

(56) References Cited

U.S. PATENT DOCUMENTS

| | | | |
|---|---|---|---|
| 54,633 A | 5/1866 | Wilkinson | |
| 605,348 A | 6/1898 | Schultz | |
| 1,178,765 A | 4/1916 | Waterman | |
| 1,252,923 A | 1/1918 | Moench | |
| 1,678,643 A | 7/1928 | Kassebeer | |
| 1,731,356 A * | 10/1929 | Smith | A01B 35/18 |
| | | | 172/182 |
| 2,357,760 A | 9/1944 | Peacock | |

(Continued)

FOREIGN PATENT DOCUMENTS

| | | | | |
|---|---|---|---|---|
| AU | 2006203367 A1 | 2/2007 | | |
| AU | 2010201330 A1 * | 3/2011 | ............. | A01C 7/203 |

(Continued)

OTHER PUBLICATIONS

Farm Equipment—ZML.

(Continued)

*Primary Examiner* — Alicia Torres
(74) *Attorney, Agent, or Firm* — DENTONS DAVIS BROWN PC; Matthew Warner-Blankenship

(57) ABSTRACT

An agricultural row unit having a coulter assembly comprising a pair of gauge wheels and a coulter between the pair of gauge wheels, wherein the coulter is configured to penetrate soil and cut debris. The row unit also having a soil engaging assembly comprising a sweep and a seed tube, wherein the sweep is configured to open a seed channel and the seed tube is configured to deposit seeds into the seed channel. The row unit also including a closing assembly configured to replace soil displaced by the coulter and sweep. The row unit configured for independent and optionally automatic variable depth control of the seed channel.

13 Claims, 45 Drawing Sheets

(56) References Cited

U.S. PATENT DOCUMENTS

| | | | | |
|---|---|---|---|---|
| 2,525,435 | A | 10/1950 | White | |
| 3,233,523 | A | 2/1966 | Passaggio | |
| 3,718,191 | A * | 2/1973 | Williams | A01C 5/062 172/603 |
| 3,749,035 | A | 7/1973 | Cayton | |
| 3,797,418 | A * | 3/1974 | Bridger, Jr. | A01C 7/006 111/140 |
| 3,844,357 | A | 10/1974 | Ellinger | |
| 4,167,910 | A | 9/1979 | Pretzer | |
| 4,193,458 | A | 3/1980 | Long | |
| 4,209,109 | A | 6/1980 | Curl | |
| 4,329,911 | A | 5/1982 | Schwerin | |
| 4,359,104 | A | 11/1982 | Haapala | |
| 4,417,530 | A | 11/1983 | Kopecky | |
| 4,596,200 | A | 6/1986 | Gafford | |
| 4,646,663 | A * | 3/1987 | Nikkel | A01C 7/06 111/73 |
| 4,655,296 | A | 4/1987 | Bourgault | |
| 4,700,785 | A | 10/1987 | Bartusek | |
| 4,796,550 | A | 1/1989 | Van Natta | |
| 4,865,132 | A | 9/1989 | Moore | |
| 4,878,443 | A | 11/1989 | Gardner | |
| 4,913,070 | A | 4/1990 | Morrison | |
| 4,949,656 | A | 8/1990 | Lyle | |
| 4,986,782 | A | 1/1991 | Severtson | |
| 5,065,681 | A | 11/1991 | Hadley | |
| 5,069,779 | A | 12/1991 | Brown | |
| 5,074,227 | A | 12/1991 | Schwitters | |
| 5,103,924 | A | 4/1992 | Walker | |
| 5,163,518 | A | 11/1992 | Foley | |
| 5,170,909 | A | 12/1992 | Lundie | |
| 5,234,060 | A | 8/1993 | Carter | |
| 5,277,257 | A | 1/1994 | Thompson | |
| 5,366,024 | A | 11/1994 | Payne | |
| 5,427,182 | A | 6/1995 | Winter | |
| 5,479,992 | A | 1/1996 | Bassett | |
| 5,497,837 | A | 3/1996 | Kehrney | |
| 5,499,683 | A | 3/1996 | Bassett | |
| 5,529,128 | A * | 6/1996 | Peterson | A01B 39/04 172/624.5 |
| 5,709,271 | A | 1/1998 | Bassett | |
| 5,829,535 | A | 11/1998 | Line | |
| 5,842,428 | A | 12/1998 | Stufflebeam et al. | |
| 5,862,764 | A | 1/1999 | Umemoto | |
| 5,936,234 | A | 8/1999 | Thomas | |
| 5,961,573 | A | 10/1999 | Hale | |
| 6,003,455 | A | 12/1999 | Flamme | |
| 6,013,020 | A | 1/2000 | Meloul | |
| 6,068,063 | A | 5/2000 | Mayerle | |
| 6,068,064 | A | 5/2000 | Bettin | |
| 6,091,997 | A | 7/2000 | Flamme | |
| 6,325,156 | B1 | 12/2001 | Barry | |
| 6,378,619 | B2 | 4/2002 | Mayerle | |
| 6,389,999 | B1 | 5/2002 | Duello | |
| 6,460,623 | B1 | 10/2002 | Knussman | |
| 6,681,706 | B2 | 1/2004 | Sauder et al. | |
| 6,701,857 | B1 | 3/2004 | Jensen | |
| 6,748,885 | B2 | 6/2004 | Sauder et al. | |
| 6,827,029 | B1 | 12/2004 | Wendte | |
| 6,863,006 | B2 | 3/2005 | Sandoval | |
| 7,131,384 | B2 | 11/2006 | Kester | |
| 7,263,937 | B2 | 9/2007 | Frasier | |
| 7,334,532 | B2 | 2/2008 | Sauder et al. | |
| 7,395,767 | B2 | 7/2008 | Sulman | |
| 7,395,769 | B2 | 7/2008 | Jensen | |
| 7,478,603 | B2 | 1/2009 | Riewerts | |
| 7,540,246 | B2 | 6/2009 | Friesen | |
| 7,673,570 | B1 | 3/2010 | Bassett | |
| 7,694,638 | B1 | 4/2010 | Riewerts | |
| 7,699,009 | B2 | 4/2010 | Sauder et al. | |
| 7,717,048 | B2 | 5/2010 | Peterson, Jr. et al. | |
| 7,870,826 | B2 | 1/2011 | Bourgault | |
| 7,938,074 | B2 | 5/2011 | Liu | |
| 7,980,186 | B2 | 7/2011 | Henry | |
| 8,020,657 | B2 | 9/2011 | Allard | |
| 8,056,465 | B2 | 11/2011 | Carlz | |
| 8,078,367 | B2 | 12/2011 | Sauder | |
| 8,275,525 | B2 | 9/2012 | Kowalchuk | |
| 8,275,627 | B2 * | 9/2012 | Henning | A01C 21/002 111/164 |
| 8,286,566 | B2 | 10/2012 | Schilling | |
| 8,342,258 | B2 | 1/2013 | Ryder | |
| 8,346,442 | B2 | 1/2013 | Ryder | |
| 8,371,239 | B2 | 2/2013 | Rans et al. | |
| 8,418,636 | B2 | 4/2013 | Liu et al. | |
| 8,430,179 | B2 | 4/2013 | Van Buskirk | |
| 8,448,587 | B2 | 5/2013 | Kowalchuk | |
| 8,448,717 | B2 | 5/2013 | Adams et al. | |
| 8,451,449 | B2 | 5/2013 | Holland | |
| 8,479,671 | B2 | 7/2013 | Shoup | |
| 8,522,889 | B2 | 9/2013 | Adams et al. | |
| 8,544,397 | B2 | 10/2013 | Bassett | |
| 8,544,398 | B2 | 10/2013 | Bassett | |
| 8,550,020 | B2 | 10/2013 | Sauder et al. | |
| 8,561,472 | B2 | 10/2013 | Sauder et al. | |
| 8,573,111 | B2 | 11/2013 | Graham | |
| 8,634,992 | B2 | 1/2014 | Sauder et al. | |
| 8,636,077 | B2 | 1/2014 | Bassett | |
| 8,755,049 | B2 | 6/2014 | Holland | |
| 8,763,713 | B2 | 7/2014 | Bassett | |
| 8,770,308 | B2 | 7/2014 | Bassett | |
| 8,776,702 | B2 | 7/2014 | Bassett | |
| RE45,091 | E | 8/2014 | Bassett | |
| 8,814,474 | B2 | 8/2014 | Bell | |
| 8,850,998 | B2 | 10/2014 | Garner | |
| 8,863,857 | B2 | 10/2014 | Bassett | |
| 8,903,545 | B2 | 12/2014 | Riffel | |
| 8,909,436 | B2 | 12/2014 | Achen | |
| 8,910,582 | B2 | 12/2014 | Mariman et al. | |
| 8,924,092 | B2 | 12/2014 | Achen | |
| 8,924,102 | B2 | 12/2014 | Sauder et al. | |
| RE45,412 | E | 3/2015 | Sauder et al. | |
| 8,985,037 | B2 | 3/2015 | Radtke | |
| 8,985,232 | B2 | 3/2015 | Bassett | |
| 9,055,712 | B2 | 6/2015 | Bassett | |
| 9,107,337 | B2 | 8/2015 | Bassett | |
| 9,107,338 | B2 | 8/2015 | Bassett | |
| 9,113,589 | B2 | 8/2015 | Bassett | |
| 9,119,342 | B2 | 9/2015 | Bonefas | |
| 9,137,938 | B2 | 9/2015 | Zimmerman | |
| 9,144,187 | B2 | 9/2015 | Bassett | |
| 9,144,189 | B2 | 9/2015 | Stoller | |
| 9,167,740 | B2 | 10/2015 | Bassett | |
| 9,173,339 | B2 | 11/2015 | Sauder et al. | |
| 9,192,089 | B2 | 11/2015 | Bassett | |
| 9,213,905 | B2 | 12/2015 | Lange et al. | |
| 9,226,440 | B2 | 1/2016 | Bassett | |
| 9,232,687 | B2 | 1/2016 | Bassett | |
| 9,265,191 | B2 | 2/2016 | Sauder et al. | |
| 9,288,937 | B2 | 3/2016 | Sauder et al. | |
| 9,301,438 | B2 | 4/2016 | Sauder et al. | |
| 9,332,689 | B2 | 5/2016 | Baurer | |
| 9,338,937 | B2 | 5/2016 | Sauder et al. | |
| 9,351,440 | B2 | 5/2016 | Sauder et al. | |
| 9,462,744 | B2 | 10/2016 | Isaacson | |
| 9,485,900 | B2 | 11/2016 | Connell | |
| 9,510,498 | B2 | 12/2016 | Tuttle et al. | |
| 9,523,496 | B2 | 12/2016 | Bingham | |
| 9,532,496 | B2 | 1/2017 | Sauder et al. | |
| 9,554,504 | B2 | 1/2017 | Houck | |
| 9,578,802 | B2 | 2/2017 | Radtke | |
| 9,585,301 | B1 | 3/2017 | Lund | |
| 9,629,304 | B2 | 4/2017 | Zielke | |
| 9,668,402 | B2 | 6/2017 | Hagny | |
| 9,675,004 | B2 | 6/2017 | Landphair et al. | |
| 9,681,601 | B2 | 6/2017 | Bassett | |
| 9,693,496 | B2 | 7/2017 | Tevs | |
| 9,699,958 | B2 | 7/2017 | Koch | |
| 9,723,778 | B2 | 8/2017 | Bassett | |
| 9,746,007 | B1 | 8/2017 | Stoller | |
| 9,750,174 | B2 | 9/2017 | Sauder et al. | |
| 9,752,596 | B2 | 9/2017 | Sauder | |
| 9,788,472 | B2 | 10/2017 | Bassett | |
| 9,801,332 | B2 | 10/2017 | Landphair | |

(56) References Cited

U.S. PATENT DOCUMENTS

| | | |
|---|---|---|
| 9,814,172 B2 | 11/2017 | Achen et al. |
| 9,848,522 B2 | 12/2017 | Bassett |
| 9,848,523 B2 | 12/2017 | Sauder |
| 9,854,733 B1 | 1/2018 | Kile |
| 9,879,702 B2 | 1/2018 | Stoller |
| 9,955,623 B2 | 5/2018 | Sauder et al. |
| 9,968,033 B2 | 5/2018 | Dunn |
| 10,064,322 B2 | 9/2018 | Luc |
| 10,091,926 B2 | 10/2018 | Maro |
| 10,104,830 B2 | 10/2018 | Heathcote |
| 10,143,128 B2 | 12/2018 | Landphair et al. |
| 10,231,376 B1 | 3/2019 | Stanhope |
| 10,257,973 B2 | 4/2019 | Hubner |
| 10,548,259 B2 | 2/2020 | Heathcote |
| 10,609,857 B2 | 4/2020 | Sauder |
| 10,645,865 B2 | 5/2020 | Bassett |
| 10,821,829 B2 | 11/2020 | Foster |
| 10,959,369 B2 * | 3/2021 | Sieling .................. A01C 7/201 |
| 11,144,775 B2 | 10/2021 | Ferrari |
| 11,197,411 B2 | 12/2021 | Bassett |
| 11,202,404 B2 | 12/2021 | Walter |
| 11,212,954 B2 | 1/2022 | Maeder |
| 11,277,961 B2 | 3/2022 | Campbell |
| 11,612,096 B2 | 3/2023 | Sivinski |
| 11,622,494 B2 | 4/2023 | Arnett et al. |
| 2002/0056407 A1 | 5/2002 | Milne |
| 2002/0073678 A1 | 6/2002 | Lucand |
| 2003/0005867 A1 | 1/2003 | Richard |
| 2003/0183141 A1 | 10/2003 | Bergere et al. |
| 2004/0139895 A1 | 7/2004 | Thompson et al. |
| 2005/0155536 A1 | 7/2005 | Wendte |
| 2005/0172873 A1 | 8/2005 | Mayerle |
| 2006/0086295 A1 | 4/2006 | Jensen |
| 2008/0110382 A1 | 5/2008 | Brockmeier |
| 2008/0229986 A1 | 9/2008 | Arksey |
| 2008/0257237 A1 | 10/2008 | Friesen |
| 2009/0056531 A1 | 3/2009 | Jessen |
| 2009/0056537 A1 | 3/2009 | Jessen |
| 2009/0112410 A1 | 4/2009 | Shull |
| 2010/0180808 A1 | 7/2010 | Liu |
| 2010/0192818 A1 | 8/2010 | Garner |
| 2010/0270043 A1 | 10/2010 | Ankenman |
| 2010/0319941 A1 | 12/2010 | Peterson |
| 2011/0027479 A1 | 2/2011 | Reineccius |
| 2011/0313575 A1 | 12/2011 | Kowalchuk |
| 2012/0042813 A1 | 2/2012 | Liu et al. |
| 2012/0046838 A1 | 2/2012 | Landphair et al. |
| 2012/0048159 A1 | 3/2012 | Adams et al. |
| 2012/0048160 A1 | 3/2012 | Adams |
| 2012/0151910 A1 | 6/2012 | Sauder |
| 2012/0186503 A1 | 7/2012 | Sauder |
| 2012/0261149 A1 | 10/2012 | Schmidt |
| 2012/0291680 A1 | 11/2012 | Rylander |
| 2013/0032363 A1 | 2/2013 | Curry et al. |
| 2013/0126430 A1 | 5/2013 | Kenley |
| 2013/0248212 A1 | 9/2013 | Bassett |
| 2013/0333601 A1 | 12/2013 | Shivak |
| 2014/0026748 A1 | 1/2014 | Stoller |
| 2014/0060869 A1 | 3/2014 | Blunier |
| 2014/0116735 A1 | 5/2014 | Bassett |
| 2014/0190712 A1 | 7/2014 | Bassett |
| 2014/0214284 A1 | 7/2014 | Sauder et al. |
| 2014/0216771 A1 | 8/2014 | Bassett |
| 2014/0238284 A1 | 8/2014 | Kapphahn |
| 2014/0262378 A1 | 9/2014 | Connors |
| 2014/0303854 A1 | 10/2014 | Zielke |
| 2014/0379230 A1 | 12/2014 | Koch |
| 2015/0094916 A1 | 4/2015 | Bauerer et al. |
| 2015/0107501 A1 | 4/2015 | Barton |
| 2015/0176614 A1 | 6/2015 | Stoller |
| 2015/0195988 A1 | 7/2015 | Radtke |
| 2015/0264857 A1 | 9/2015 | Achen |
| 2015/0271986 A1 | 10/2015 | Sauder |
| 2015/0305229 A1 | 10/2015 | Sauder |
| 2015/0319919 A1 | 11/2015 | Sauder |
| 2016/0007521 A1 | 1/2016 | Kusler |
| 2016/0007524 A1 | 1/2016 | Kusler |
| 2016/0040692 A1 | 2/2016 | Stoller |
| 2016/0128272 A1 | 5/2016 | Sauder |
| 2016/0143213 A1 | 5/2016 | Kowalchuk |
| 2016/0157412 A1 | 6/2016 | Sauder |
| 2016/0212932 A1 | 7/2016 | Radtke |
| 2016/0227700 A1 | 8/2016 | Wendte |
| 2016/0227701 A1 | 8/2016 | Nelson |
| 2016/0249525 A1 | 9/2016 | Baurer et al. |
| 2017/0000016 A1 | 1/2017 | Prickel |
| 2017/0013771 A1 | 1/2017 | Townsend |
| 2017/0049044 A1 | 2/2017 | Stoller |
| 2017/0086347 A1 | 3/2017 | Sauder |
| 2017/0094889 A1 | 4/2017 | Garner |
| 2017/0112043 A1 | 4/2017 | Nair |
| 2017/0223947 A1 | 8/2017 | Gall |
| 2017/0280616 A1 | 10/2017 | Gervais |
| 2017/0354079 A1 | 12/2017 | Foster |
| 2017/0357029 A1 | 12/2017 | Lakshmanan |
| 2017/0359941 A1 | 12/2017 | Czapka |
| 2017/0367252 A1 | 12/2017 | Sakaguchi |
| 2018/0015490 A1 | 1/2018 | Grimm |
| 2018/0024549 A1 | 1/2018 | Hurd |
| 2018/0092287 A1 | 4/2018 | Garner |
| 2018/0092288 A1 | 4/2018 | Garner |
| 2018/0092289 A1 | 4/2018 | Wonderlich |
| 2018/0092295 A1 | 4/2018 | Sugumaran |
| 2018/0125000 A1 | 5/2018 | Levy |
| 2018/0128933 A1 | 5/2018 | Koch |
| 2018/0132422 A1 | 5/2018 | Hassanzadeh et al. |
| 2018/0132423 A1 | 5/2018 | Rowan |
| 2018/0168094 A1 | 6/2018 | Koch |
| 2018/0199499 A1 | 7/2018 | Adams |
| 2018/0199505 A1 | 7/2018 | Beaujot |
| 2018/0206393 A1 | 7/2018 | Stoller |
| 2018/0210443 A1 | 7/2018 | Matsuzaki |
| 2018/0263174 A1 | 9/2018 | Hodel |
| 2018/0292339 A1 | 10/2018 | Gunzenhauser |
| 2018/0317380 A1 | 11/2018 | Bassett |
| 2018/0317381 A1 | 11/2018 | Bassett |
| 2018/0368310 A1 | 12/2018 | Zimmerman |
| 2018/0373264 A1 | 12/2018 | Madsen |
| 2019/0021211 A1 | 1/2019 | Gutknecht |
| 2019/0029165 A1 | 1/2019 | Leimkuehler et al. |
| 2019/0045703 A1 | 2/2019 | Bassett |
| 2019/0059206 A1 | 2/2019 | Stanhope |
| 2019/0072114 A1 | 3/2019 | Myers et al. |
| 2019/0075714 A1 | 3/2019 | Koch |
| 2019/0124824 A1 | 5/2019 | Hubner |
| 2019/0162164 A1 | 5/2019 | Funk |
| 2019/0174666 A1 | 6/2019 | Mantemach |
| 2019/0191622 A1 | 6/2019 | Hafvenstein |
| 2019/0232304 A1 | 8/2019 | Grimm |
| 2019/0239413 A1 | 8/2019 | DeGarmo |
| 2019/0254223 A1 | 8/2019 | Eichhorn |
| 2019/0286915 A1 | 9/2019 | Patil |
| 2019/0297769 A1 | 10/2019 | Zielke et al. |
| 2019/0297774 A1 | 10/2019 | Hamilton |
| 2019/0302799 A1 | 10/2019 | Schaff |
| 2019/0373801 A1 | 12/2019 | Schoeny |
| 2019/0380259 A1 | 12/2019 | Frank |
| 2020/0029486 A1 | 1/2020 | Buehler et al. |
| 2020/0045869 A1 | 2/2020 | Stanhope |
| 2020/0053954 A1 | 2/2020 | Hamilton |
| 2020/0068778 A1 | 3/2020 | Schoeny |
| 2020/0068783 A1 | 3/2020 | Strnad |
| 2020/0100419 A1 | 4/2020 | Stanhope |
| 2020/0100421 A1 | 4/2020 | Wang |
| 2020/0109954 A1 | 4/2020 | Li |
| 2020/0128723 A1 | 4/2020 | Eichhorn |
| 2020/0154627 A1 | 5/2020 | Plattner |
| 2020/0154629 A1 | 5/2020 | Holoubek et al. |
| 2020/0178455 A1 | 6/2020 | Ishikawa |
| 2020/0221630 A1 | 7/2020 | Pomedli |
| 2020/0305335 A1 | 10/2020 | Schoeny |
| 2020/0329631 A1 | 10/2020 | Johnson |
| 2020/0352088 A1 | 11/2020 | Arnett |
| 2020/0359559 A1 | 11/2020 | Koch |

(56) References Cited

U.S. PATENT DOCUMENTS

| | | |
|---|---|---|
| 2020/0375081 A1 | 12/2020 | Holoubek |
| 2020/0375085 A1 | 12/2020 | Strnad |
| 2021/0022286 A1 | 1/2021 | Gilbert et al. |
| 2021/0051846 A1 | 2/2021 | Vandenbark |
| 2021/0059102 A1 | 3/2021 | Geistkemper |
| 2021/0120726 A1 | 4/2021 | Barrick |
| 2021/0132618 A1 | 5/2021 | Van Roekel |
| 2021/0153421 A1 | 5/2021 | Holoubek et al. |
| 2021/0161060 A1 | 6/2021 | Kaufmann |
| 2021/0185903 A1 | 6/2021 | Demiter et al. |
| 2021/0235611 A1 | 8/2021 | Fett |
| 2021/0243941 A1 | 8/2021 | Buehler |
| 2021/0307236 A1 | 10/2021 | Strnad |
| 2021/0315147 A1 | 10/2021 | Fanshier |
| 2022/0000008 A1 | 1/2022 | Hubner |
| 2022/0061202 A1 | 3/2022 | Holoubek et al. |
| 2022/0061208 A1 | 3/2022 | Campbell et al. |
| 2022/0142039 A1 | 5/2022 | Eichhorn et al. |
| 2022/0151138 A1 | 5/2022 | Barry |
| 2022/0174855 A1 | 6/2022 | Zielke et al. |
| 2022/0232753 A1 | 7/2022 | Van De Woestyne |
| 2022/0272888 A1 | 9/2022 | Hodel |
| 2023/0145955 A1 | 5/2023 | Schmidt et al. |
| 2023/0180653 A1 | 6/2023 | Barry et al. |
| 2023/0232733 A1 | 7/2023 | Barry et al. |
| 2023/0388458 A1 | 11/2023 | Eichhorn et al. |
| 2023/0413720 A1 | 12/2023 | Barry et al. |
| 2024/0167848 A1 | 5/2024 | Johnson |
| 2024/0180066 A1 | 6/2024 | Holoubek |
| 2024/0334864 A1 | 10/2024 | Holoubek et al. |
| 2025/0133977 A1 | 5/2025 | Barry et al. |

FOREIGN PATENT DOCUMENTS

| | | |
|---|---|---|
| AU | 2017382800 B2 | 6/2018 |
| AU | 2018100865 B4 | 6/2022 |
| CA | 2549371 A1 | 11/2007 |
| CA | 2584736 A1 | 9/2008 |
| CA | 2727188 A1 | 12/2009 |
| CN | 108362267 A | 8/2018 |
| CN | 112601450 A | 4/2021 |
| EP | 372901 A2 | 6/1990 |
| EP | 606541 A1 | 1/1997 |
| EP | 3219186 A1 | 9/2017 |
| EP | 2901838 B1 | 11/2017 |
| EP | 3698615 A1 | 8/2020 |
| GB | 18381 | 10/1904 |
| GB | 2309622 A | 6/1997 |
| JP | 4517467 B2 | 8/2010 |
| KR | 101728137 B1 | 4/2017 |
| RU | 2355152 C2 | 5/2009 |
| SU | 948316 A1 | 8/1982 |
| SU | 1148582 A | 4/1985 |
| WO | 2009134144 A1 | 11/2009 |
| WO | 2014153157 A1 | 9/2014 |
| WO | 2015171908 A1 | 11/2015 |
| WO | 2017160860 A1 | 9/2017 |
| WO | 2017197274 A1 | 11/2017 |
| WO | 2017197292 A1 | 11/2017 |
| WO | 2018151989 A1 | 8/2018 |
| WO | 2021021594 A1 | 2/2021 |

OTHER PUBLICATIONS

Modular Row Crop Planting Systems from Excel Agriculture, available as early as 2002—https://www.excelagr.com.au/excel-agri-row-crop-planter.php.

Janke Australia, available as early as 2017—https://www.janke.com.au/.

8910 Floating Hitch Cultivator, available as early as 2010—https://www.bourgault.com/en-us/products/tillage/8910-cultivator.

Patriot Parallelogram Tyne Planter Farm Equipment Gessner, available as early as 2017—https://www.gessner.com.au/products/patriot-parallelogram-tyne-planter/.

Ground Breaker Precision Planters and Patented Tyne and Disc Row Units—https://www.precisionagsolutions.com.au/ground-breaker.

Parallelogram Tyne Units—https://bossagriculture.com.au/home/planter-row-units/parallelogram-tyne-units/.

What to Look for in a No Till or Minimum Tillage Planter—https://multifarmingsystems.com.au/wp-content/uploads/2015/07/What-to-Look-for-in-a-No-Till-or-Minimum-Tillage-Planter.pdf.

Boss 18 Metre Parallelogram Tyne Planter—https://www.thecombineforum.com/threads/boss-18-metre-parallelogram-tyne-planter-on-9-spacing.222722/.

Precision tyne planter takes innovation award , 2017, https://www.graincentral.com/machinery/precision-tyne-planter-takes-innovation-award.

Enfield Technologies, EQV Proportional Pinch Valves, https://www.enfieldtech.com/Products/EQV-Proportional-Pinch-Valves.

360 Yield Sensor—Wave—Unknown, available as early as 2020.

Contour King Gallery—ZML, Unknown, available as early as 2013, https://www.zimmermanmfg.com/contour-king-st-gallery.php.

Dawn ACS Explanation video, https://twitter.com/DawnEquipment/status/969698839409111045.

Deere "SeedStar 2 Deere SeedStar XP Monitor for Planters" pp. 70-78-70-9.

Industrial Electronics Robust control of active suspensions for high performance vehicles, Proceedings of IEEE International Symposium on Industrial Electronics, 1996.

Industrial electronics, modeling and force tracking control of hydraulic actuator for an active suspension system, 2006 1st IEEE Conference on Industrial Electronics and Applications, 2006.

John Deere Delta Force Diagram.

Kasper, relationship between six years of corn yields and terrain attributes, ISU—Kaspar, Tom & Colvin, Thomas & Jaynes, D.B. & Karlen, Douglas & James, David & Meek, David & Pulido, Daniel & Butler, Howard. (2003). Relationship Between Six Years of Corn Yields and Terrain Attributes. Precision Agriculture. 4. 87-101.

Gratton et al., Manitoba, Design of a spring-loaded downforce system for a no-till seed opener, 2003.

Zong-yi et al., Minesweeping Tank, Electrohydraulic System Using RBF Neural Network and Genetic Algorithm, 2010.

Orthman ItRIPr row unit, 2019—https://www.orthmanequip.com/strip-tillage/1tripr/.

Precision Planting 2010 Full Line Brochure.

Precision Planting Furrowforce—https://precisionplanting.com/products/product/furrowforce.

Precision Planting FurrowJet, Unknown—available as early as 2017, https://precisionplanting.com/products/product/furrowjet.

ZML Contour King, Youtube Video Aug. 13, 2021, https://www.youtube.com/watch?v=T-rj_EZMCM4.

Page 130 of version 5.2 Operating Manual for the Ag Leader Integra, Part No. 4002083.

* cited by examiner

AGRICULTURAL HIGH SPEED ROW UNIT

CROSS-REFERENCE TO RELATED APPLICATION(S)

This application claims the benefit under 35 U.S.C. § 119(e) to U.S. Provisional Application 63/113,566, filed Nov. 13, 2020, and entitled "Apparatus, Systems, and Methods for High Speed Row Units," and U.S. Provisional Application 63/212,909, filed Jun. 21, 2021, and entitled "Apparatus, Systems, and Methods for High Speed Row Units," which are hereby incorporated herein by reference in their entirety for all purposes.

TECHNICAL FIELD

The disclosed technology relates generally to row units for row crop agricultural applications.

BACKGROUND

Most conventional planter row units used in production row crop agriculture have similar design features. Certain of these features include disc opener blades mounted in a way that causes the leading edges meet at the soil entry location to spread the soil apart to form a V-shaped furrow for seeds to be placed. Additional features include depth gauge wheels that roll alongside and slightly behind the disc opener blades. These depth gauge wheels set the depth of the seed furrow and firm the soil alongside the seed furrow so it holds a shape until the seeds are placed. Row units also typically include an elongated area that provides a space for the seed handling devices to be located with the goal of placing individual seeds in the open furrow. Row unit features also include a furrow closing mechanism to place and firm soil over the planted seed. A downforce application system to force the V-shaped opening discs into the ground and to provide force against the furrow closing mechanism may be a further feature of various row units.

In current art planter row units, seeds are typically planted at a pre-determined depth that is usually established before the planting operation begins. Downforce, applied to the main structure by any of a number of means, pushes the furrow opener discs into the soil until the gauge wheels support the machine at the soil surface. After the seed is deposited in the furrow it is necessary to firm soil over the seed to promote germination. In current art this is done with an actuator of some type that pushes down on the closing mechanism by pushing against the main row unit structure. This closing mechanism downforce reduces the load applied to the gauge wheels and as a result requires additional downforce to be applied by the main downforce method. The two forces are counter to each other and can lead to swings in the amount of gauge wheel soil compaction, the depth of the seed furrow, and the quality of seed to soil contact achieved with the closing assembly.

This type of design generally works well and is accepted as the state of the art. Recent movement towards faster travel speeds has revealed some limitations in the current state of the art, such as those described above, that the disclosed devices, systems, and methods seek to eliminate.

BRIEF SUMMARY

In Example 1, an agricultural row unit comprising a coulter assembly comprising a pair of gauge wheels and a coulter between the pair of gauge wheels, wherein the coulter is configured to penetrate soil and cut debris, a soil engaging assembly comprising sweep and a seed tube, wherein the sweep is configured to open a seed channel and the seed tube is configured to deposit seeds into the seed channel, and a closing assembly configured to replace soil displaced by the coulter and sweep.

Example 2 relates to the agricultural row unit of Example 1, wherein the sweep comprises a body and two horizontal wings extending therefrom.

Example 3 relates to the agricultural row unit of Examples 1-2, further comprising a variable pitch actuator in communication with the sweep configured to urge the sweep in the fore and aft directions changing the pitch of the sweep.

Example 4 relates to the agricultural row unit of Examples 1-3, further comprising a depth control actuator in communication with the soil engaging assembly configured to independently control the depth of the seed channel.

Example 5 relates to the agricultural row unit of Examples 1-4, further comprising a downforce actuator in communication with the coulter assembly configured to apply downforce to the coulter assembly and closing assembly.

Example 6 relates to the agricultural row unit of Examples 1-5, further comprising a residue clearing device disposed on the row unit adjacent to the soil engaging assembly configured to move residue away from the seed channel.

Example 7 relates to the agricultural row unit of Examples 1-6, further comprising a steering actuator in communication with the coulter configured to rotate the coulter along a z-axis.

In Example 8, a planter row unit comprising a coulter assembly comprising a coulter blade and at least one gauge wheel, the coulter assembly disposed on a toolbar via a first set of parallel bars, a soil engaging assembly comprising a sweep configured to create a seed channel, the soil engaging assembly in communication with the toolbar via a second set of parallel bars, and a downforce actuator in communication with the coulter assembly configured to apply downforce to the coulter, wherein a depth of the coulter is independently controllable from a depth of the sweep.

Example 9 relates to the planter row unit of Example 8, wherein the sweep comprises horizontal wings and wherein the sweep is configured to generate down draft on the planter row unit when creating the seed channel.

Example 10 relates to the planter row unit of Examples 8-9, further comprising a first moisture sensor disposed on the sweep configured to measure soil moisture at a bottom of the seed channel.

Example 11 relates to the planter row unit of Example 10, further comprising a second moisture sensor disposed on the sweep configured to measure soil moisture at a side of the seed channel.

Example 12 relates to the planter row unit of Example 11, wherein the measured soil moisture from the first moisture sensor and the second moisture sensor are compared to a target soil moisture range.

Example 13 relates to the planter row unit of Examples 8-12, further comprising a linear actuator in communication with the first set of parallel bars and the soil engaging assembly.

Examples 14 relates to the planter row unit of Example 8, wherein the seed channel does not expose an open furrow.

In Example 15, an agricultural planter comprising a plurality of row units, each of the plurality of row units disposed on a toolbar. Each row unit comprising a coulter, a sweep, a downforce actuator in communication with the coulter, and a depth control actuator in communication with the sweep, wherein actuation of the downforce actuator adjusts the depth of the coulter and actuation of the depth control actuator adjusts the depth of the sweep, and wherein the depth of the sweep is independently controlled from the depth of the coulter.

Example 16 relates to the agricultural planter of Example 15, further comprising a first set of parallel bars and a second set of parallel bars, wherein the first set of parallel bars attach the coulter to the toolbar and wherein the second set of parallel bars attach the sweep to the toolbar.

Example 17 relates to the agricultural planter of Examples 15-16, further comprising one or more toolbar gauge wheels in communication with the toolbar.

Example 18 relates to the agricultural planter of Examples 15-17, further comprising one or more inertia sensors disposed on the toolbar.

Examples 19 relates to the agricultural planter of Examples 16-18, further comprising a linear actuator connected to the first set of parallel bars and the sweep.

Example 20 relates to the agricultural planter of Example 19, wherein the linear actuator maintains a sweep depth relative to one or more gauge wheels in communication with the first set of parallel bars.

While multiple embodiments are disclosed, still other embodiments of the disclosure will become apparent to those skilled in the art from the following detailed description, which shows and describes illustrative embodiments of the invention. As will be realized, the disclosure is capable of modifications in various obvious aspects, all without departing from the spirit and scope of the disclosure. Accordingly, the drawings and detailed description are to be regarded as illustrative in nature and not restrictive.

DETAILED DESCRIPTION

Figure 1:
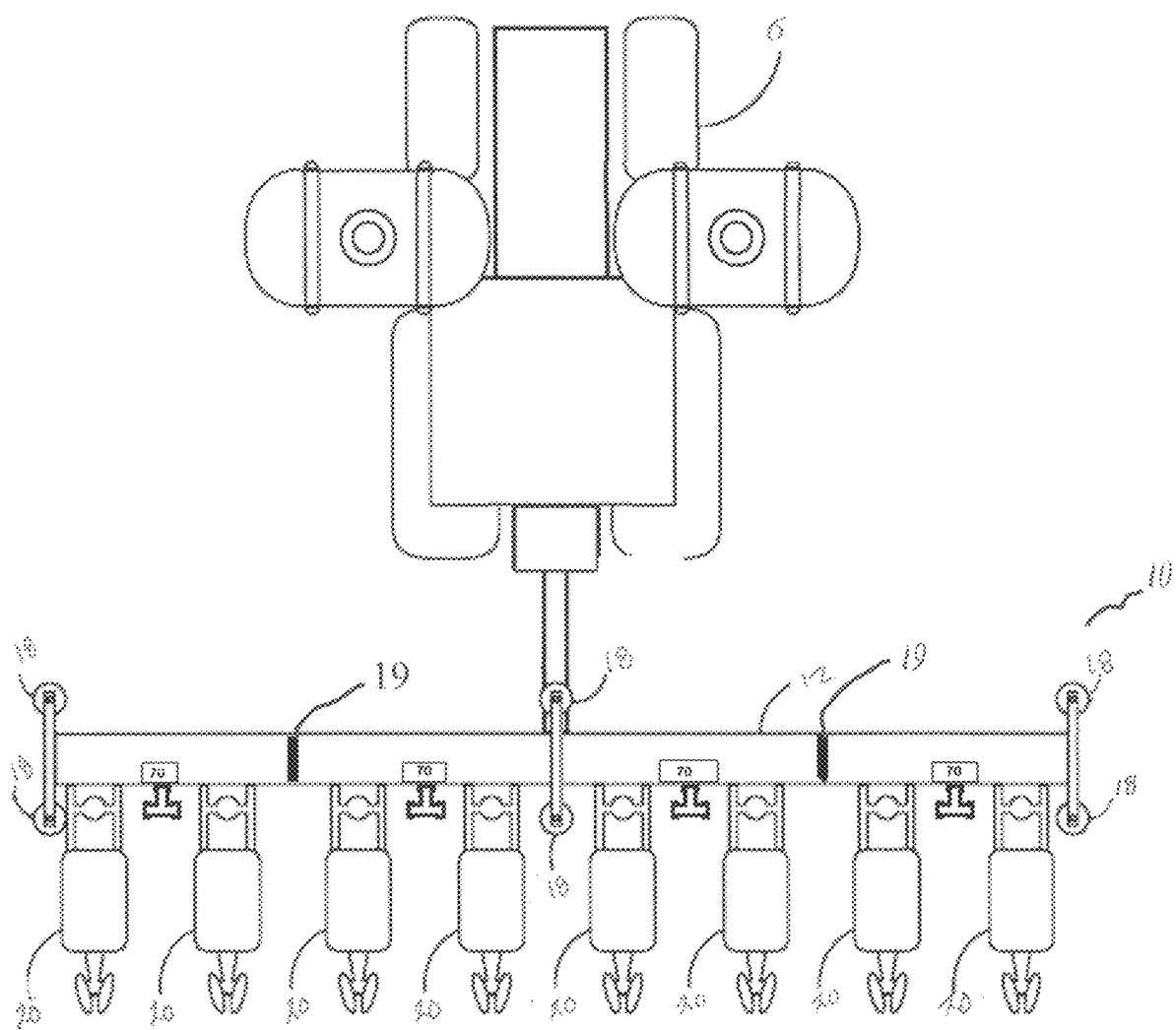
FIG. 1 is a top view of a planter, according to one implementation.

Discussed and contemplated herein are various devices, systems and methods relating to an agricultural row unit, and in particular a row unit for use in high-speed planting. In various implementations, the row unit forms a seed channel that does not expose an open trench, such that debris cannot fall into the channel hampering plant growth. In certain further implementations, the row unit is configured such that there is less soil disturbance as compared to current known row units which will result in reduced draft loading on the toolbar.

In certain implementations, the row unit and associated systems are configured to maintain the depth of the seed channel of each row relative to a rolling gauge wheel assembly in close proximity to the seed placement location. In these implementations, the depth of soil penetration is not solely dependent on the implement weight or applied supplemental downforce, the draft created by the soil engaging tools adds to the available downforce. Additionally, increased speed increases the available downforce, by having additional down draft, rather than subtracting from it as is common with prior known device.

Various additional implementations of the planter and row unit disclosed and contemplated herein include a control system, configured to monitor and operate the various devices and systems of the row unit. In certain implementations, the row unit utilizes active depth control, while in alternate implementations the depth control is done manually. In certain of these implementations, the row unit and control system execute a variable depth control system configured to maximize yields by planting seeds in optimal moisture and/or optimal depths.

Certain of the disclosed implementations can be used in conjunction with any of the devices, systems or methods taught or otherwise disclosed in U.S. Pat. No. 10,684,305 issued Jun. 16, 2020, entitled "Apparatus, Systems and Methods for Cross Track Error Calculation From Active Sensors," U.S. patent application Ser. No. 16/121,065, filed Sep. 4, 2018, entitled "Planter Down Pressure and Uplift Devices, Systems, and Associated Methods," U.S. Pat. No. 10,743,460, issued Aug. 18, 2020, entitled "Controlled Air Pulse Metering apparatus for an Agricultural Planter and Related Systems and Methods," U.S. patent application Ser. No. 16/272,590, filed Feb. 11, 2019, entitled "Seed Spacing Device for an Agricultural Planter and Related Systems and Methods," U.S. patent application Ser. No. 16/142,522, filed Sep. 26, 2018, entitled "Planter Downforce and Uplift Monitoring and Control Feedback Devices, Systems and Associated Methods," U.S. Pat. No. 10,813,281, issued Oct. 27, 2020, entitled "Apparatus, Systems, and Methods for Applying Fluid," U.S. patent application Ser. No. 16/371,815, filed Apr. 1, 2019, entitled "Devices, Systems, and Methods for Seed Trench Protection," U.S. patent application Ser. No. 16/523,343, filed Jul. 26, 2019, entitled "Closing Wheel Downforce Adjustment Devices, Systems, and Methods," U.S. patent application Ser. No. 16/670,692, filed Oct. 31, 2019, entitled "Soil Sensing Control Devices, Systems, and Associated Methods," U.S. patent application Ser. No. 16/684,877, filed Nov. 11, 2019, entitled "On-The-Go Organic Matter Sensor and Associated Systems and Methods," U.S. patent application Ser. No. 16/752,989, filed Jan. 27, 2020, entitled "Dual Seed Meter and Related Systems and Methods," U.S. patent application Ser. No. 16/891,812, filed Jun. 3, 2020, entitled "Apparatus, Systems and Methods for Row Cleaner Depth Adjustment On-The-Go," U.S. patent application Ser. No. 16/918,300, filed Jul. 1, 2020, entitled "Apparatus, Systems, and Methods for Eliminating Cross-Track Error," U.S. patent application Ser. No. 16/921,828, filed Jul. 6, 2020, entitled "Apparatus, Systems and Methods for Automatic Steering Guidance and Visualization of Guidance Paths," U.S. patent application Ser. No. 16/939,785, filed Jul. 27, 2020, entitled "Apparatus, Systems and Methods for Automated Navigation of Agricultural Equipment," U.S. patent application Ser. No. 16/997,361, filed Aug. 19, 2020, entitled "Apparatus, Systems and Methods for Steerable Toolbars," U.S. patent application Ser. No. 16/997,040, filed Aug. 19, 2020, entitled "Adjustable Seed Meter and Related Systems and Methods," U.S. patent application Ser. No. 17/011,737, filed Sep. 3, 2020, entitled "Planter Row Unit and Associated Systems and Methods," U.S. patent application Ser. No. 17/060,844, filed Oct. 1, 2020, entitled "Agricultural Vacuum and Electrical Generator Devices, Systems, and Methods," U.S. patent application Ser. No. 17/105,437, filed Nov. 25, 2020, entitled "Devices, Systems and Methods For Seed Trench Monitoring and Closing," U.S. patent application Ser. No. 17/127,812, filed Dec. 18, 2020, entitled "Seed Meter Controller and Associated Devices, Systems and Methods," U.S. patent application Ser. No. 17/132,152, filed Dec. 23, 2020, entitled "Use of Aerial Imagery For Vehicle Path Guidance and Associated Devices, Systems, and Methods," U.S. patent application Ser. No. 17/164,213, filed Feb. 1, 2021, entitled "Row Unit Arm Sensor and Associated Systems and Methods," U.S. patent application Ser. No. 17/170,752, filed Feb. 8, 2021, entitled "Planter Obstruction Monitoring and Associated Devices and Methods," U.S. patent application Ser. No. 17/323,649, filed May 18, 2021, entitled "Assisted Steering Apparatus and Associated Systems and Methods," U.S. patent application Ser. No. 17/381,900, filed Jul. 21, 2021, entitled "Visual Boundary Segmentations and Obstacle Mapping for Agricultural Vehicles," U.S. patent application Ser. No. 17/461,839, filed Aug. 30, 2021, entitled "Automated agricultural Implement Orientation Adjustment System And Related Devices And Methods," U.S. Patent Application 63/127,598, filed Dec. 18, 2020, entitled "Devices, Systems, and Method For Seed Delivery Control," U.S. Patent Application 63/137,946, filed Jan. 15, 2021, entitled "Apparatus, Systems, and Methods for Row Crop Headers," U.S. Patent Application 63/176,408, filed Apr. 19, 2021, entitled "Automatic Steering Systems and Methods," U.S. Patent Application 63/186,995, filed May 11, 2021, entitled "Calibration Adjustment for Automatic Steering Systems," U.S. Patent Application 63/240,129, filed Sep. 2, 2021, entitled "Tile Installation System with Force Sensor," and U.S. Patent Application 63/241,393, filed Sep. 7, 2021, entitled "Row-by-Row Yield Estimation System and Related Devices and Methods."

Turning to the figures in greater detail, FIG. 1 depicts an exemplary planter 10. As would be understood, agricultural planters 10 typically include a plurality of substantially identical row units 20 disposed on a toolbar 12. The various row units 20 may be disposed on the toolbar 12 via a bracket 14 and set of parallel arms 16. In certain implementations, the toolbar 12 may include one or more toolbar gauge wheels 18 configured to ride along the soil and support the toolbar 12.

Toolbar gauge wheels 18, in certain implementations, are used to maintain the implement toolbar 12 operating height. These gauge wheels 18 may take the form of tires that are designed to carry the total weight of the implement during transport and field end turns, through waterways and the like on larger, wider implements there will be many such toolbar gauge wheels 18 in addition to flex points 19 along the length of the toolbar 12.

Various additional implementations may include optional inertia sensors 70 configured to read rapid toolbar 12 vertical motion and distinguish patterns in the rise and fall of individual or groups of row units 20 in response to field conditions, as will be discussed further below.

Various implementations of a high-speed row unit 20 are disclosed or contemplated herein and certain implementations are shown variously in FIGS. 2-8F. In various implementations, the row unit 20 comprises a coulter assembly 22 comprising at least one substantially vertically mounted round coulter blade 24 configured to penetrate soil and cut residue and weeds growing in the path of the row to be planted.

Continuing with FIGS. 2-8F, the row unit 20 and coulter assembly 22 may also comprise a pair of rolling gauge wheels 26A, 26B spaced about the coulter 24. The rolling gauge wheels 26A, 26B, in certain implementations, being configured to maintain the coulter 24 blade depth and provide a reference for the control system 100 to gauge the planting depth, as will be described herein. In various implementations, the coulter 24 is attached to the row unit 20 on the mounting frame 64, and several approaches can be utilized to adjust coulter 24 depth independent of gauge wheels 26A, 26B, as will be discussed further herein.

In certain implementations, the downforce actuator 56 applies downforce to the parallel arms 16, which in turn urge the coulter 24 and other components mounted to the mounting frame 64 downward, as would be appreciated. In certain implementations, the operating depth of the coulter 24 changes in response to a change in an offset value that determines the planting depth, as described further below. Immediate elevation changes determined by the gauge wheels 26A, 26B also affect the coulter assembly 22 operating position, as would be appreciated.

In certain implementations, an optional coulter actuator (shown for example in FIG. 13 at 25) is provided that independently changes the depth of the coulter 24 without changing the position of the row unit parallel arms 16 relative to the toolbar 12, so a full range of motion is maintained over the full range of possible operating depths.

In various implementations, the coulter assembly 22 promotes splitting residue so the sweep 32, described below, can pass without wrapping and dragging such residue.

In certain implementations, an equalizing feature can be included in the assembly 22 to ensure that both gauge wheels 26A, 26B are always in full contact with the soil as individual soil elevation changes are encountered. That is, in certain implementations, the gauge wheels 26A, 26B are independently movable such that an elevation change under one gauge wheel 26A would not affect the position of the second gauge wheel 26B.

Additionally, according to implementations like that of FIGS. 2-8F, the row unit 20 comprises a soil engaging assembly 30 comprising, in part, a soil engaging device 32 or sweep 32 disposed behind the coulter assembly 22. Such soil engaging assembly 30 arrangements are generally discussed in the context of cultivators in U.S. Pat. No. 6,325,156, which is incorporated herein in its entirety. Further views of the sweep 32 are depicted and discussed below, in reference to FIGS. 27-33.

As will be appreciated in light of this disclosure, the depth control of the coulter assembly 22 is separate from the depth control of the soil engaging assembly 30. That is, in various implementations, the coulter 24 and associated assembly 22 are independent from the sweep 32 and soil engaging assembly 30.

Continuing with the implementations of the row unit 20 of FIGS. 2-8F, the soil engaging assembly 30 is configured to place seed in a seed channel 2 via a seed tube 34, at a controlled spacing and planting depth without first opening a V-shaped seed furrow as required by the prior art. Instead, a seed channel 2 is created by the disclosed row unit 20, coulter 24, and sweep 32, such that seed metered by a seed meter 36 can be planted via a seed tube 34 into the seed channel 2.

In certain implementations, the seed delivery tube 34, meter 36, and hopper (not shown) are coupled to the soil engaging assembly 30 depth mechanism, such as the depth actuator 54, as will be discussed further herein, such that the position of all the seed placement components stay constant relative to each other. That is, as height of the sweep 32 and/or soil engaged assembly are adjusted, so too is the height of the seed delivery tube 34, seed meter 36 and hopper assembly.

Various implementations of the row unit 20 include a closing assembly 40. In various implementations, the closing assembly 40 features a closing wheel 42 and an optional row cleaner 44. In these implementations, the closing assembly 40 is configured such that the soil disturbed by the coulter 24 and sweep 32 is pushed back together to fill the seed channel 2 and cover the seed to promote germination. In further implementations, row cleaners 44 can be positioned after the coulter assembly 22 and ahead of the sweep 32 to clear residue to prevent covering seeds with field residue and to leave a clear strip to promote soil warming. It is appreciated that any number of common and understood closing and cleaning components and arrangements are possible.

Figure 2:
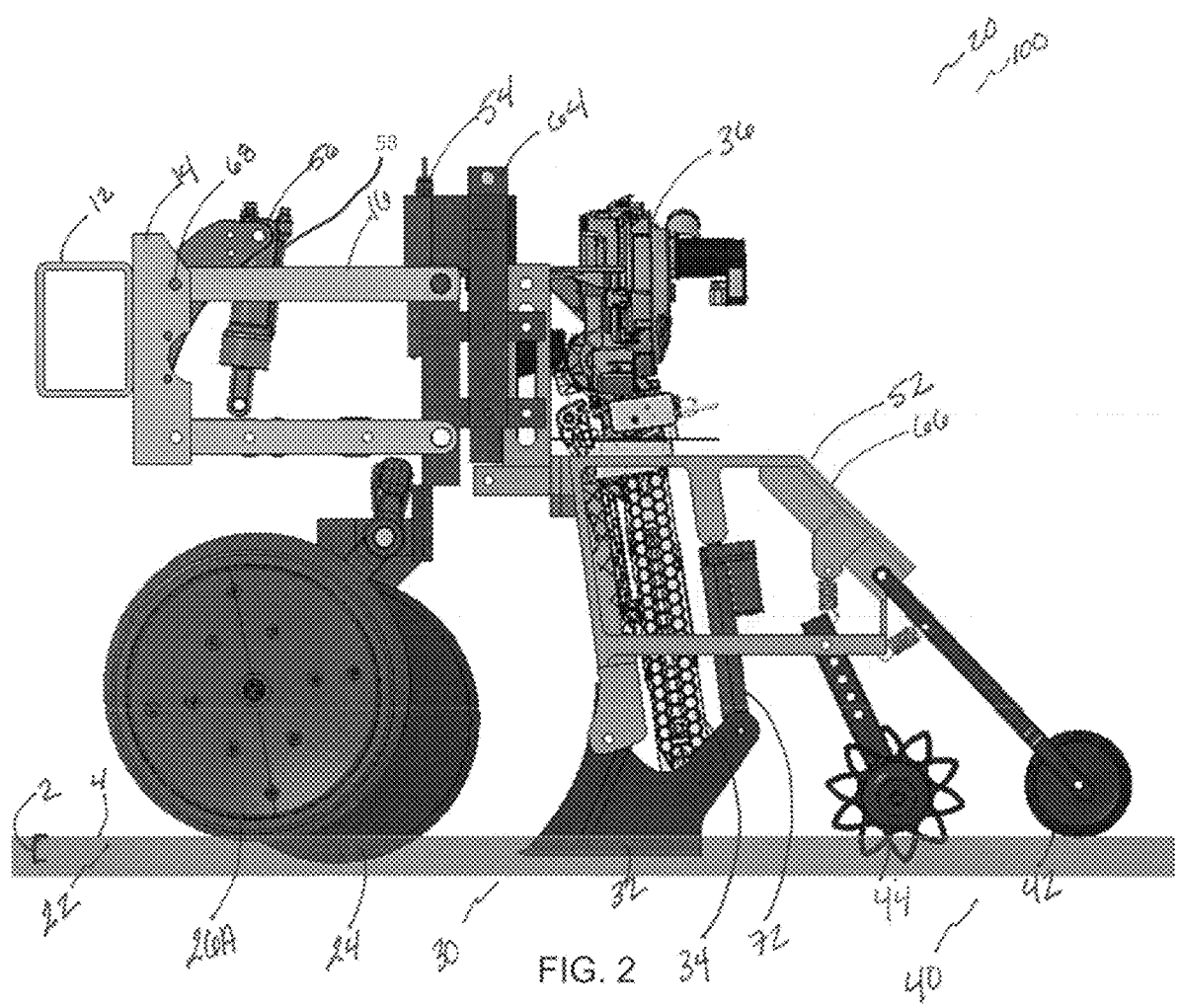
FIG. 2 is a side view of a row unit, according to one implementation.
Figure 3:
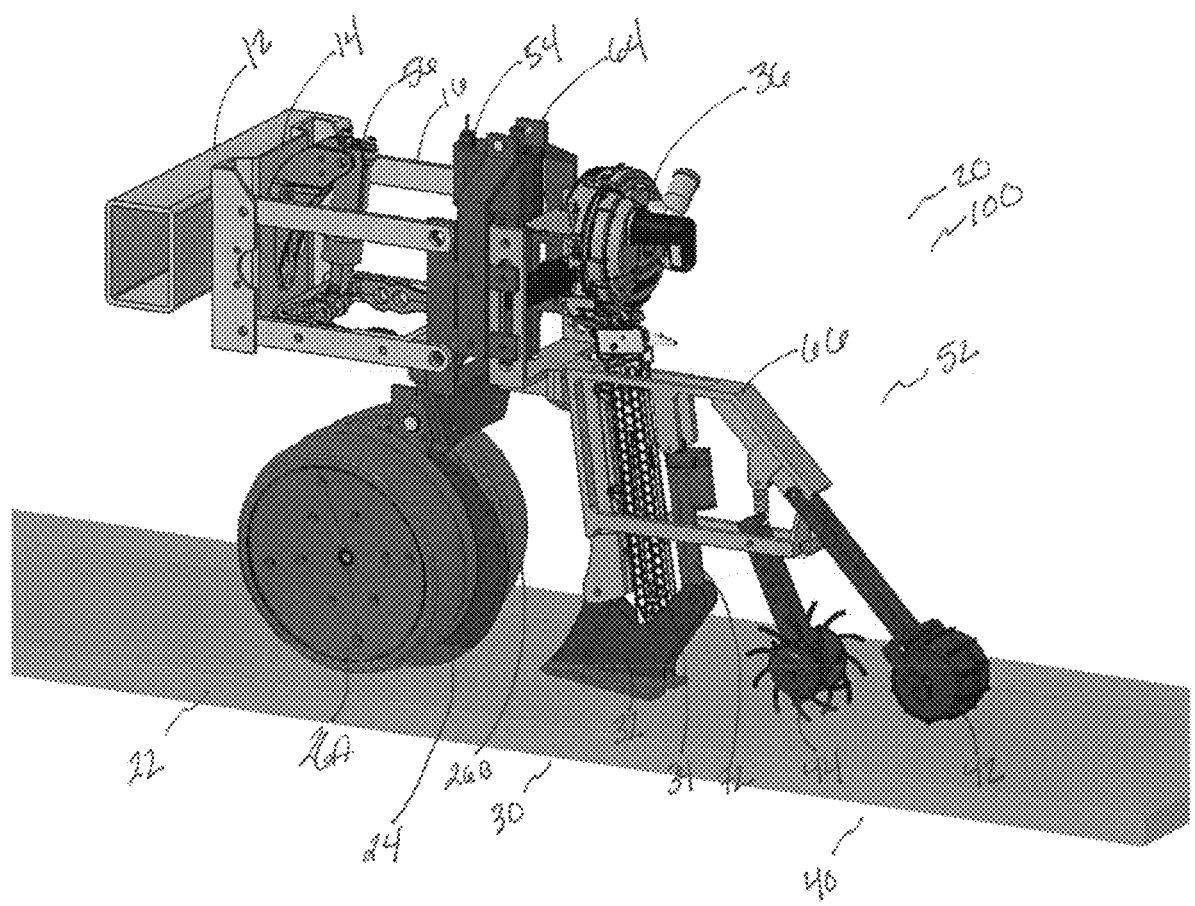
FIG. 3 is a rear, side perspective view of a row unit, according to one implementation.
Figure 4:
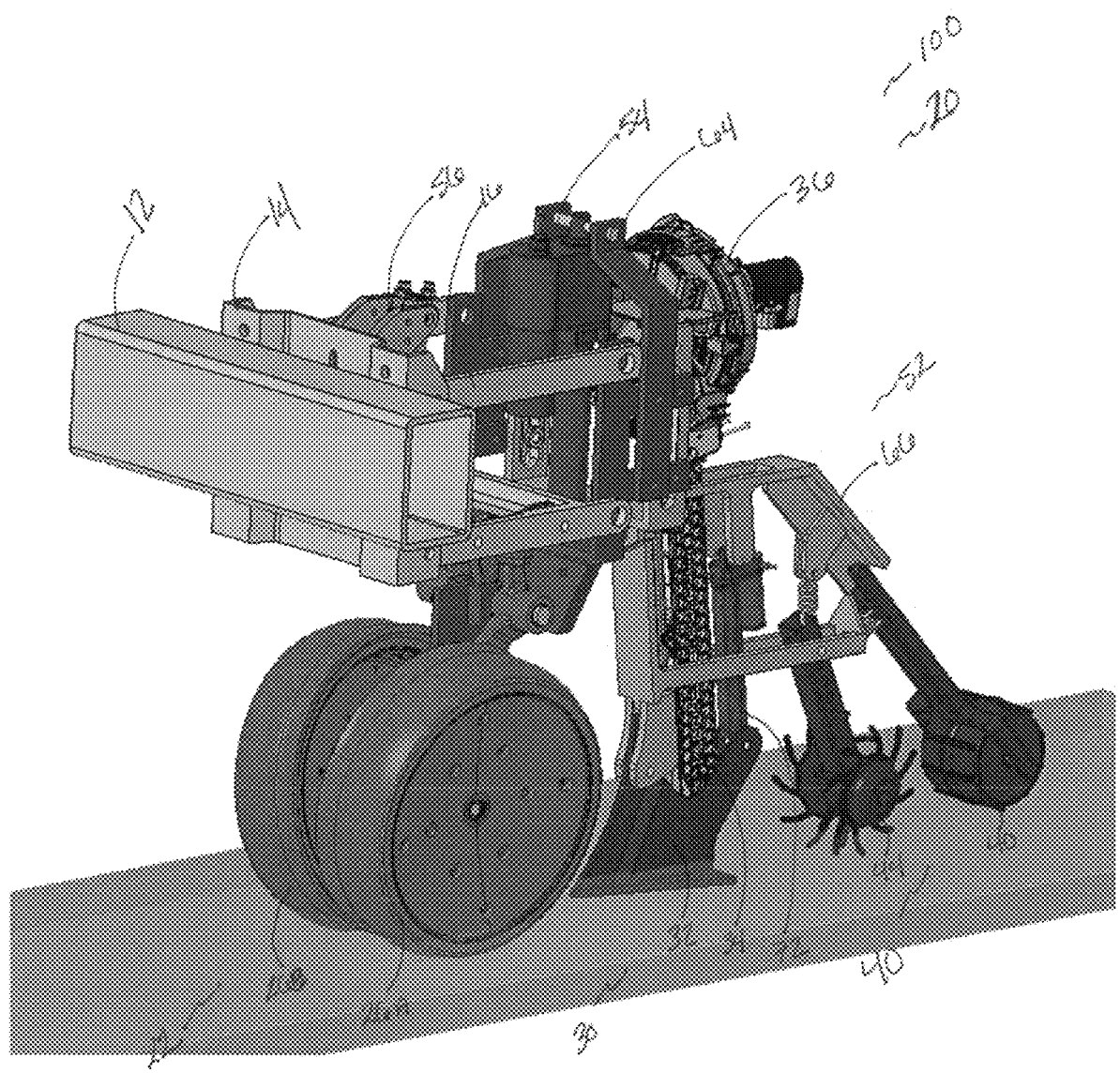
FIG. 4 is a front, side perspective view of a row unit, according to one implementation.
Figure 5:
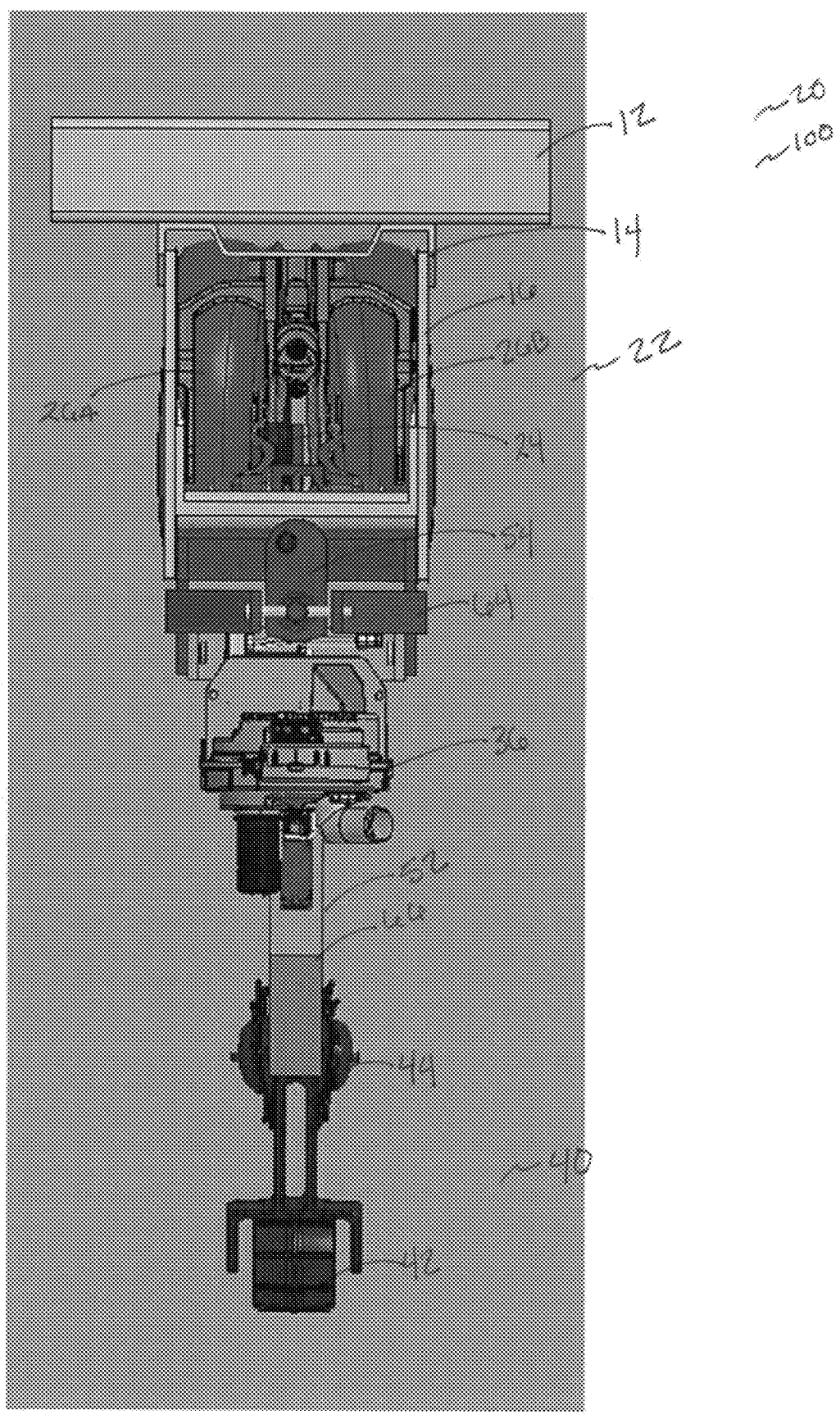
FIG. 5 is a top view of a row unit, according to one implementation.
Figure 6:
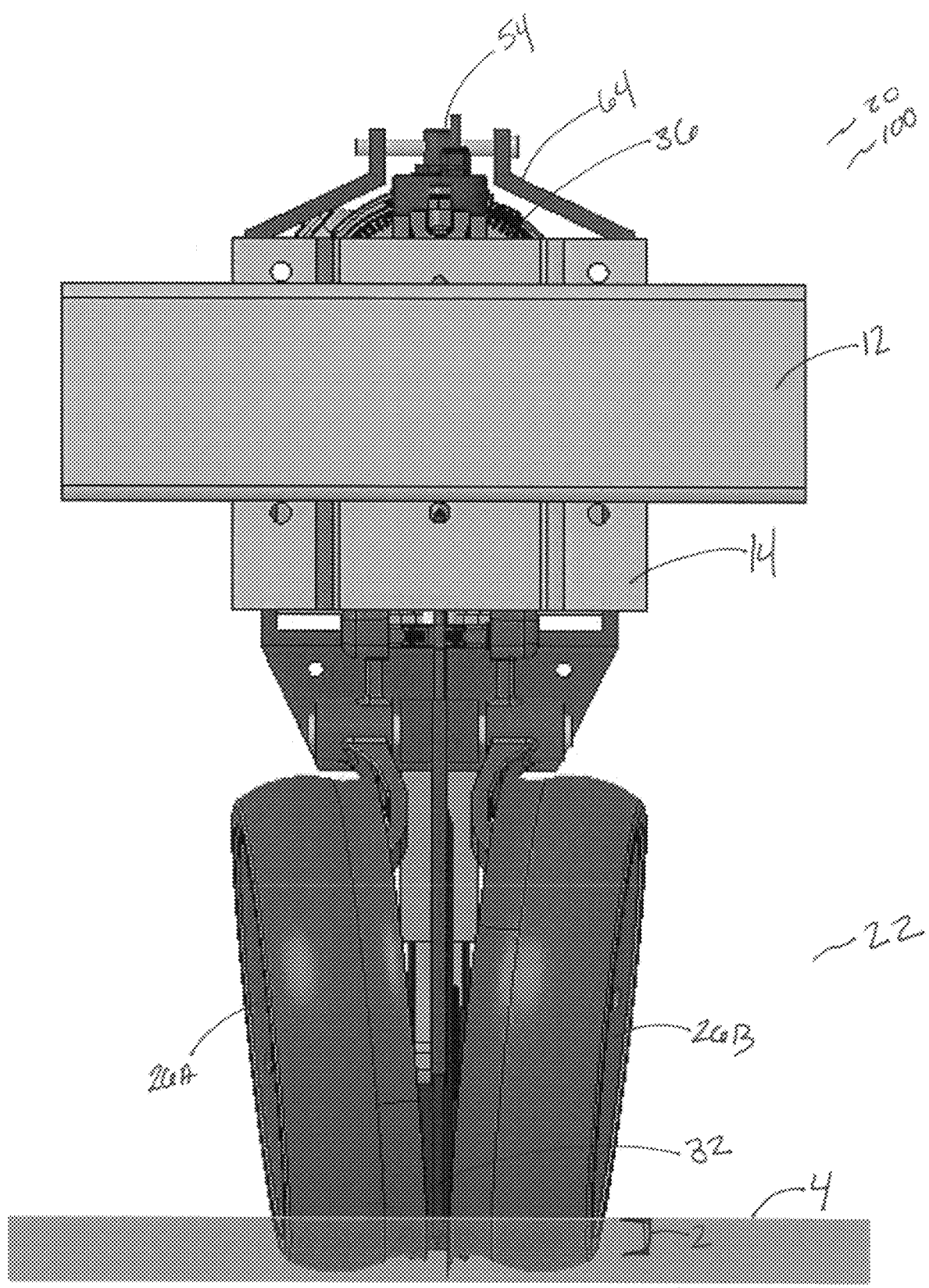
FIG. 6 is a front view of a row unit, according to one implementation.
Figure 7:
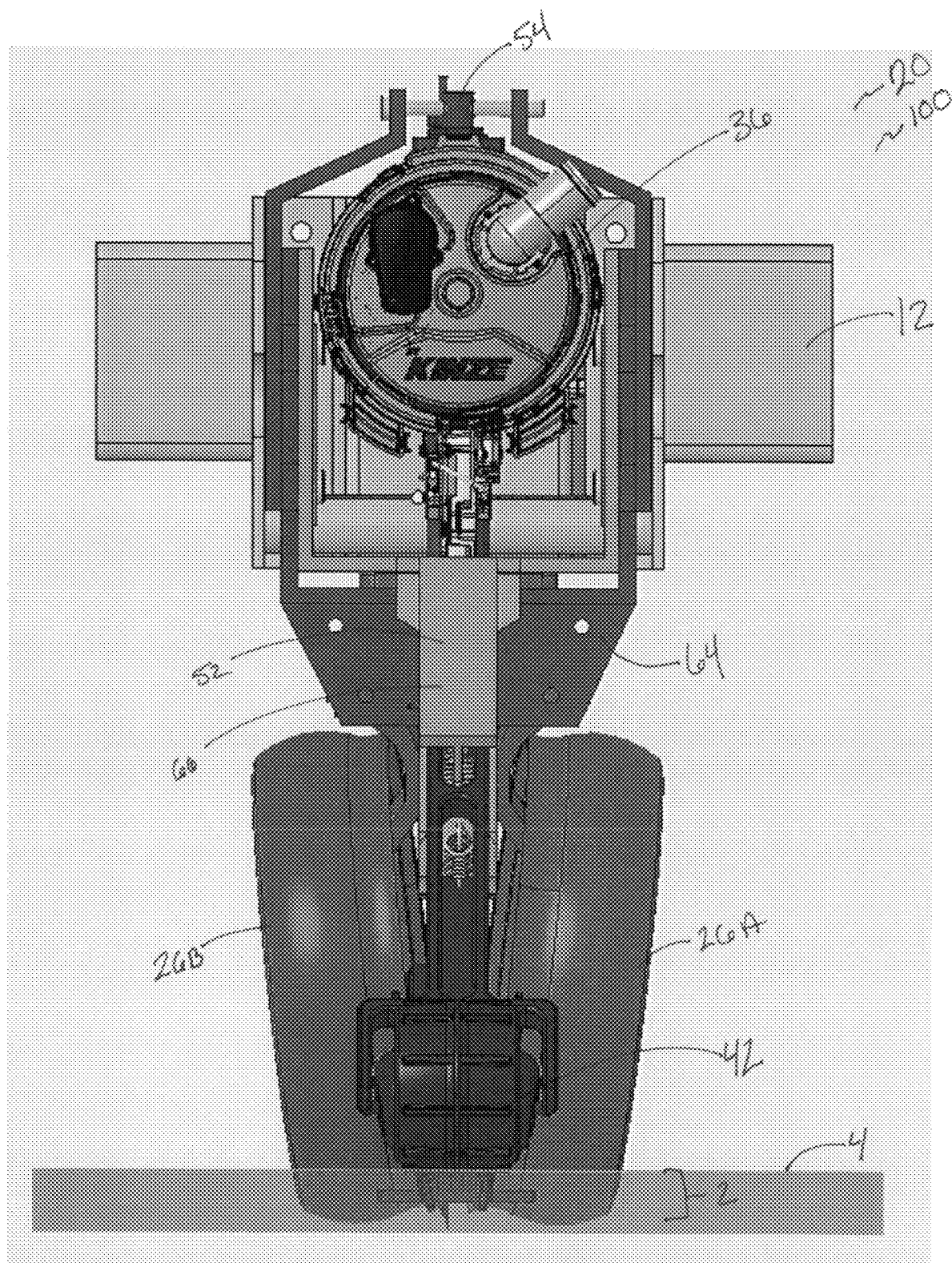
FIG. 7 is a rear view of a row unit, according to one implementation.
Figure 8A:
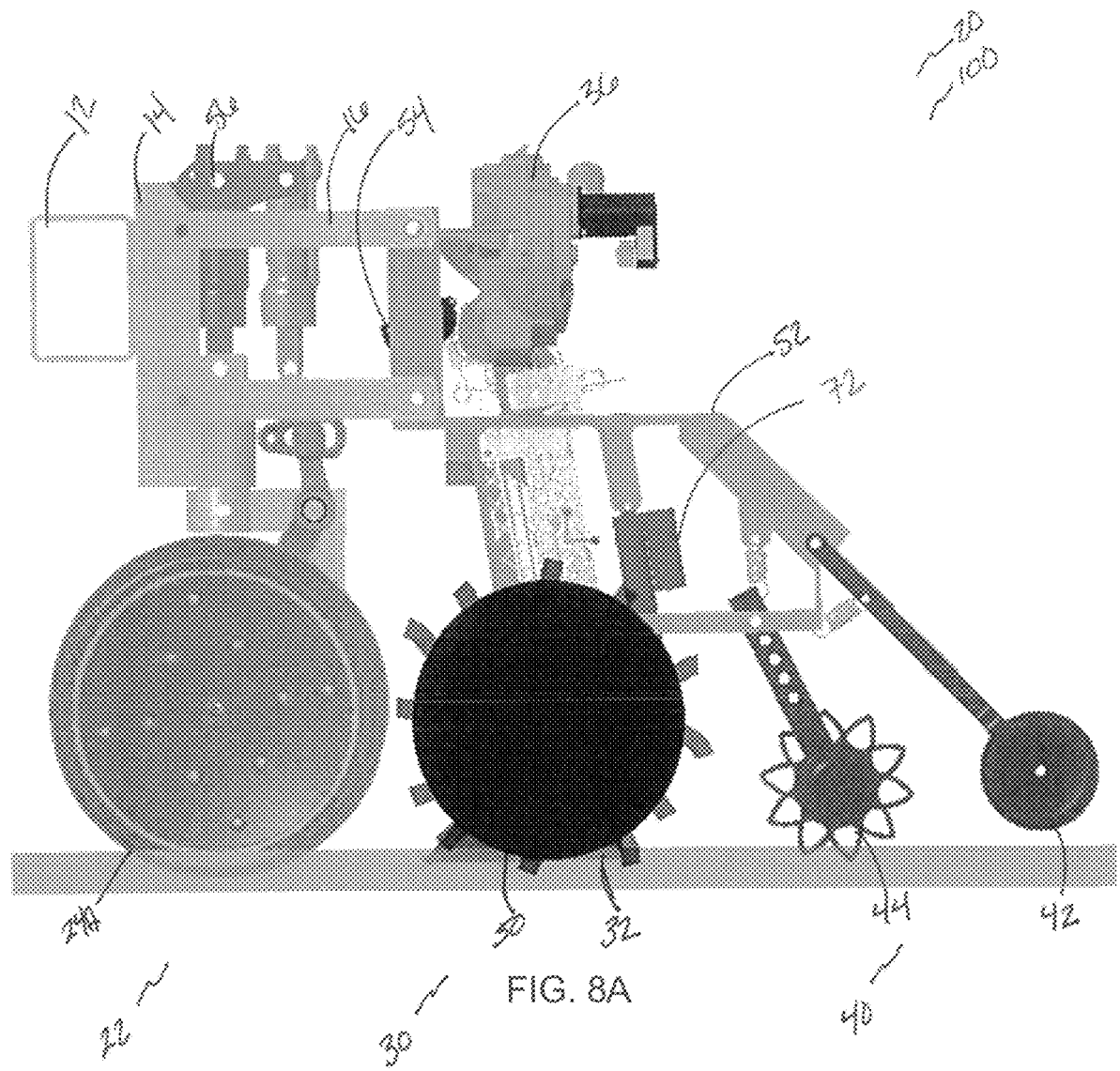
FIG. 8A is a side view of a row unit having a residue clearing device, according to one implementation.
Figure 8B:
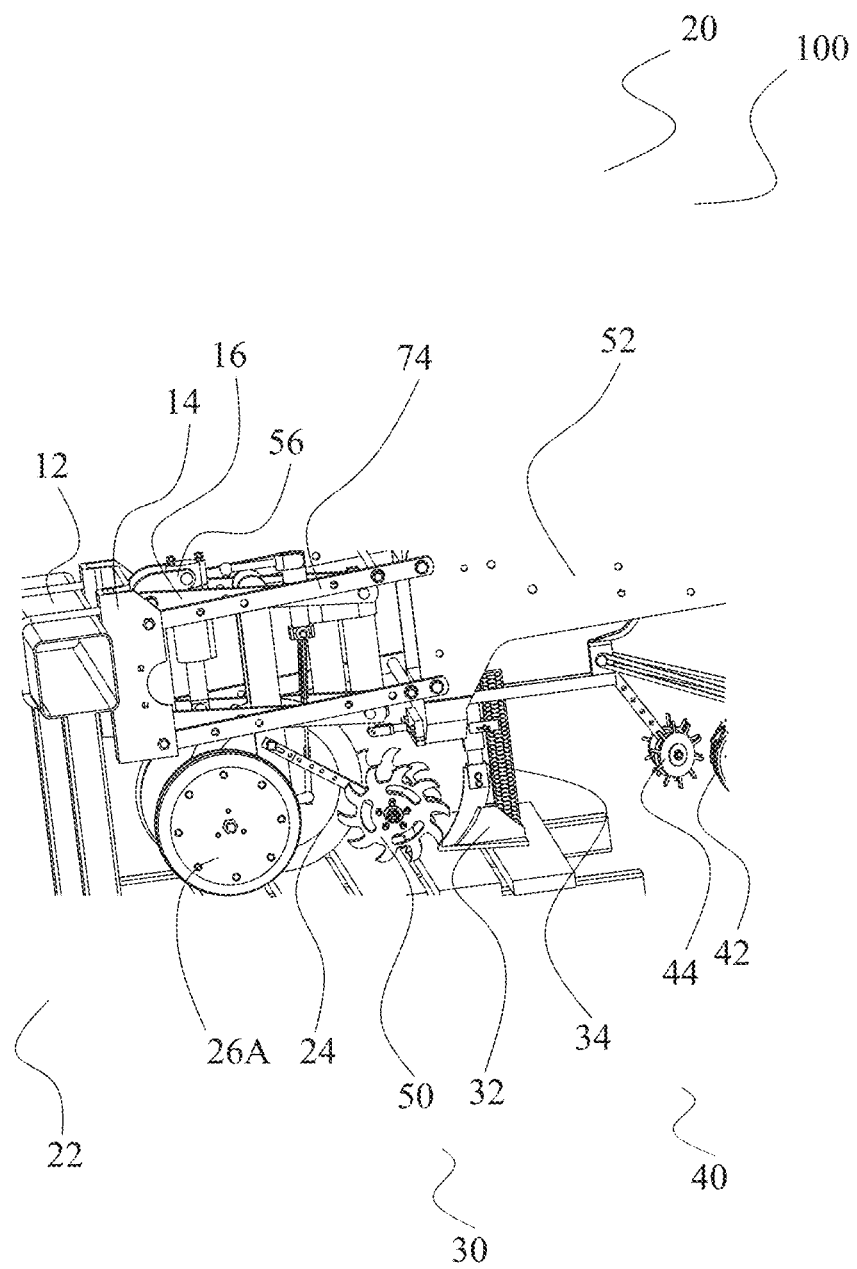
FIG. 8B is a side view of a row unit having a residue clearing device, according to one implementation.
Figure 8C:
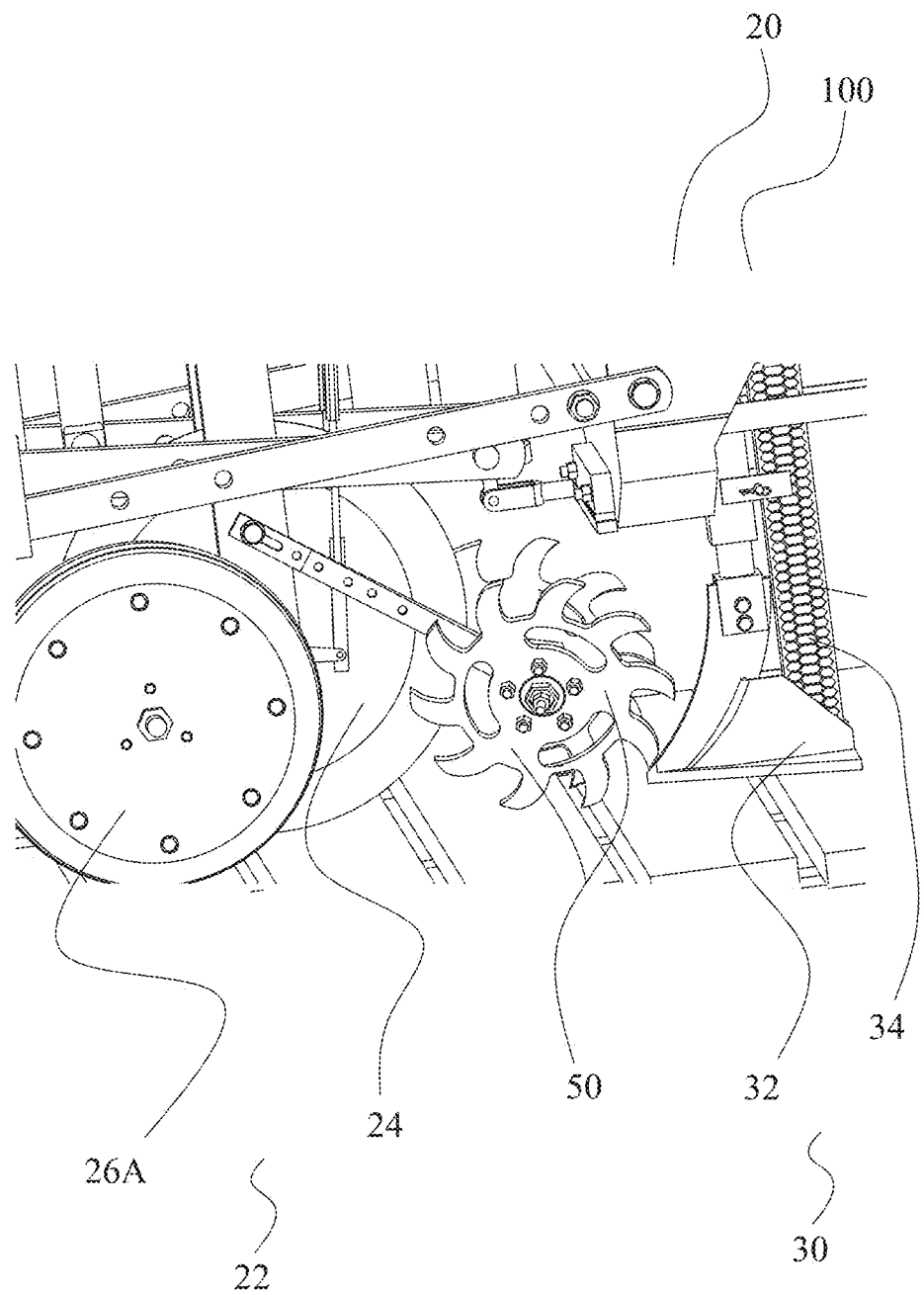
FIG. 8C is a close up view of a row unit having a residue clearing device, according to one implementation.
Figure 8D:
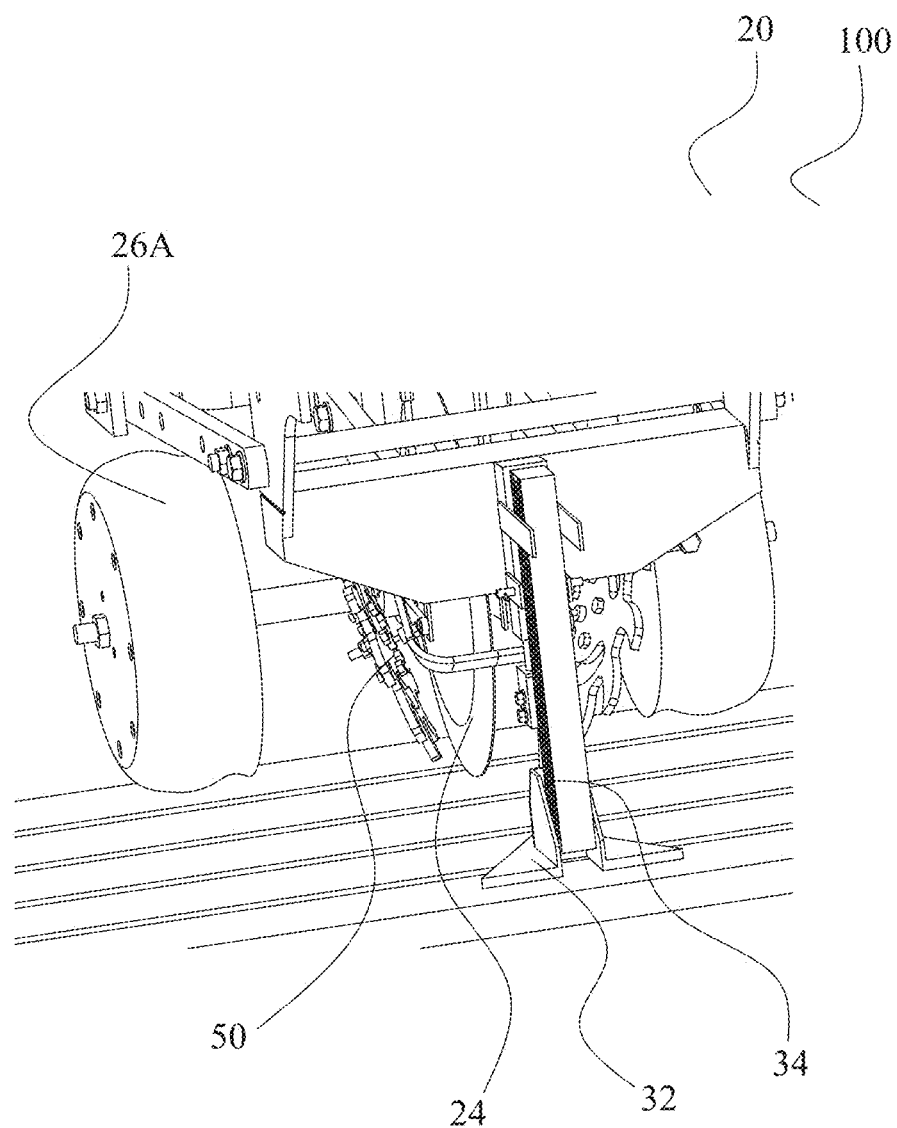
FIG. 8D is a rear perspective view of a row unit having a residue clearing device, according to one implementation.
Figure 8E:
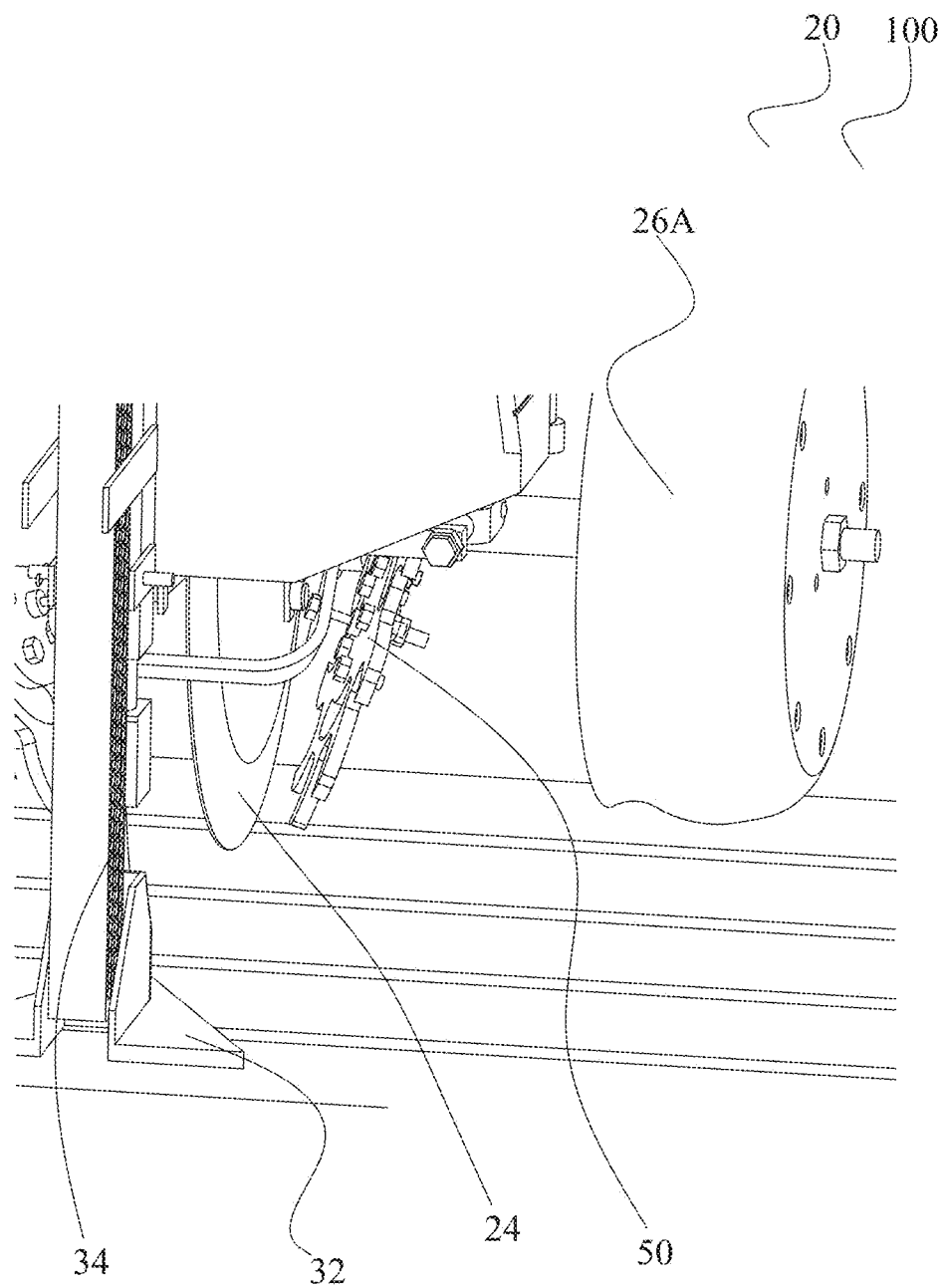
FIG. 8E is a rear perspective view of a row unit having a residue clearing device, according to one implementation.
Figure 8F:
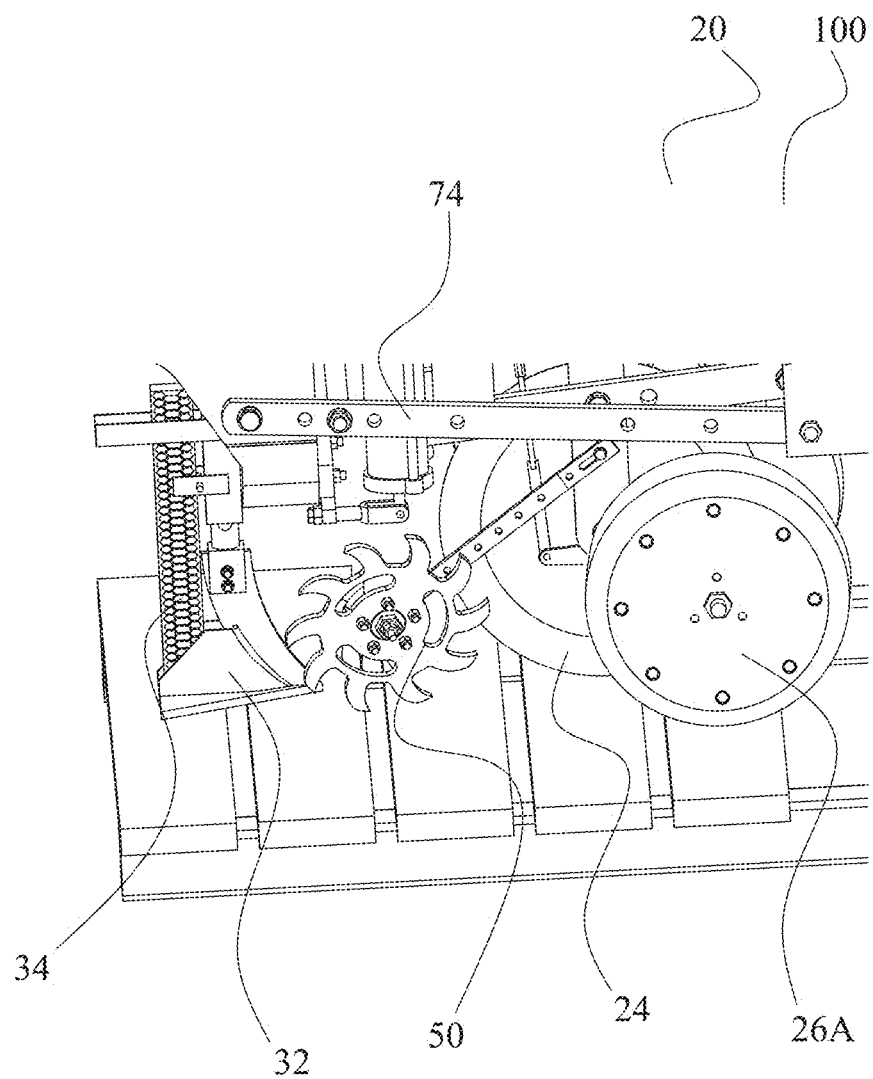
FIG. 8F is a side view of a row unit having a residue clearing device, according to one implementation.
Figure 9:
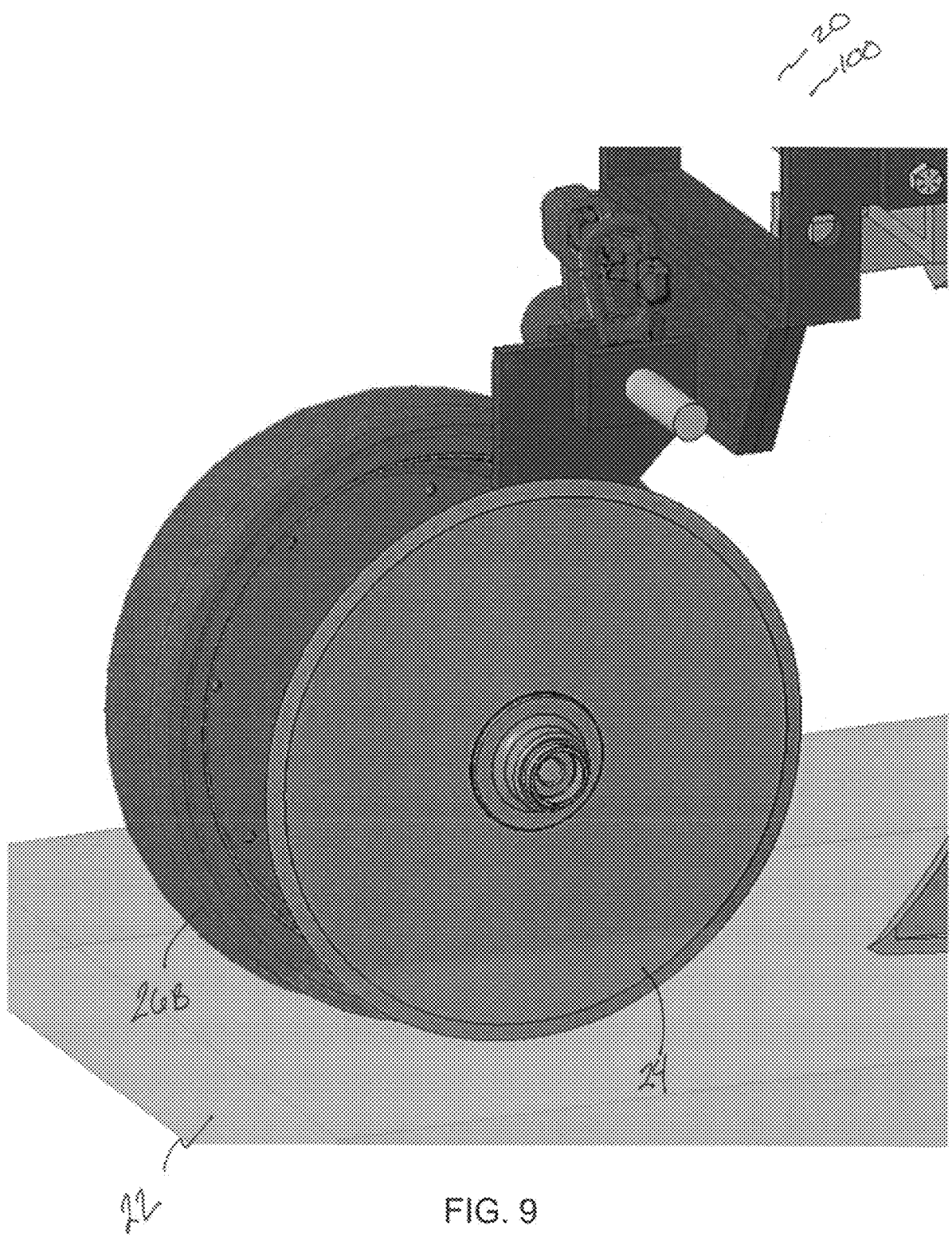
FIG. 9 is a front, side perspective view of a coulter assembly, according to one implementation.
Figure 10:
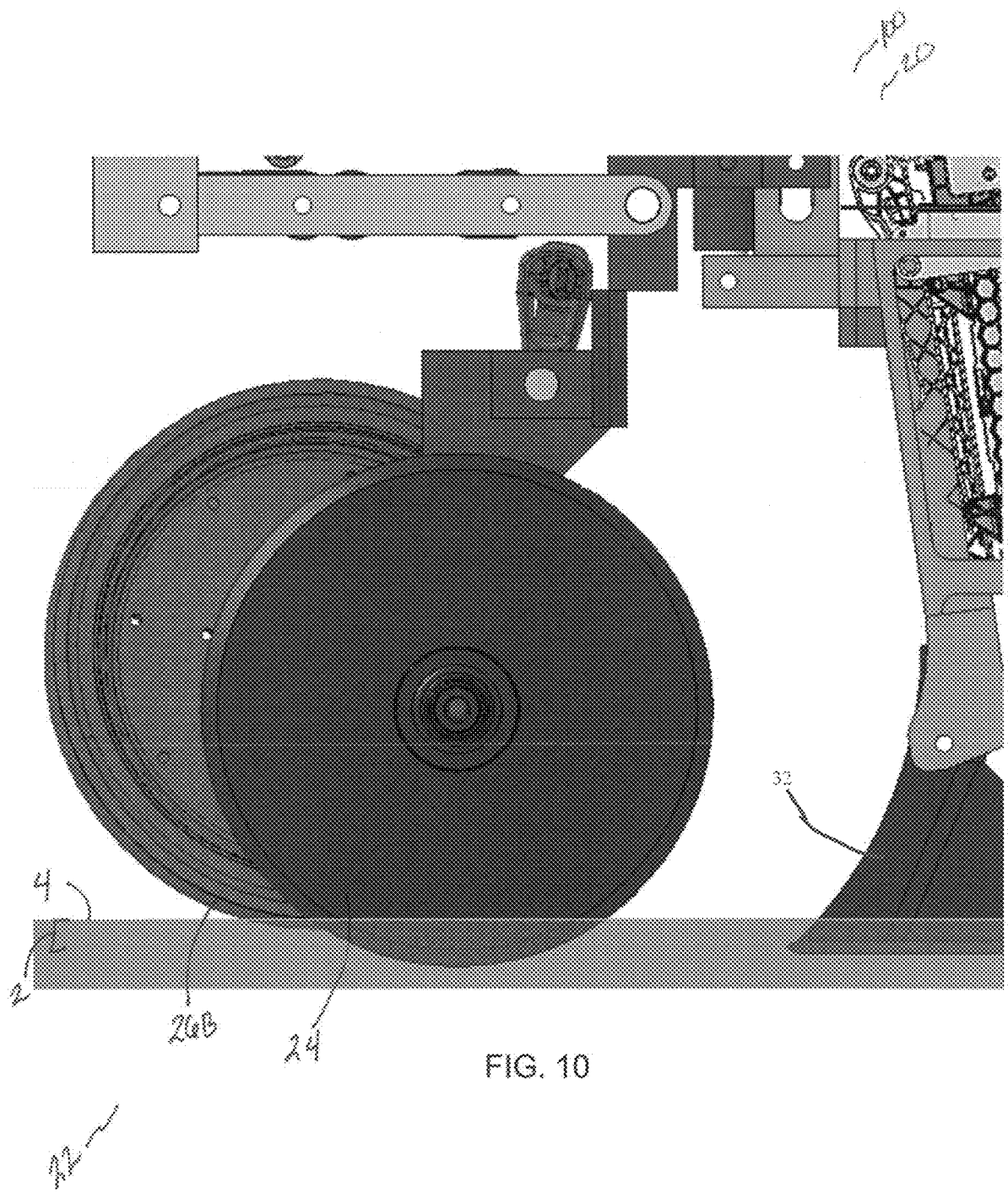
FIG. 10 is a side view of a coulter assembly, according to one implementation.
Figure 11:
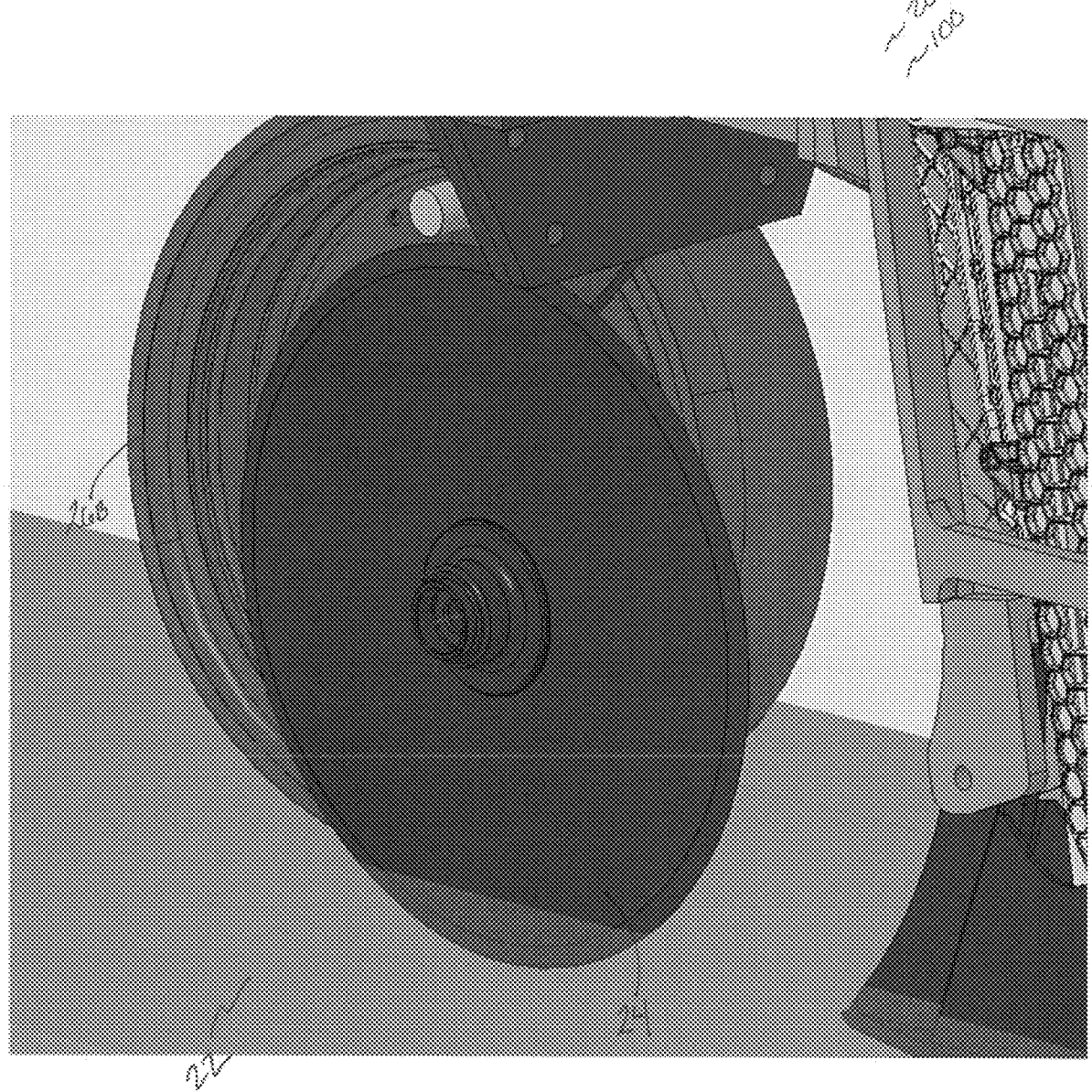
FIG. 11 is a rear, side perspective view of a coulter assembly, according to one implementation.
Figure 12:
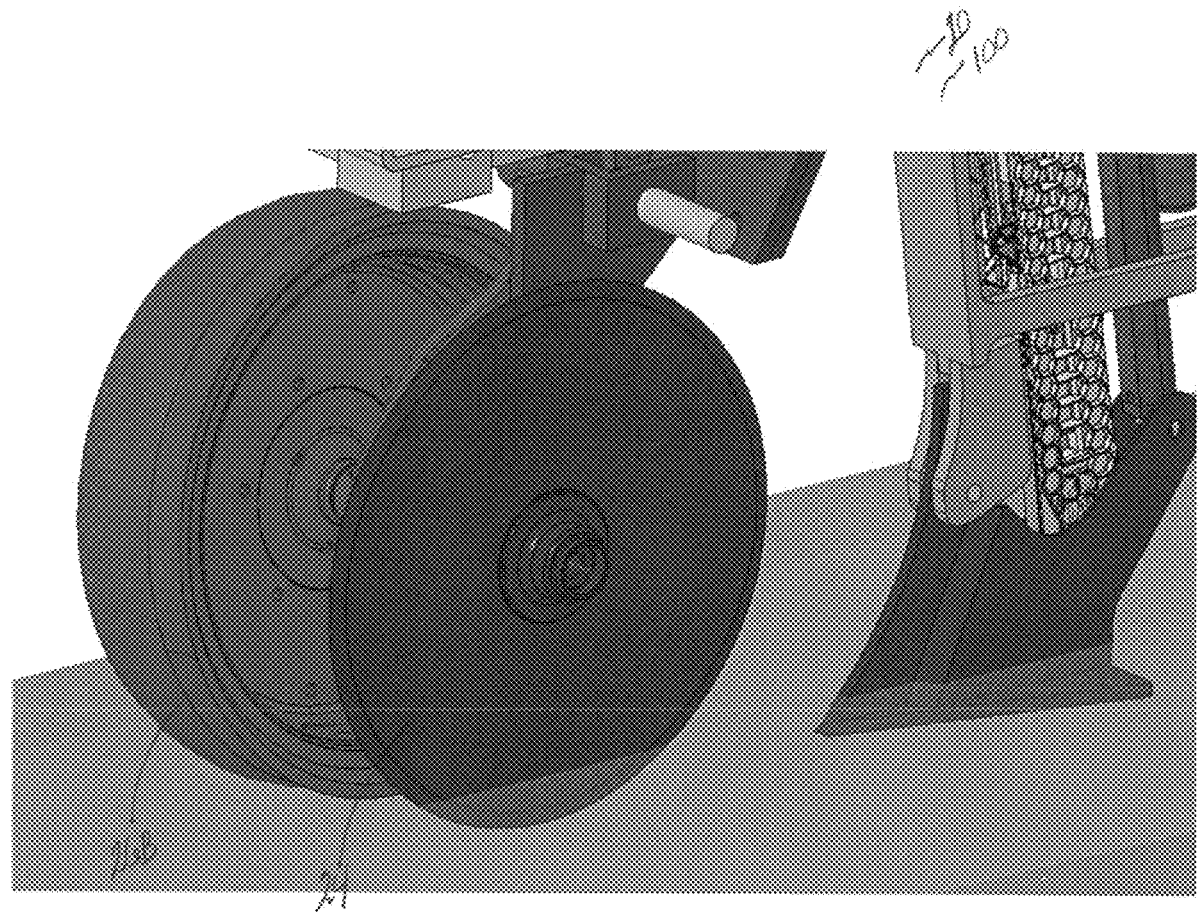
FIG. 12 is a perspective view of a coulter assembly, according to one implementation.

In certain implementations, the closing assembly 40 can be attached to the row unit 20 much like current art design, shown for example in FIG. 2. Because the depth of the seed channel is maintained by the position of the soil engaging assembly 30/sweep 32, in the currently disclosed implementations, and not force, the uplift forces created by the downforce applied to the closing assembly 40 do not require an opposing force to be applied. In these implementations, the downforce actuator 56 must be of sufficient load capacity to withstand all the forces reacting to it.

Various implementations of the row unit 20 incorporate an optional residue clearing device 50 (shown in FIGS. 8A-F) into the row unit 20. As would be appreciated, it can be desirable to remove a narrow strip of field debris in the path of the to be planted row. The removal/movement of field debris can aid in seed germination and emergence by allowing the soil to absorb warmth from the sun and preventing obstructions from blocking emergence of the plant. Further, the removal of debris also prevents the field residue from being pushed into the seed channel 2 or over the planted seed by the closing assembly 40 and obstructing plant growth. Residue in, near, or on the seed channel 2 can lead to poor germination and emergence due to poor seed to soil contact and because the residue can block the growth of the young plant, as would be understood. Field residue can include the remains of previous crops harvested, rocks, weeds, and other items as would be appreciated.

Most current art residue clearing devices and row cleaners are mounted in front of a row unit to remove the residue ahead of the gauge wheels. In prior known row units, there is typically no method of accurate depth control used and the residue clearing wheels/row cleaners usually rely on their own weight to apply sufficient downforce to engage and clear any residue encountered. Other types of known residue clearing devices are mounted rigidly to the planting row unit and use the row unit travel to gauge operating position.

There are several drawbacks with current art residue clearing devices. For example, these known row clearing devices can gouge into the soil creating a valley ahead of the planter unit, and a heavy rain can wash down this valley resulting in lost seeds and erosion. Further, these prior known devices for cleaning residue can bounce and miss some of the residue resulting in lost yield potential or long pieces of residue that may not be moved far enough in the encounter with the row cleaner to remove the residue from the planting path.

Certain implementations of the disclosed row unit 20 seek to address these issues. In the disclosed implementations, such as that of FIGS. 2-8F, a row cleaner 44 is optionally included as part of the closing assembly 40 and configured to clear residue before closing of the seed channel 2 but after the seed has been placed.

In various implementations, a residue clearing device 50 is located behind the gauge wheels 26A, 26B and coulter 24, ahead and aside of the soil engaging assembly 30. Residue is held down and cut by the coulter assembly 22, as described above. The residue clearing device 50, such as a spoked wheel 50, can roll the residue material over and away from the seed channel 2 so a clear soil path is created and no residue remains to be compressed into the seed channel 2 by the closing assembly 40. In certain implementations, the residue clearing device 50 is located along side or adjacent to the sweep 32. In certain implementations, the residue clearing device 50 include two wheels 50, one on each side of the row unit 20.

In an alternative implementation, the residue clearing device 50 can be attached to the coulter assembly 22. This arrangement provides both depth control and a firm attachment, so there is no opportunity for the residue clearing device 50 to pass over residue.

In an alternative implementation, the residue clearing device 50 is attached to the row unit frame 52. A depth control actuator 54 and the soil engaging assembly 30 will provide depth control for the residue clearing device 50. In implementations executing a variable planting depth method, as will be described further herein, the movement of soil and residue by the residue clearing device 50 will be beneficial in providing a consistent seed covering soil layer. This will result in consistent emergence resulting in improved yield potential.

In a further alternative implementation, the residue clearing device 50 is engaged with the soil engaging assembly 30, this configuration may also increase range of depths that a variable depth planting system may execute, as will be discussed further herein. In these implementations, the effectiveness of a moisture seeking seed channel depth control may be increased. It would be understood that in the disclosed implementations, the depth range of the seed channel can be extended because excess soil can be moved aside by the residue clearing device 50 resulting in a constant planting depth even when planting deeper relative to the original soil surface 4.

In a further implementation, the residue clearing device 50 is mounted with a dedicated depth position control actuator(s) (not shown) to provide the residue clearing device 50 with more precise and tunable control to accurately leave a constant depth of soil over the seed to promote simultaneous plant emergence.

Continuing with FIGS. 2-8F, various of the row unit 20 components discussed herein are mounted to directly or indirectly to a frame 52 that can comprise a variety of operationally coupled components that allow it to function as described while being drawn forward by an implement toolbar 12 and travel vertically relative to the toolbar 12 as the soil surface changes. It is appreciated that in various implementations, downforce on the row unit 20 and optionally the coulter 24 can be applied by a downforce actuator 56 at the parallel bars 16, as would be understood by those of skill in the art.

In use according to certain implementations, like those of FIGS. 2-8F, it is appreciated that since the coulter 24 is a vertical, narrow blade and is not forcing the soil into a V-shaped furrow, less downforce is required as the coulter 24 will not tend to ride out of the soil at faster than conventional travel speeds to the same degree as known opening discs that create a V-shaped furrow. The positioning of the gauge wheels 26A, 26B aid the function of the coulter 24 by holding residue and plant growth firmly so the coulter 24 can cut through the soil as the row unit 20 is drawn forward. This creates a clear, unobstructed path for a soil engaging assembly 30, including an optional sweep 32, to form a seed channel 2 without catching and dragging plant growth or subsoil obstructions, such as plant roots or other matter, as would be appreciated.

Continuing with the implementations of FIG. 2-8F, the gauge wheels 26A, 26B contact the soil surface and form the reference point for seed depth control, as would be understood. In various implementations, a position sensor 68 in communication with the control system 100 measures the relative position of the gauge wheels 26A, 26B as compared to the toolbar 12. In various implementations, the sensor(s) 68 are rotary position sensors, although other sensor types are possible and contemplated herein. This sensor 68 information is then used to control the depth of the seed placement relative to the gauge wheel 26A, 26B soil contact, as would be appreciated. In one representative example, if the desired planting depth is 1.500 inches, the control system 100 maintains a planting depth that is always 1.500 inches below the soil contact of the gauge wheels 26A, 26B. As the gauge wheels 26A, 26B rise and fall relative to the toolbar 12, the planting depth control rises and falls accordingly maintaining a constant planting depth relative to the soil surface 4.

In these and other implementations, the gauge wheels 26A, 26B according to these implementations are attached to the frame 52 at a mounting frame 64 which is in turn attached to the toolbar 12 via the set of parallel arms 16. In these implementations, the mounting frame 64 is in operational communication with a slide frame 66 via the depth control actuator 54. In the implementations of FIGS. 2-8F, there is therefore the ability of a cascading or tandem application of downforce via the downforce actuator 56 and depth control actuator 54 such that the coulter 24 and sweep 32 can have differing amounts of downforce applied, as would be appreciated. That is, in certain implementations, a defined first amount of downforce is applied to the mounting frame 64 by the downforce actuator 56 and a second amount of downforce is applied to the slide frame 66 via the depth control actuator 54 which in turn urges the soil engaging assembly 30 and sweep 32 to the desired depth.

In certain of these and other implementations, the sweep 32 depth is also determined by an offset value entered by the operator or by a sensor 58, such as a linear position sensor 58. In various implementations the linear positions sensor 58 is a part of the depth control actuator 54, but in alternative implementations it is an independent component of the row unit 20. The depth control actuator 54 extends or retracts to force the sweep 32 deeper if needed or to raise it shallower if needed, respectively. As would be appreciated, the gauge wheels 26A, 26B therefore provide individual row initial depth control and individual row feedback for subsequent soil engaging assembly 30 depth control. The gauge wheels 26A, 26B are attached to the row unit 20 in direct communication with the trailing pivot of the row unit parallel arms 16. A change in soil elevation directly affects the gauge wheels 26A, 2B, which in turn directly affects the movement of the parallel arms 16. Sensors 68 monitoring the parallel arm 16 position are used as an input to the control system 100 that maintains the planting depth, as will be described further herein.

Further, in various implementations, the depth control actuator 54 will at times push the sweep 32 deeper or limit the rate that the sweep 32 can achieve the desired planting depth. The depth control actuator 54 may encourage depth change or it may limit the rate of depth change as needed.

FIGS. 9-12 depict various close-up views of the coulter assembly 22 with a coulter 24 and gauge wheel 26A/26B. In these figures, the coulter 24 is at depth, penetrating the soil, this depth in various implementations equals or exceeds the depth of the sweep 32 (shown and described variously herein).

That is, the coulter 24, according to certain implementations, can be set to penetrate the soil to a depth that is deeper than the sweep 32 or the depth that seeds will be planted to ensure that all potential obstructions are removed. In certain implementations, the sweep 32 that opens the seed channel 2 will close any trench or opening created by the coulter 24 below the planting depth as the sweep 32 passes through the soil. It is appreciated that such implementations can prevent erratic seed depth placement.

Figure 13:
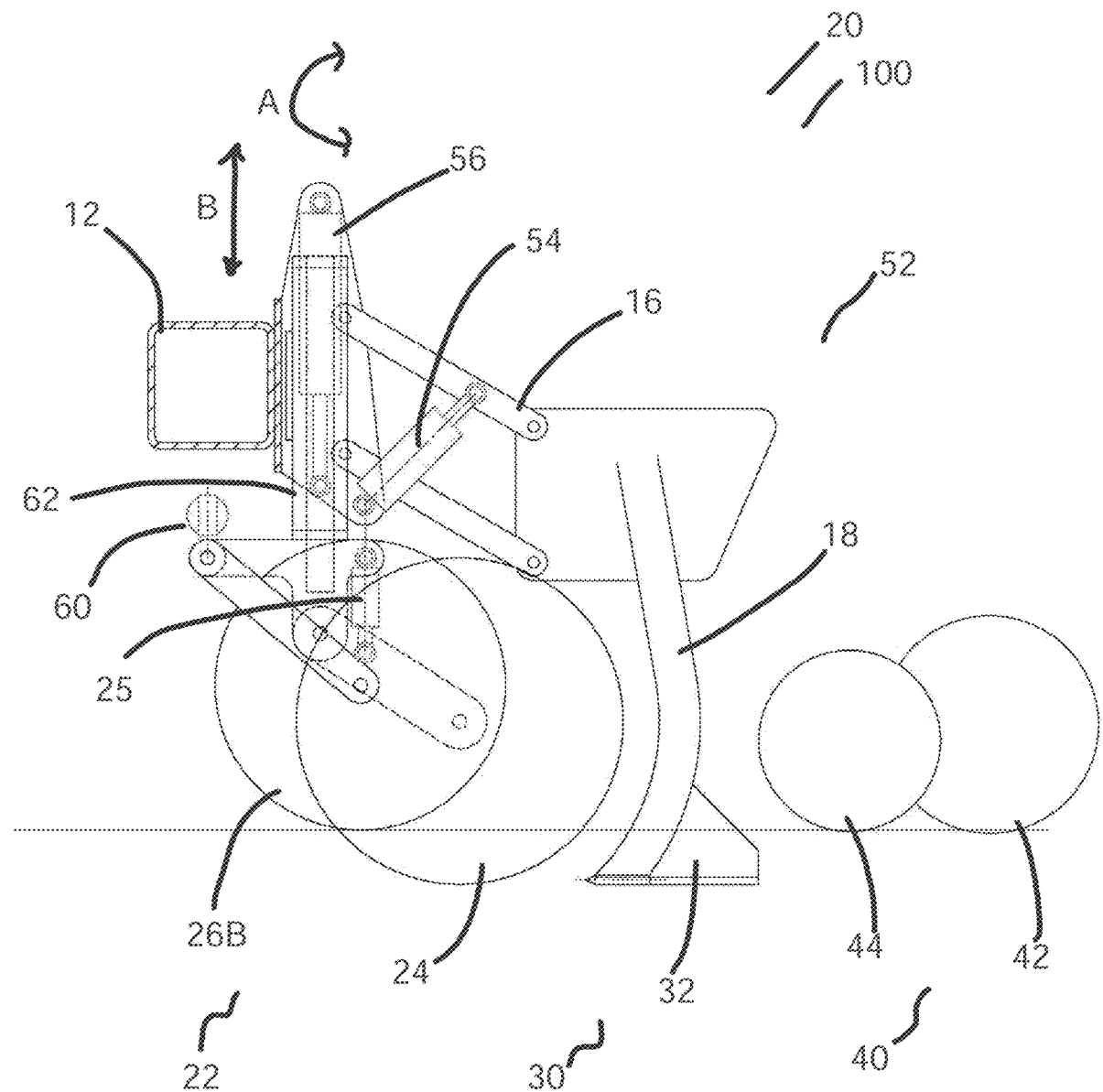
FIG. 13 is a side schematic view of a row unit, according to one implementation.
Figure 14:
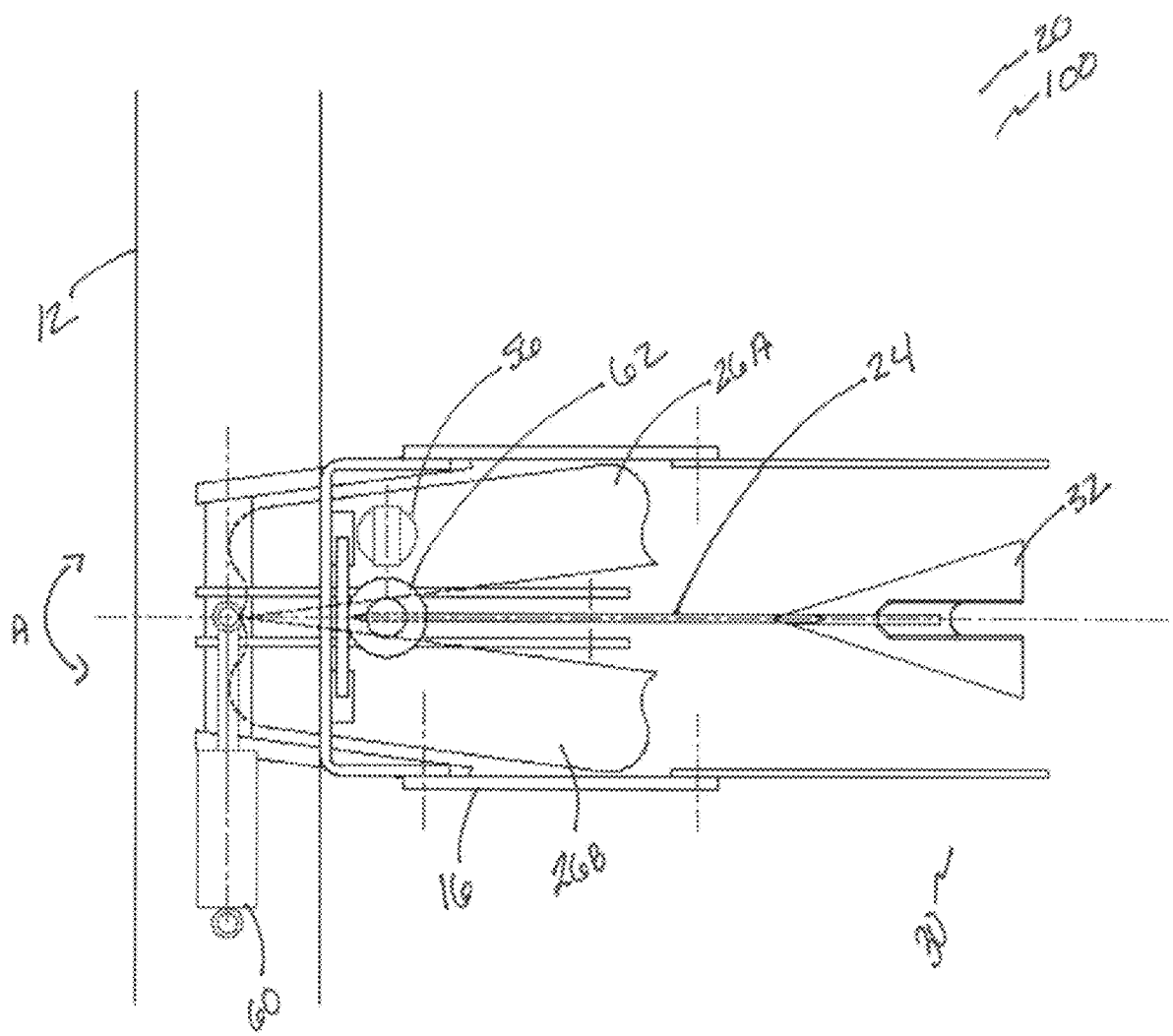
FIG. 14 is a top schematic view of a row unit traveling in a straight line, according to one implementation.
Figure 15:
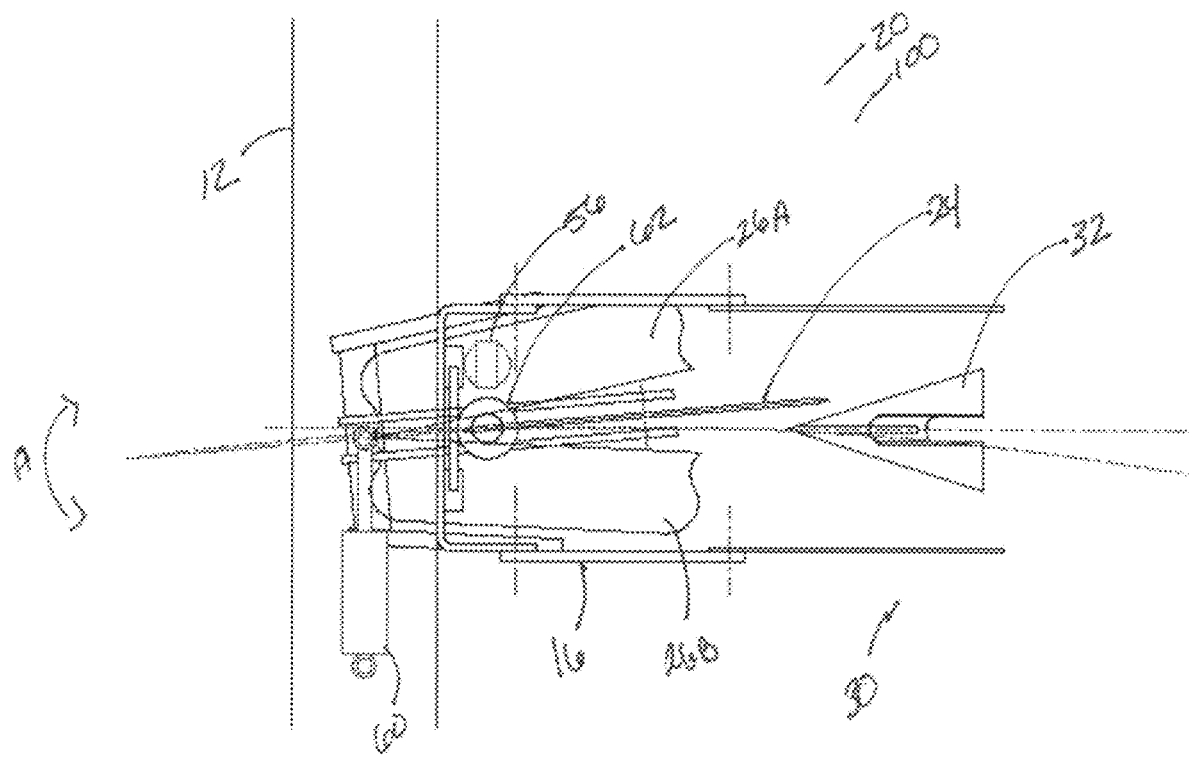
FIG. 15 is a top schematic view of a row unit traveling about a turn, according to one implementation.

Turning to the implementations of FIGS. 13-15, in these and other implementations of the row unit 20, the coulter 24 is steerable. That is, the coulter 24 can be rotated about an axis—a yaw rotation, the direction of reference arrow A—so as to better track with the planting line as the row unit 20 moves through the field. That is, in certain implementations, the coulter 24 can be urged about the z-axis, such as via one or more actuators, such as steering actuator 60, to adjust the heading of the coulter 24 and account for the ground conditions and any change in heading of the tractor (shown at 6 in FIG. 1). Such coulter 24 movement can be implemented via a control system 100, or associated subsystem. Further, various implementations of the row unit 20 and steerable coulter 24 can be used in conjunction with the steerable toolbar 12 disclosed in co-pending U.S. application Ser. No. 16/997,361, which is incorporated herein for all purposes.

As shown in FIGS. 13-15, the coulter assembly 22 attaches to a vertical shaft 62. The coulter assembly 22 is rotatably engaged with the vertical shaft 62, such that the coulter assembly 22 can rotate about a vertical axis, in the direction of reference arrow A, and move vertically relative to the toolbar 12, in the direction of reference arrow B, actuated by the downforce actuator 56. In these implementations, the operating depth of the coulter 24 is determined by the gauge wheels 26A, 26B and the downforce applied by the downforce actuator 56. The rotated position of the coulter assembly 12 is controlled by the steering actuator 60.

In these and other implementations, the planting frame 52 and all its associated components attach to parallel arms 16. Depth control of the sweep 32 and soil engaging assembly 30 is maintained by a depth control actuator 54, shown in FIG. 13. By attaching the planting frame 52 to parallel arms 16 the sweep 32 moves in an arc shaped path, when actuated by the depth control actuator 54. This allows the planting sweep 32 to maintain clearance from the coulter 24 as the sweep 32 moves up and down, while remaining close to the coulter 24 at various elevations. It is appreciated that certain components of the other implementations disclosed herein can be utilized in these implementations, but are not shown or described for the sake of clarity.

It is appreciated that in certain of these implementations, the functions of the closing assembly 40, wheels 42 and/or cleaners 44 do not change from that which is understood.

FIG. 14 is a top-down view showing the orientation of components when the row unit 20 is drawn forward in a straight-line travel direction. FIG. 15 is a top-down view showing the orientation of components when the unit 20 is drawn forward in a turn. Actuation of the steering actuator 60 can be controlled by a number of methods and for a number of purposes. For example, if steering to match a turn, each coulter 24 would need to be turned to a unique turn radius. If steering to counteract side hill drift, all coulters 24 would turn equally. It is appreciated that in use according to certain implementations, only some of the row units 20 and/or coulters 24 may need to be steered to achieve adequate steering control.

Figure 16:
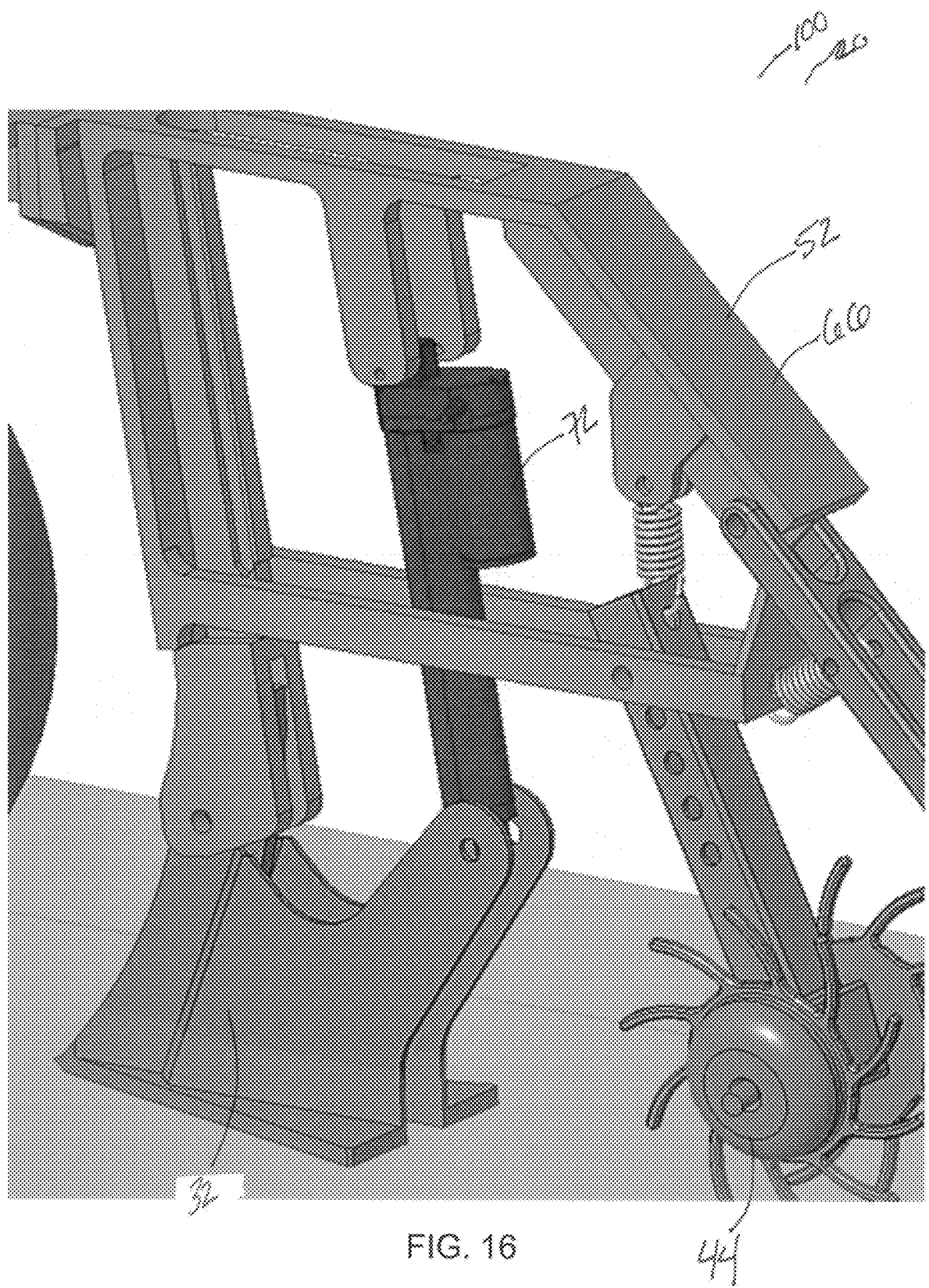
FIG. 16 is a rear perspective view of a soil engaging assembly, according to one implementation.
Figure 17:
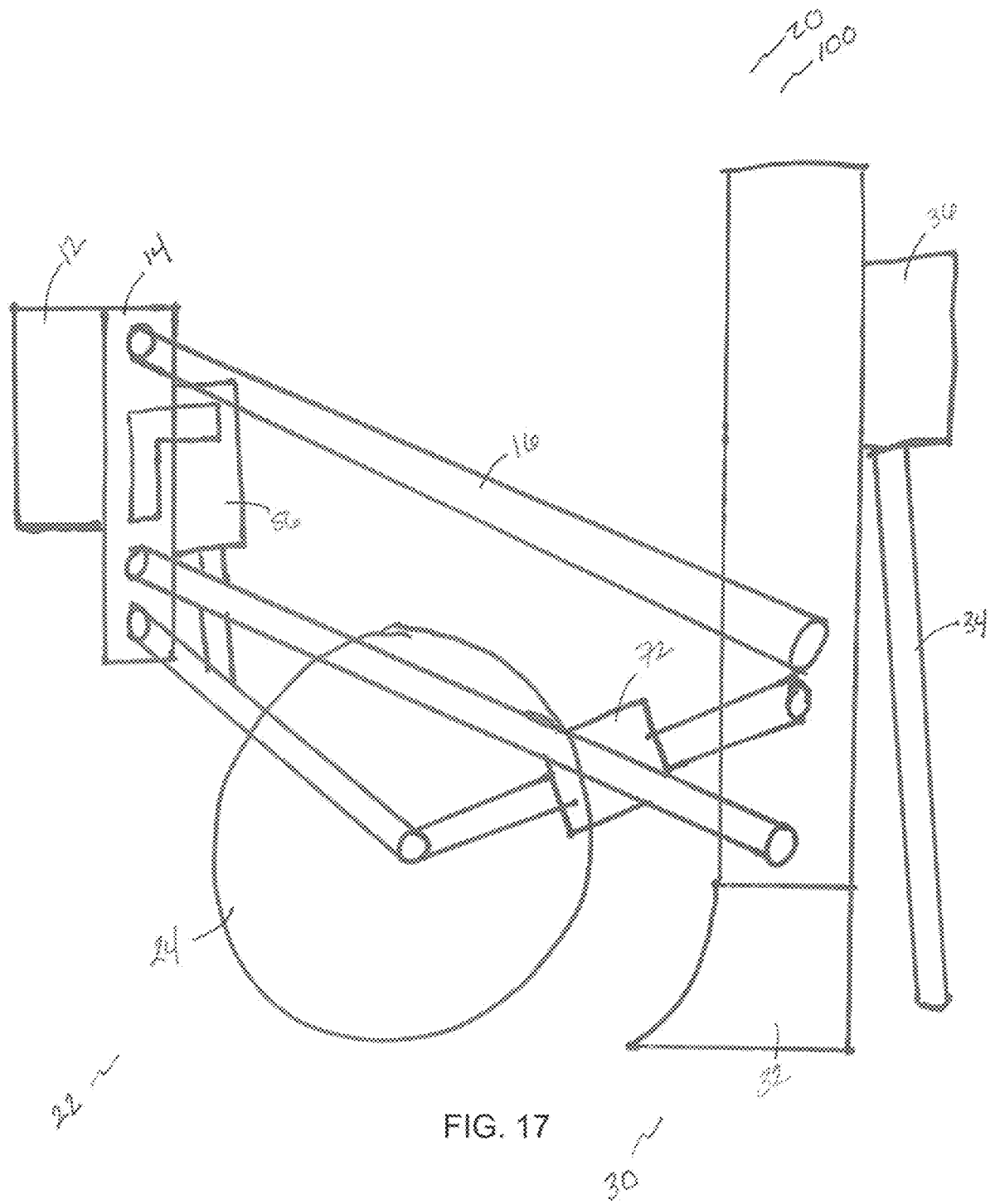
FIG. 17 is a side schematic view of a row unit, according to one implementation.

In various additional implementations, a variable pitch actuator 72, shown for example in FIGS. 16 and 17, causes the soil engaging assembly 30/sweep 32 to use the soil to encourage additional depth or to elevate against the soil. That is, the sweep 32 can have a separate control actuator 72 configured to pitch the sweep 32 up or down to cause it to draw into the soil or lift out of the soil to minimize compaction and downforce requirements, as would be appreciated. Further, the adjustable pitch of the sweep 32 can create increased or decreased down draft as needed. It would be further understood that this fore/aft pitching of the sweep 32, may also prevent compaction below the sweep 32.

In certain implementations, the adjustable pitch of the sweep 32 is controlled by the actuator 72 configured to increase the ability of the sweep 32 to penetrate the soil and track with the contour line created by the gauge wheels 26A, 26B, as is described in detail below. It is appreciated that at the beginning of a pass it would be desirable to have the sweep 32 at a steep downward angle (positive angle) to enable the seed planting depth to be quickly achieved with a minimum of applied downforce. The sweep 32 will then pull into the soil with forward motion of the implement, as would be appreciated.

It is further appreciated that while planting, the sweep 32 would pitch up (negative angle) as the soil contour line rises, run at a level position when there is no elevation change in the soil contour line, and pitch down (positive angle) when needed to follow a dropping soil contour line.

Additionally, if depth (offset) changes are required/desired during a pass the pitch of the soil engaging assembly 30, such as the sweep 32, may be adjusted via the actuator 72 to reach the new depth setting with a minimum of additional applied downforce.

Figure 18:
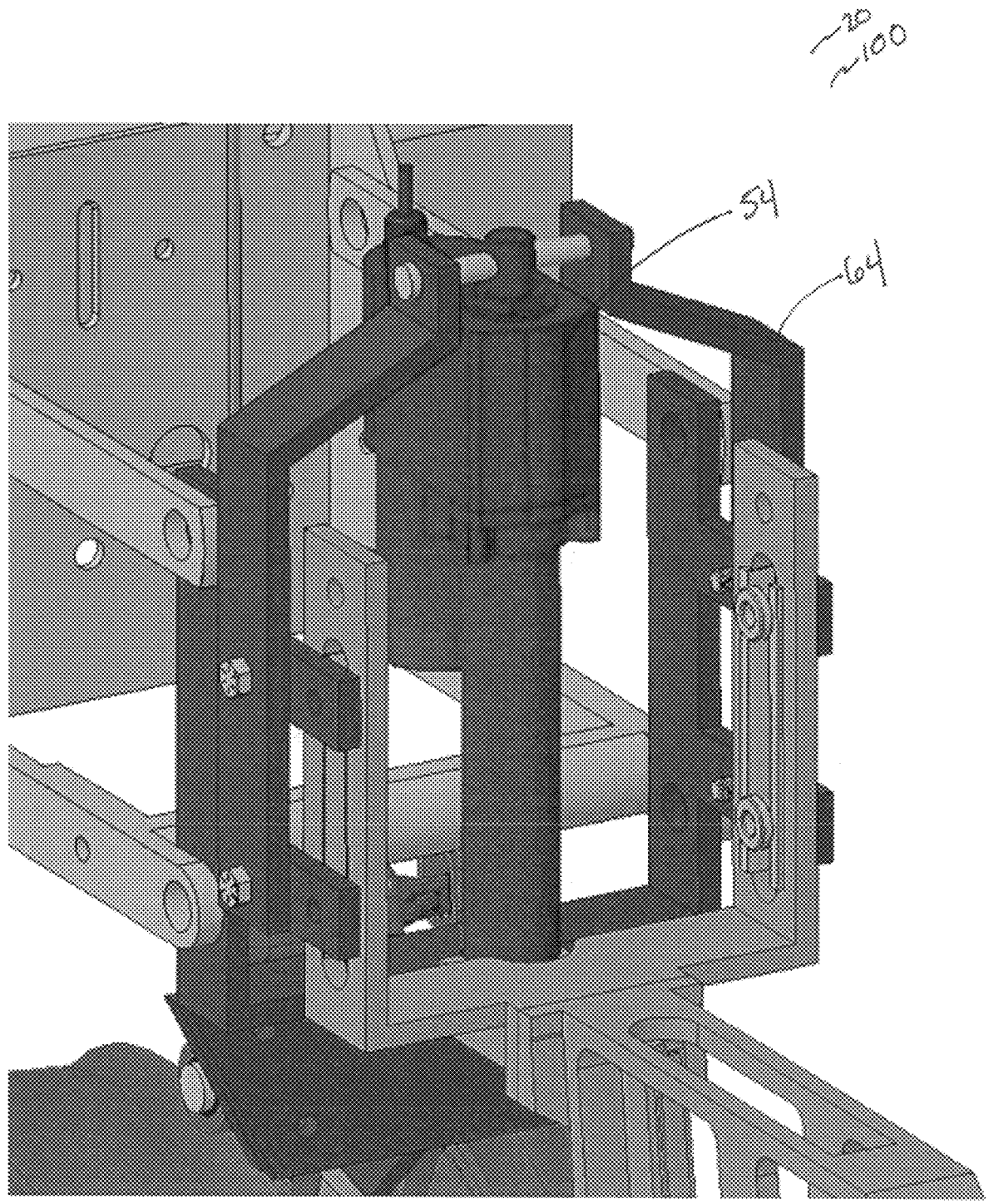
FIG. 18 is a rear perspective view of a depth control actuator, according to one implementation.

FIG. 18 shows an optional depth control actuator 54, described variously herein. The depth control actuator configured to apply downforce to the soil engaging assembly 30, sweep 32, slide frame 66, and/or row unit frame 52. In various implementations, the depth control actuator 54 is engaged with the mounting frame 64.

Figure 19:
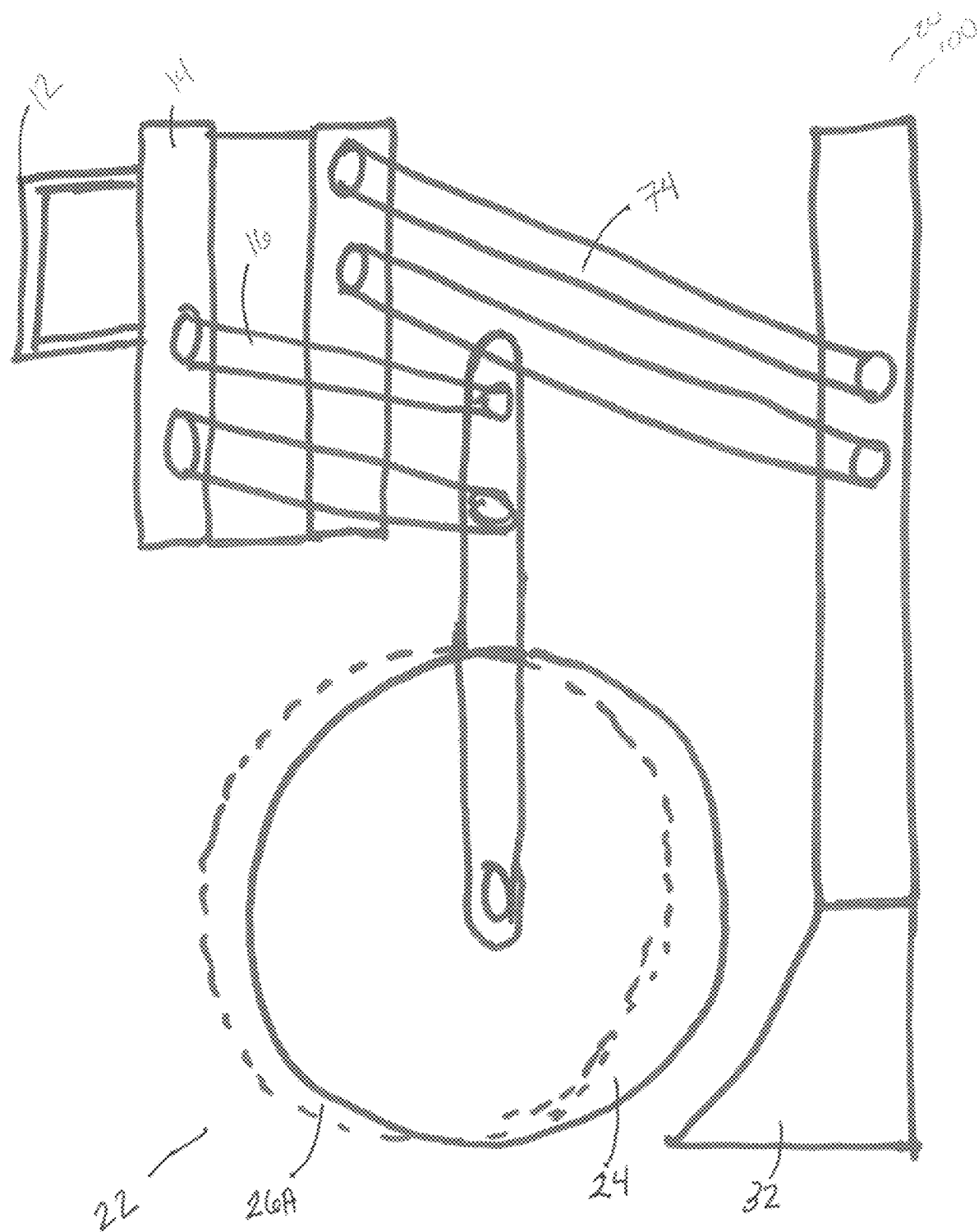
FIG. 19 is a side schematic view of a row unit having two sets of parallel bars, according to one implementation.
Figure 20:
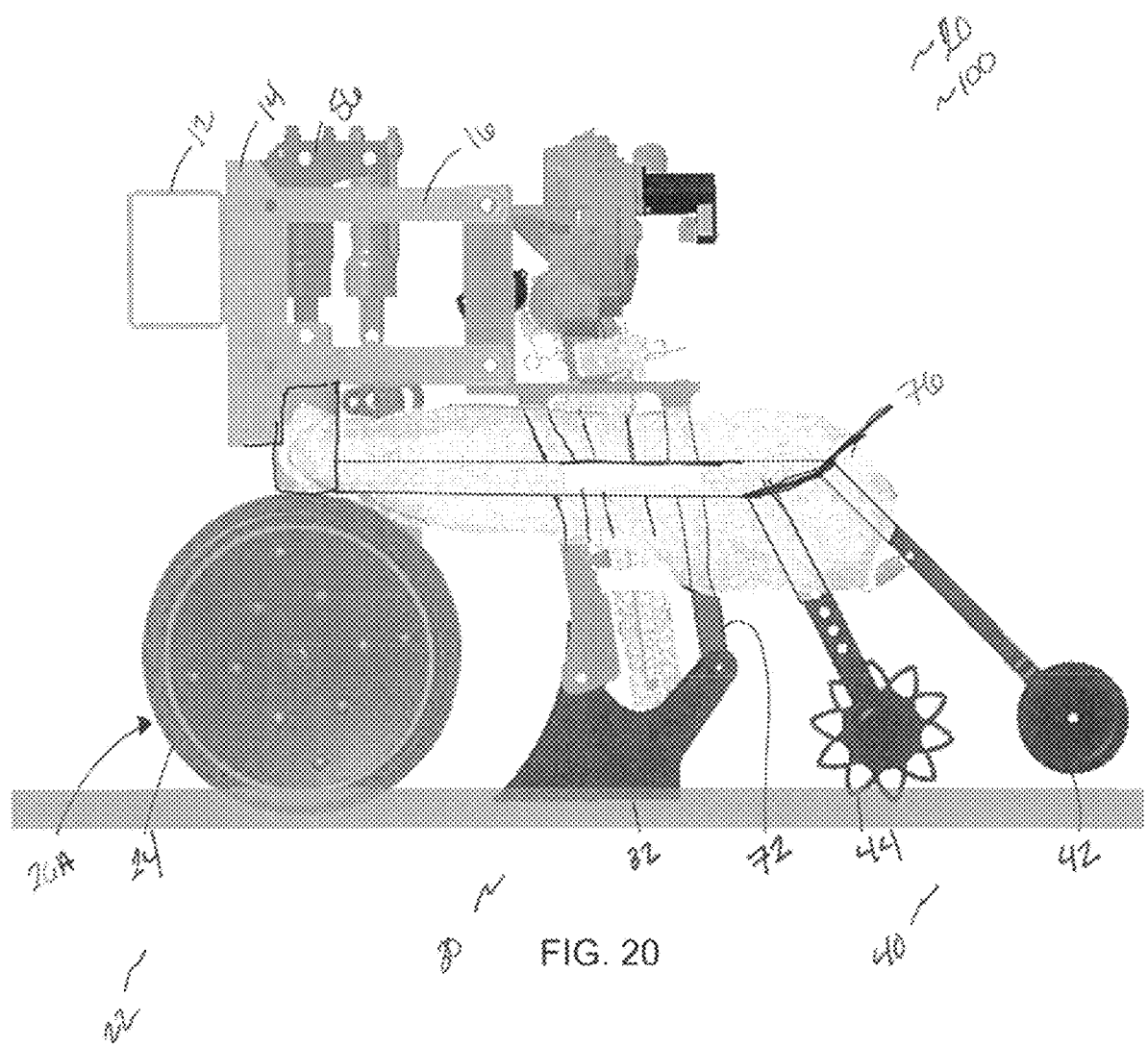
FIG. 20 is a side view of a row unit linking the coulter assembly and the closing assembly, according to one implementation.
Figure 21:
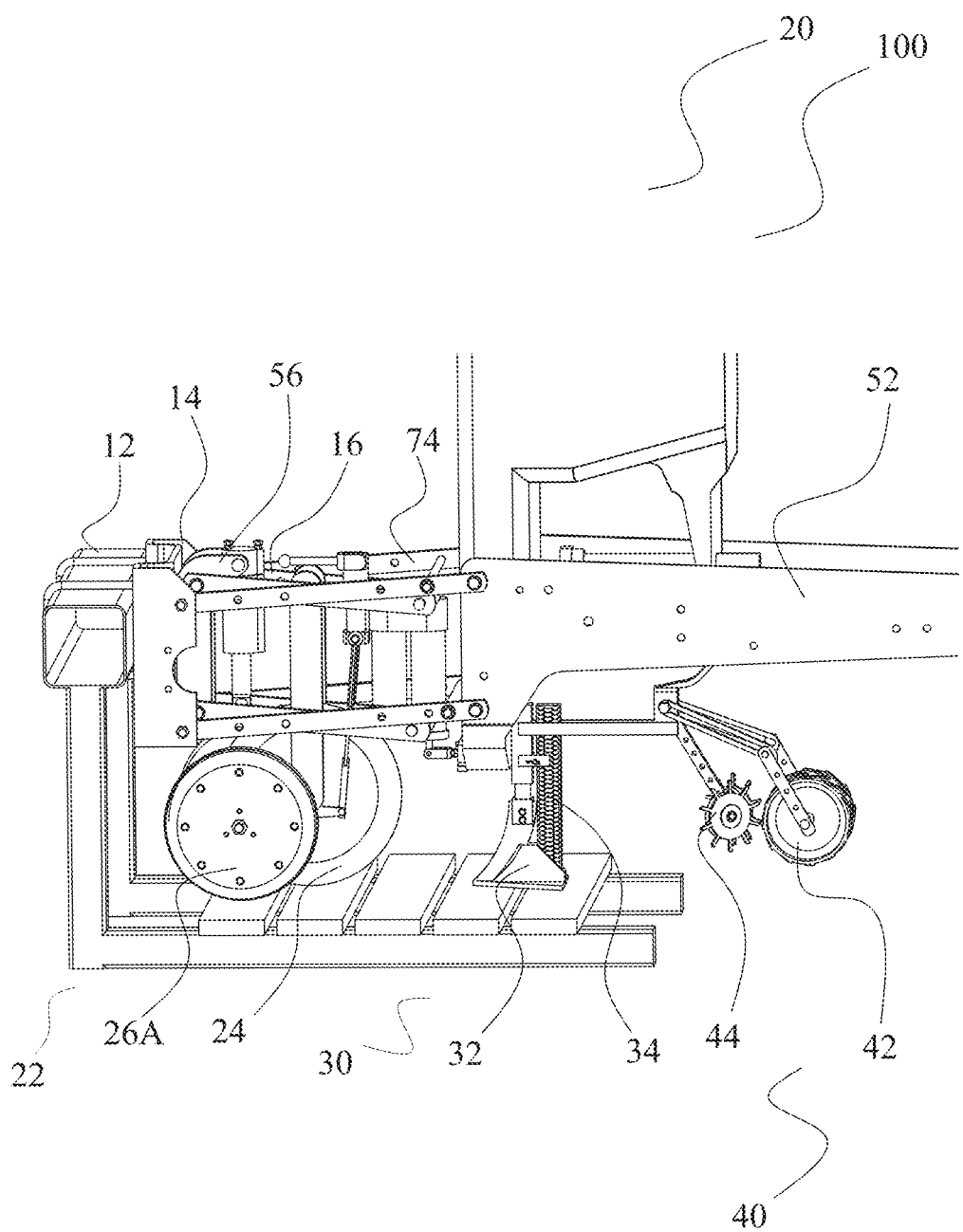
FIG. 21 is a side view of a row unit having two sets of parallel bars, according to one implementation.
Figure 22:
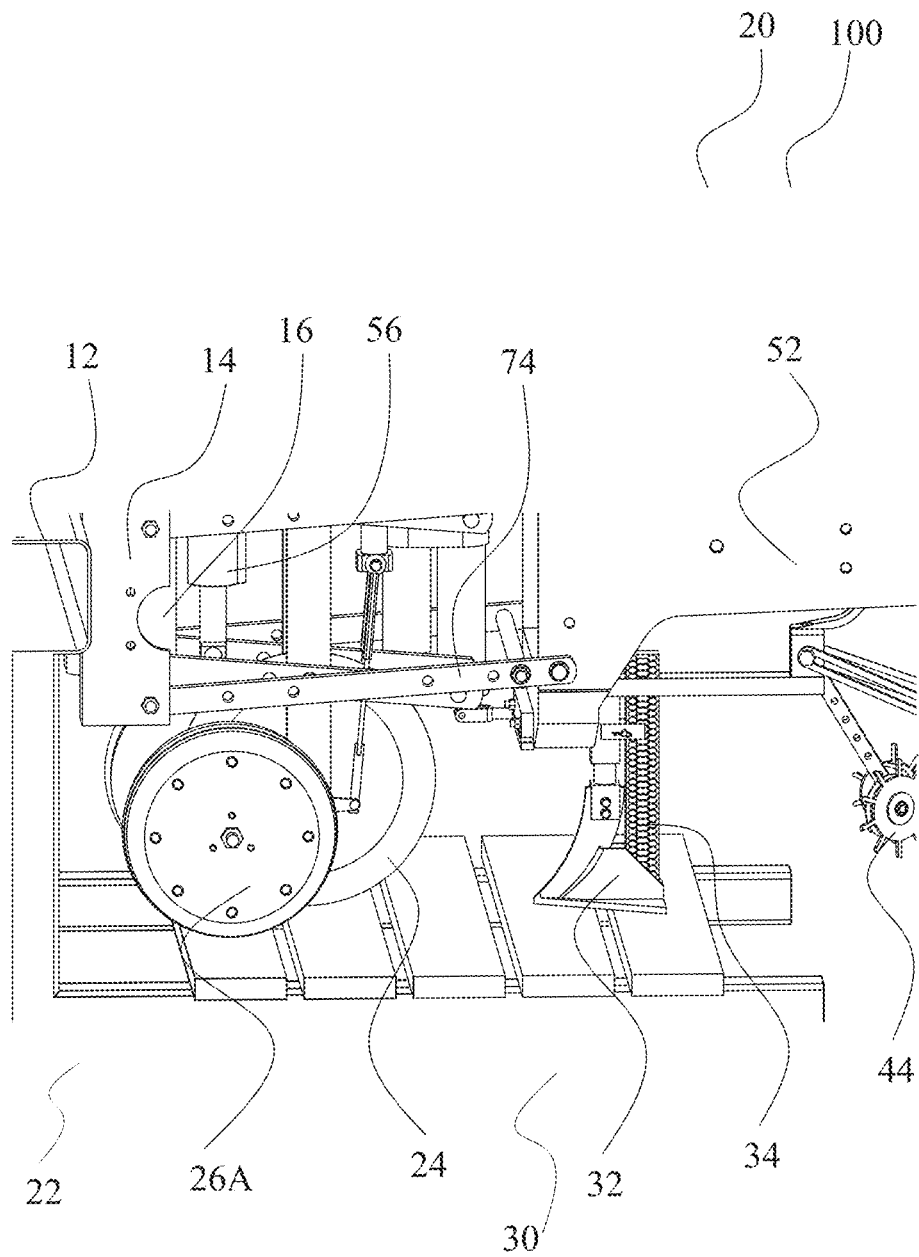
FIG. 22 is a low side view of the row unit of FIG. 21, according to one implementation.
Figure 23:
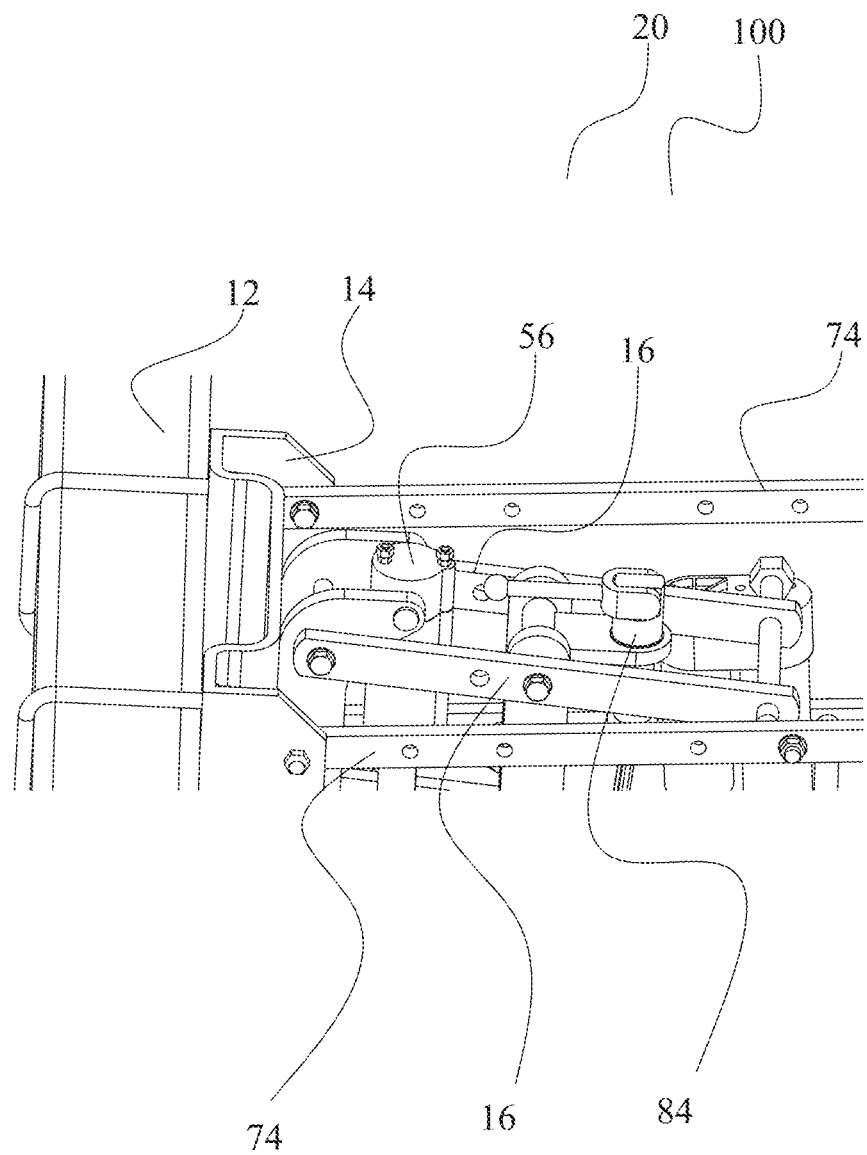
FIG. 23 is a top perspective view of the row unit of FIG. 21, according to one implementation.
Figure 24:
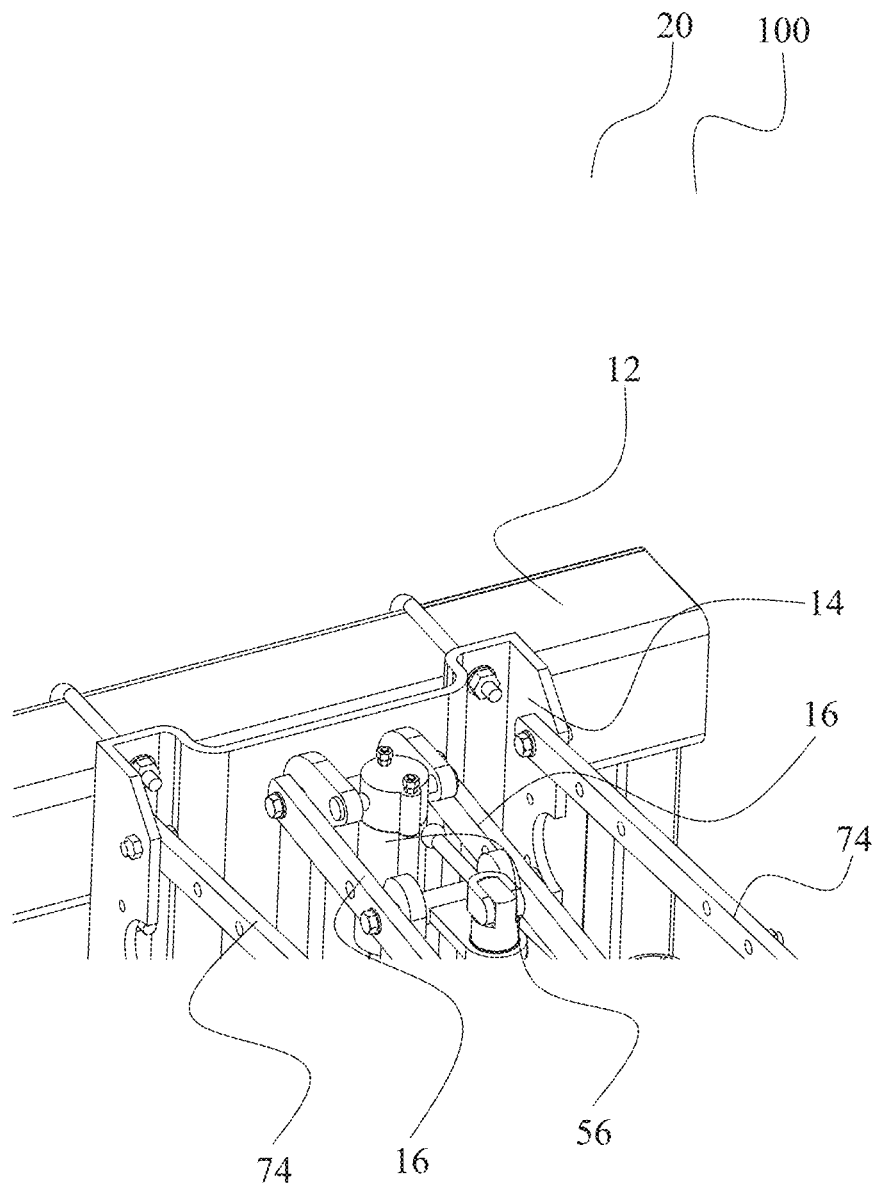
FIG. 24 is a top perspective view of the row unit of FIG. 21, according to one implementation.
Figure 25:
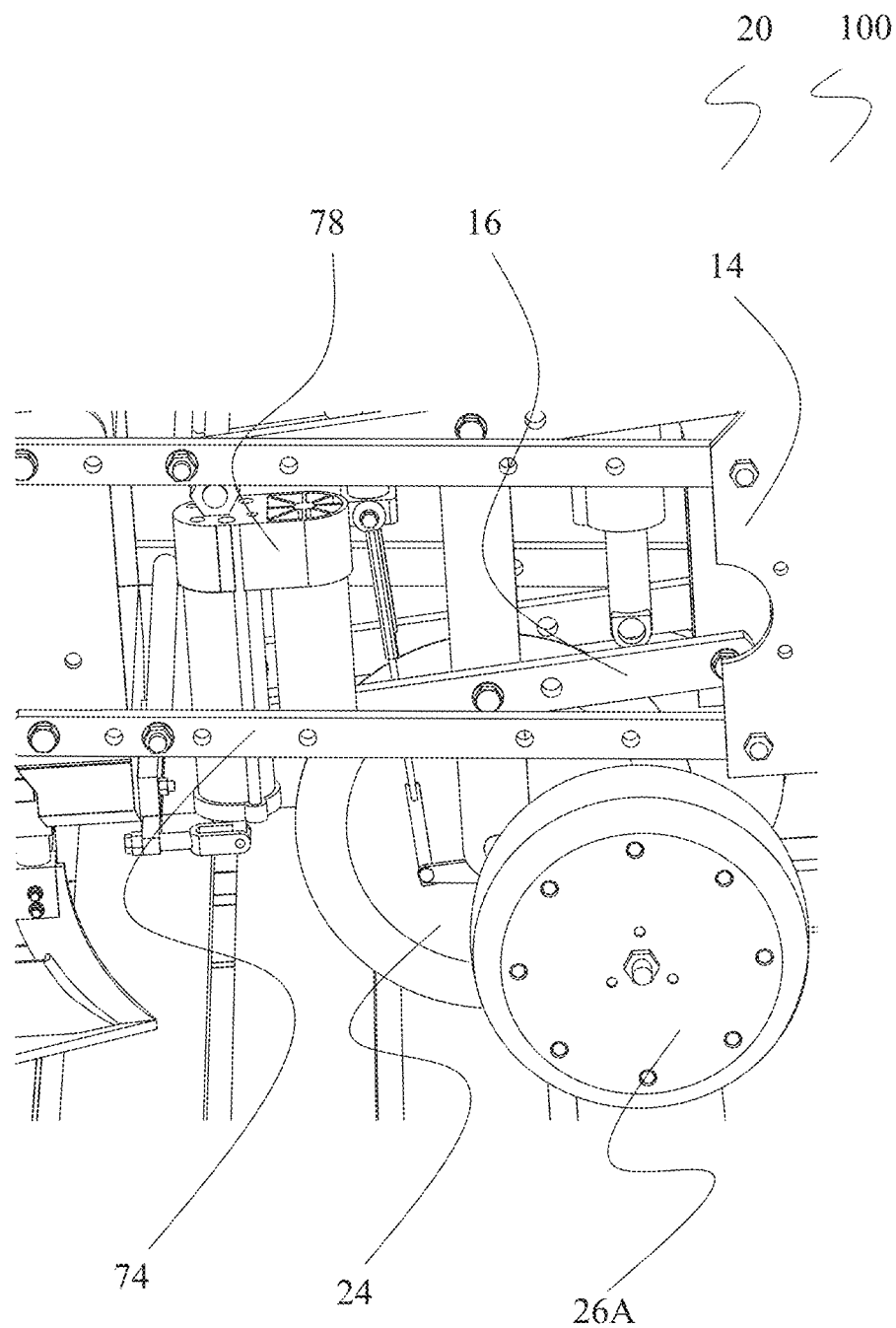
FIG. 25 is a side view of the coulter assembly of the row unit of FIG. 21, according to one implementation.
Figure 26:
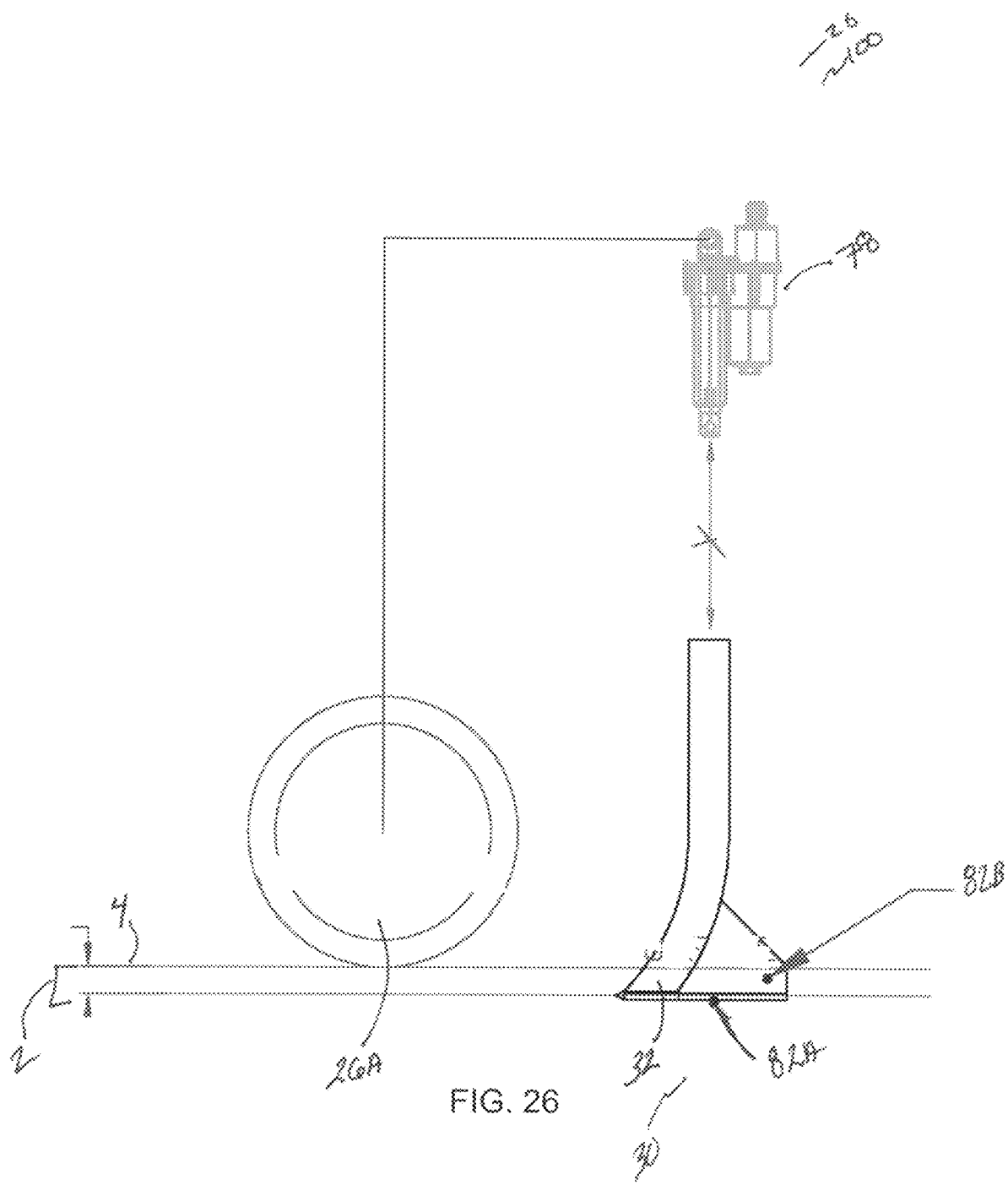
FIG. 26 is a schematic view of a row unit having a linear actuator, according to one implementation.
Figure 27:
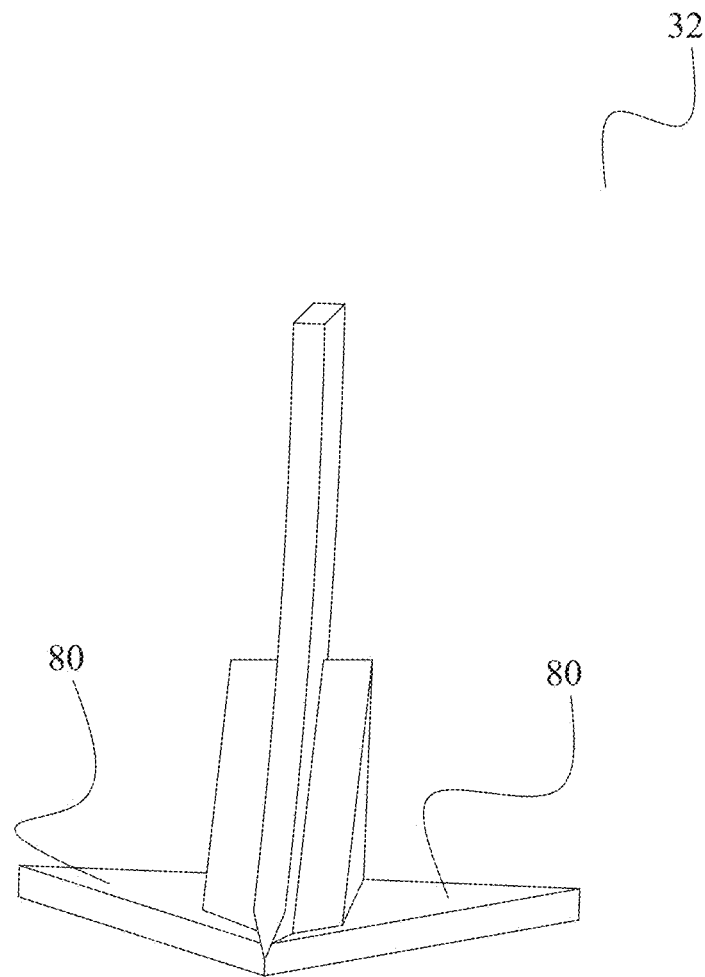
FIG. 27 is a front view of a sweep, according to one implementation.
Figure 28:
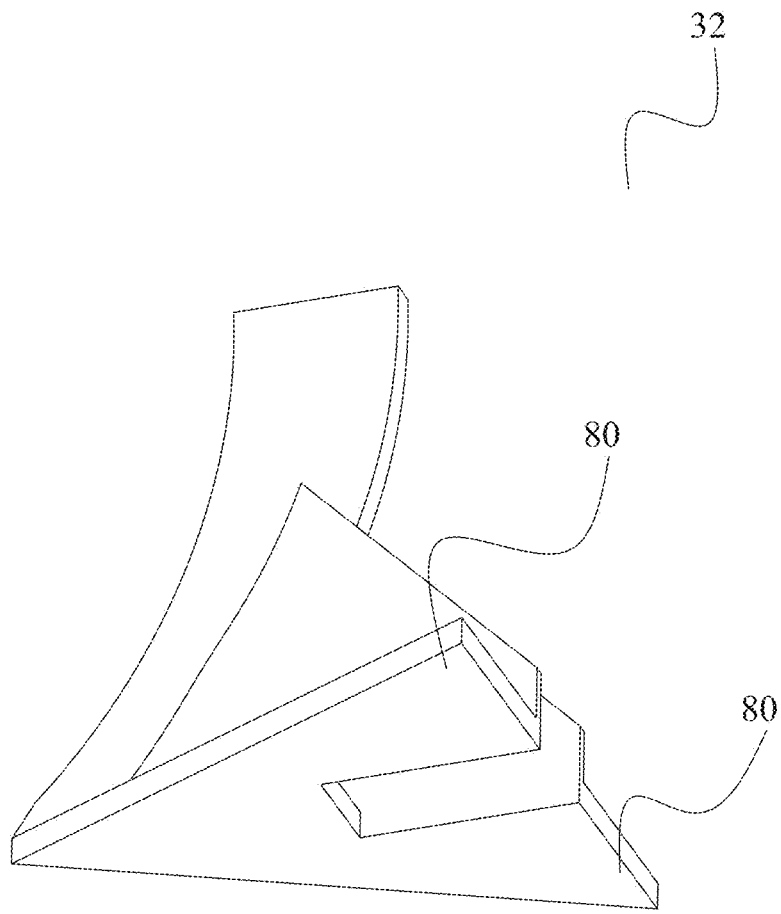
FIG. 28 is a bottom perspective view of a sweep, according to one implementation.
Figure 29:
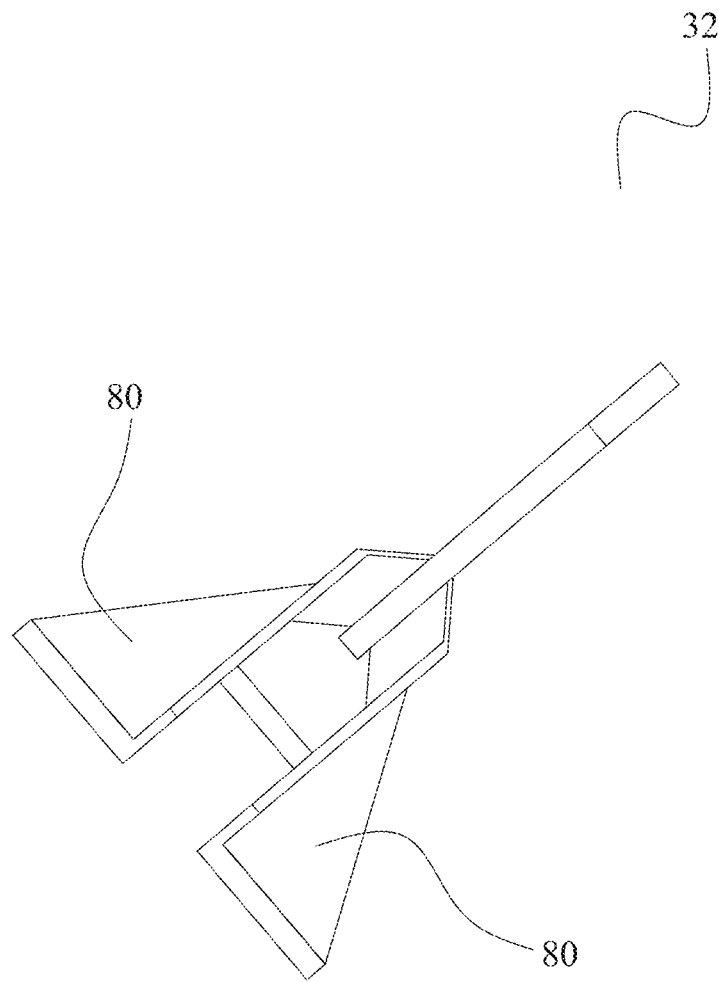
FIG. 29 is a rear perspective view of a sweep, according to one implementation.
Figure 30:
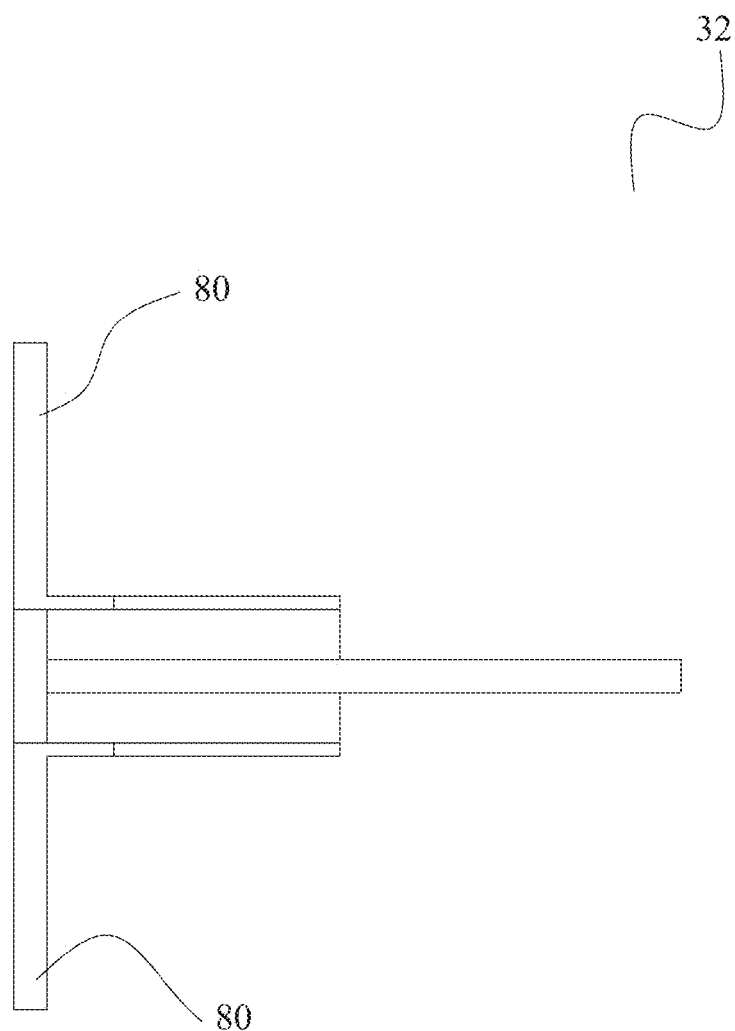
FIG. 30 is a rear view of a sweep, according to one implementation.
Figure 31:
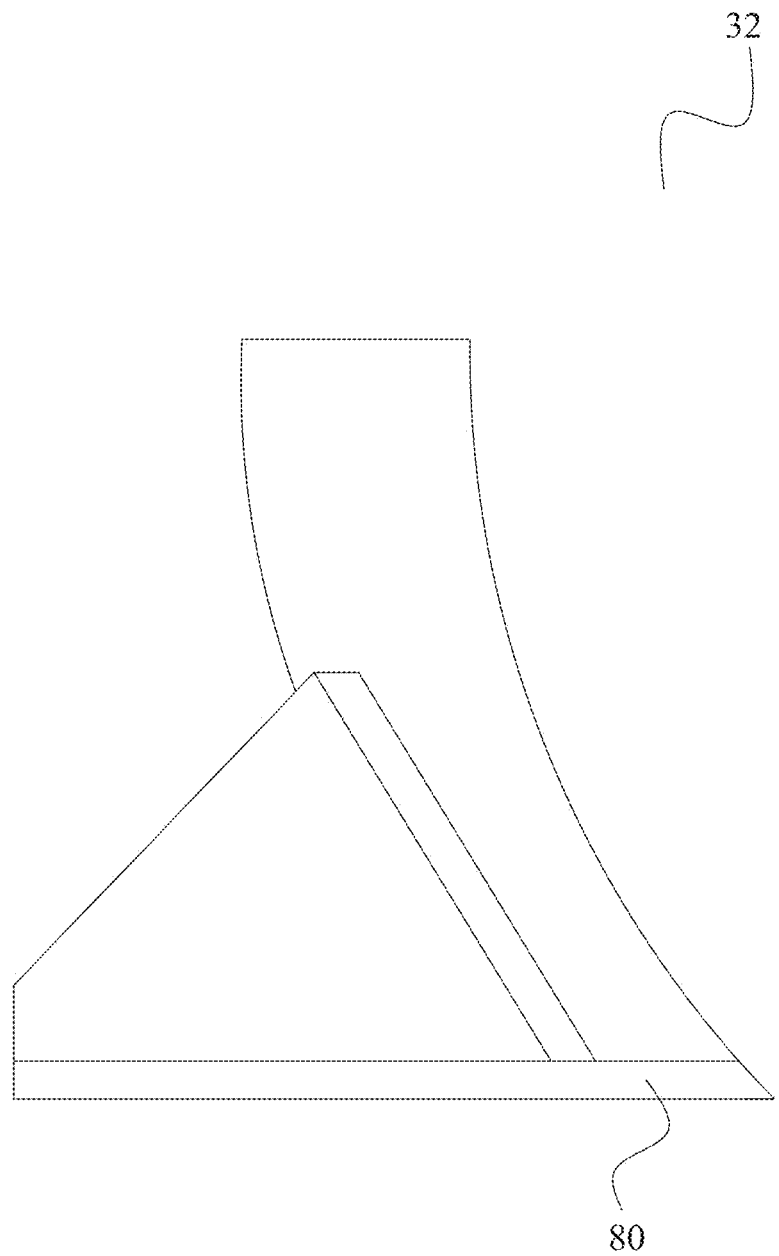
FIG. 31 is a side view of a sweep, according to one implementation.
Figure 32:
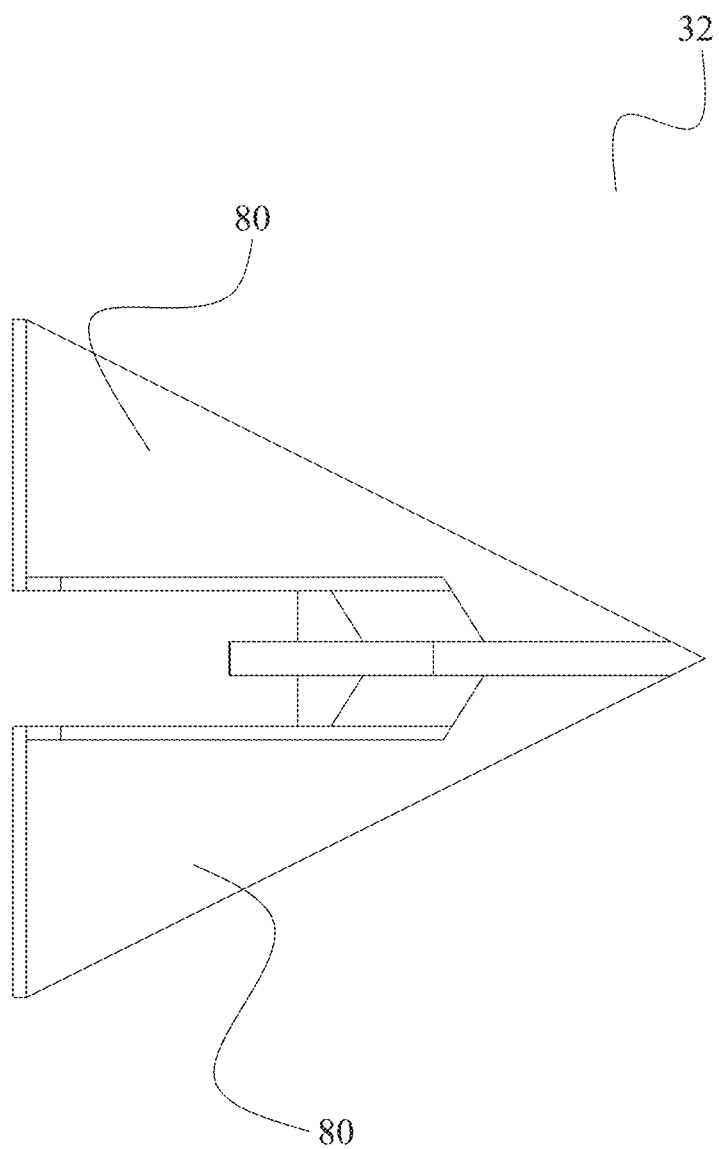
FIG. 32 is a top view of a sweep, according to one implementation.
Figure 33:
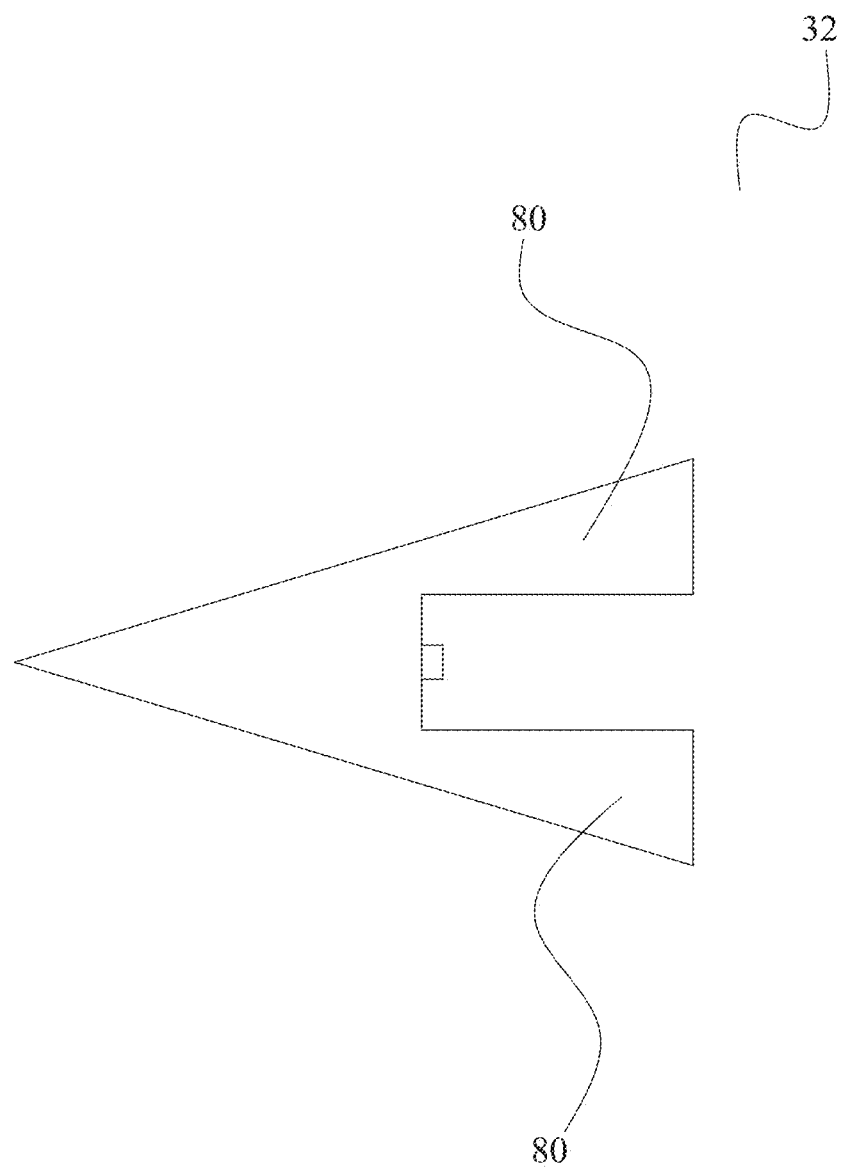
FIG. 33 is a bottom view of a sweep, according to one implementation.
Figure 34:
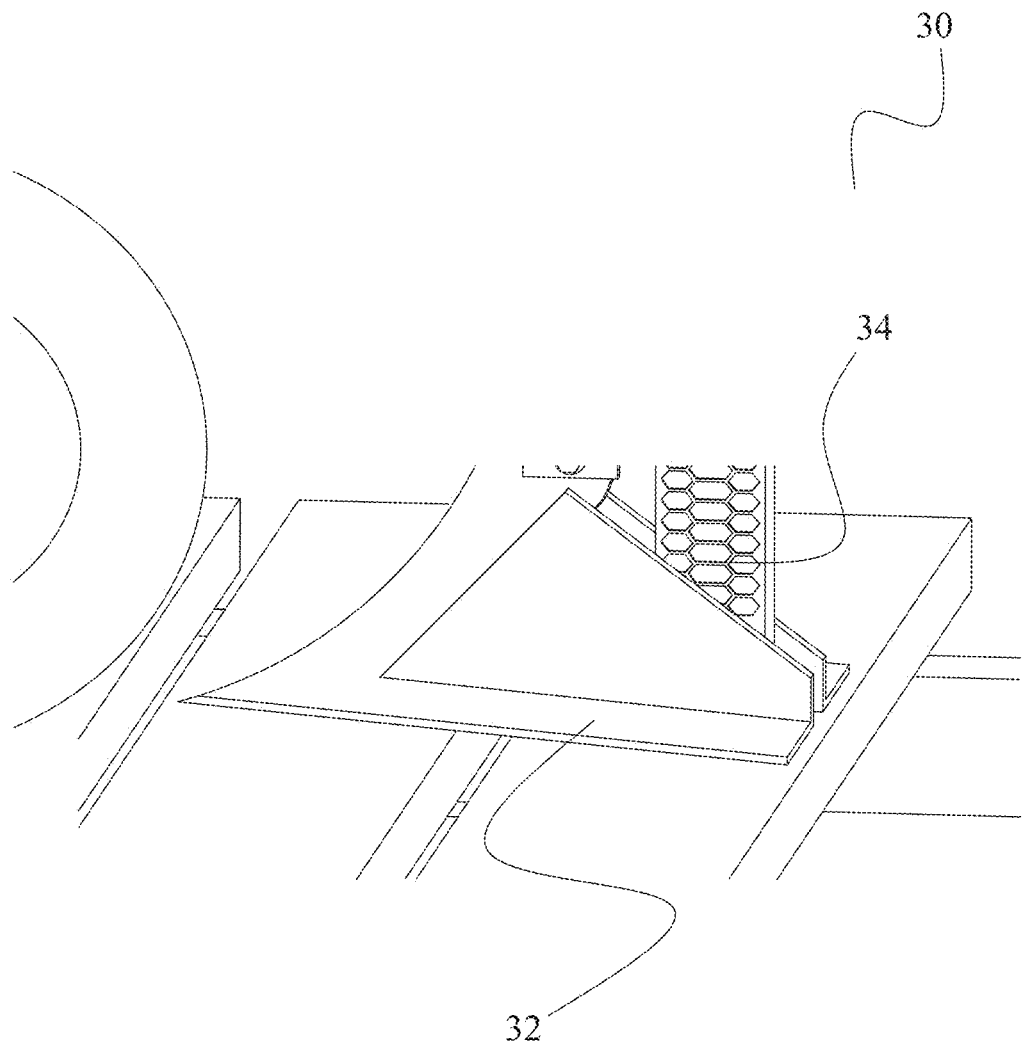
FIG. 34 is a side perspective view of a soil engaging assembly, according to one implementation.

Turning now to FIGS. 19 and 20, a row crop planter row unit 20, in various implementations, has depth control gauge wheels 26A, 26B that are not directly coupled to the soil engaging assembly 30. FIG. 19 shows the coulter assembly 22 attached to the bracket 14 via a first set of parallel arms 16. In this implementation the soil engaging assembly 30/sweep 32 is attached to the bracket 14 or other portion of the frame 52 via a second set of parallel arms 74. The first set of parallel arms 16 allows for movement of the complete row unit 20 relative to the toolbar 12. The second set of parallel arms 74 allows for independent movement of the sweep 32/soil engaging assembly 30 relative to the coulter assembly 22. In these and other implementations, the gauge wheel(s) 26A, 26B establish a soil surface line and the seed channel 2 depth, as described herein.

In the implementation of FIG. 20, the closing assembly 40 is directly attached to the coulter assembly 22, such as by a linkage assembly 76, as would be understood. Forces required to maintain gauge wheel 26A, 26B soil contact and closing pressure would be supplied by the downforce actuator 56 and would not affect the seed channel 2 depth. As the gauge wheels 26A, 26B rise and fall with the terrain, the closing assembly 40 would rise and fall as well to maintain constant gauge wheel 26A, 26B and closing assembly 40 downforce without any effect from the seed channel 2 depth setting or changes in the seed channel depth setting.

Turning now to FIGS. 21-26, that shows various views of a further row unit 20 implementation. In these and other implementations, the position of the gauge wheels 26A, 26B is adjustable to set the operating depth of the coulter 24. The coulter assembly 22 is configured to move vertically to follow the soil contour. In certain implementations, a linear actuator 78, shown in FIGS. 25-26, connects the first parallel arms 16, connected to the coulter assembly 22, to the soil engaging assembly 30 mounting structure, such as frame 52. A second set of parallel arms 74 connect the frame 52 and soil engaging assembly 30 to the toolbar 12/mounting bracket 14. The use of two sets of parallel arms 16, 74 allows for independent control of the depth of the soil engaging assembly 30 and the depth of the coulter 24. In these implementations, the linear actuator 78 is connected to the first parallel arms 16 so the sweep 32 and soil engaging assembly 30 will maintain a planting depth relative to the gauge wheels 26A, 26B.

Turning now to the sweep 32 in further detail, in various implementations, and as shown in FIGS. 27-38, the sweep 32 is configured to penetrate and lift the soil as it passes through the opening created by the forward mounted rolling coulter 24 blade, creating a seed channel 2. In various implementations, the sweep 32 is constructed and arranged such that, for example, width of the sweep 32 moves soil aside far enough to allow seed to be placed directly behind the sweep 32 into the formed seed channel 2 via the seed tube 34. As shown in FIGS. 27-38, certain implementations of the sweep 32 include wings 80 disposed on either side of the sweep 32. In certain implementations, the sweep 32 horizontal wings 80 provide down draft as the implement 10 is drawn forward. In various implementations of the row unit 20 and sweep 32, moist soil from under the surface is lifted up into the seed placement zone/seed channel 2, as opposed to forming a furrow from the top (dry surface) down.

It is appreciated that in use, these horizontal wings 80 have the effect of pulling the sweep 32 into the ground with the sweep 32 maintaining a constant, desired depth. In these implementations, the sweep 32 is therefore configured to create a down draft in the soil that effectively adds to the total downforce on the row unit 20. That is, the down draft and the machine weight add to the total downforce so the row unit 20 can be constructed with less weight and still have effective soil penetration and depth control. It is appreciated that as the speed increases, greater down draft is generated by the sweep 32, according to certain implementations.

The wings 80, according to certain implementations, are configured to prevent field residue and soil from being picked up by the seed delivery belt of the seed tube 34. The wings 80 may also prevent soil flow from wearing on the seed tube 34 and prevent field residue from falling into the seed channel 2 and causing plant emergence issues which may affect overall yield, as would be understood.

Further, the lifting action of a sweep 32 having wings 80 forms a seed channel 2 without compacted sidewalls. That is, under certain conditions such as wet soil, the compressive forces that create a "V" furrow can result in sidewall compaction. It is understood that the young roots of the new plant cannot penetrate the compacted sidewall, instead the plants roots travel lengthwise with the furrow rather than spreading in all directions, which can limit plant growth, and lead to plants that do not stand well as they have a poor base structure. Several prior art devices attempt to break up this sidewall compaction, such as spoked closing wheels. In the disclosed implementations, the sweep 16 is configured to lift the soil, rather than compressing it, so as to allow the loose, lifted soil to fall back on top of the seed.

It would be appreciated that the position and lifting action of the sweep 32 traveling through the soil after the gauge wheels 26A, 26B will disrupt any compaction created by the coulter 24 and gauge wheels 26A, 26B.

Figure 35:
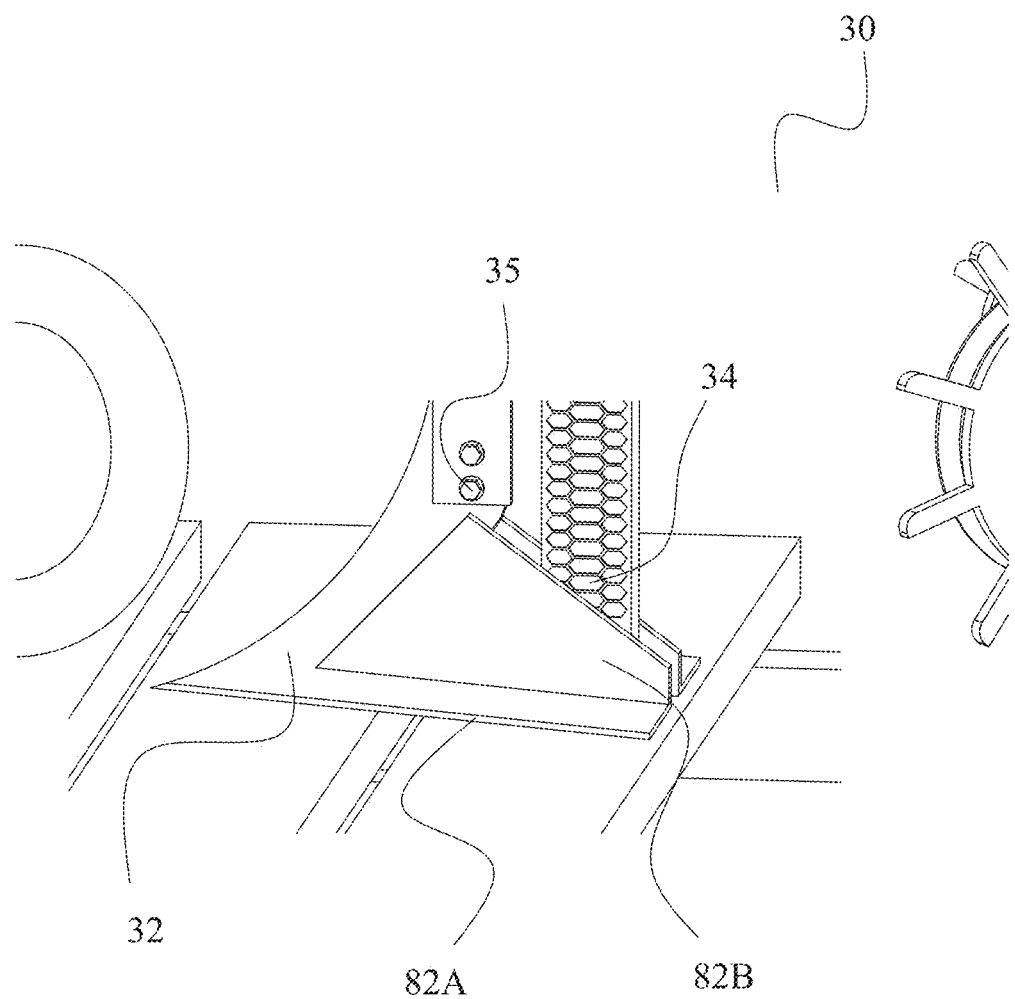
FIG. 35 is a side view of a soil engaging assembly, according to one implementation.
Figure 36:
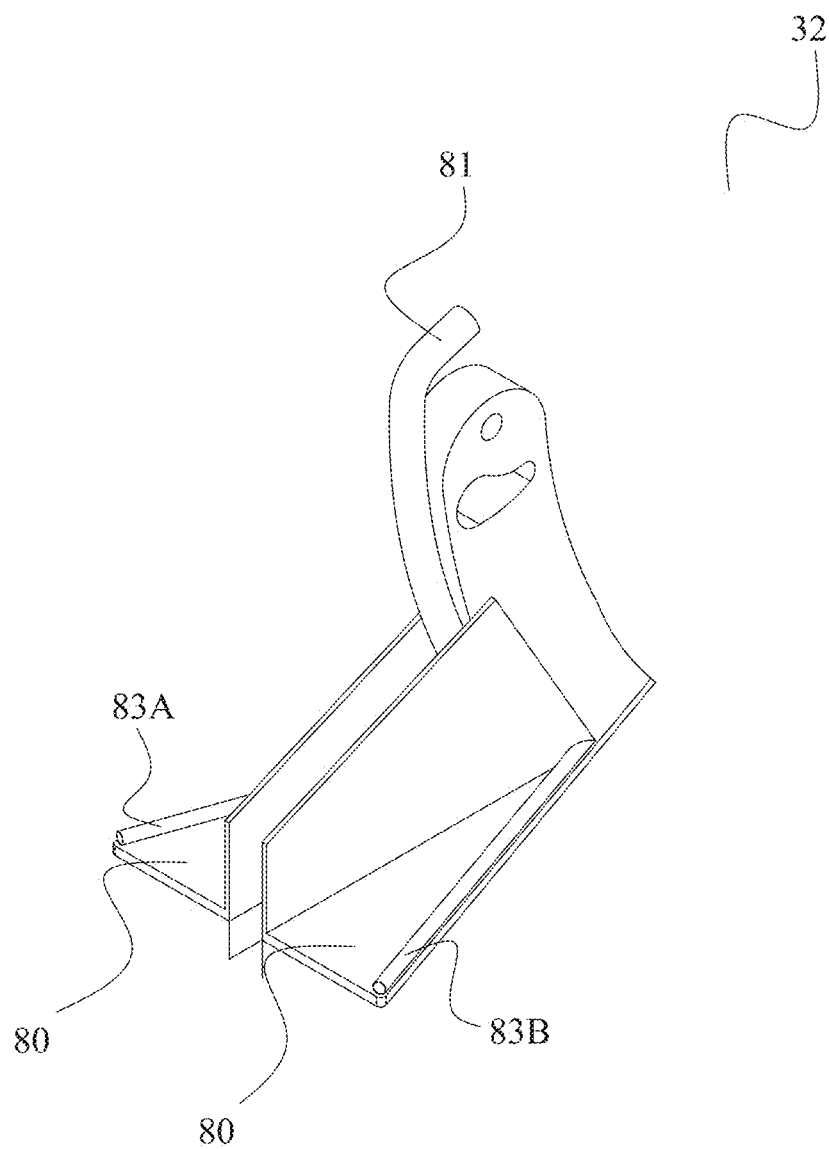
FIG. 36 is a rear perspective view of a sweep with fertilizer applicator, according to one implementation.
Figure 37:
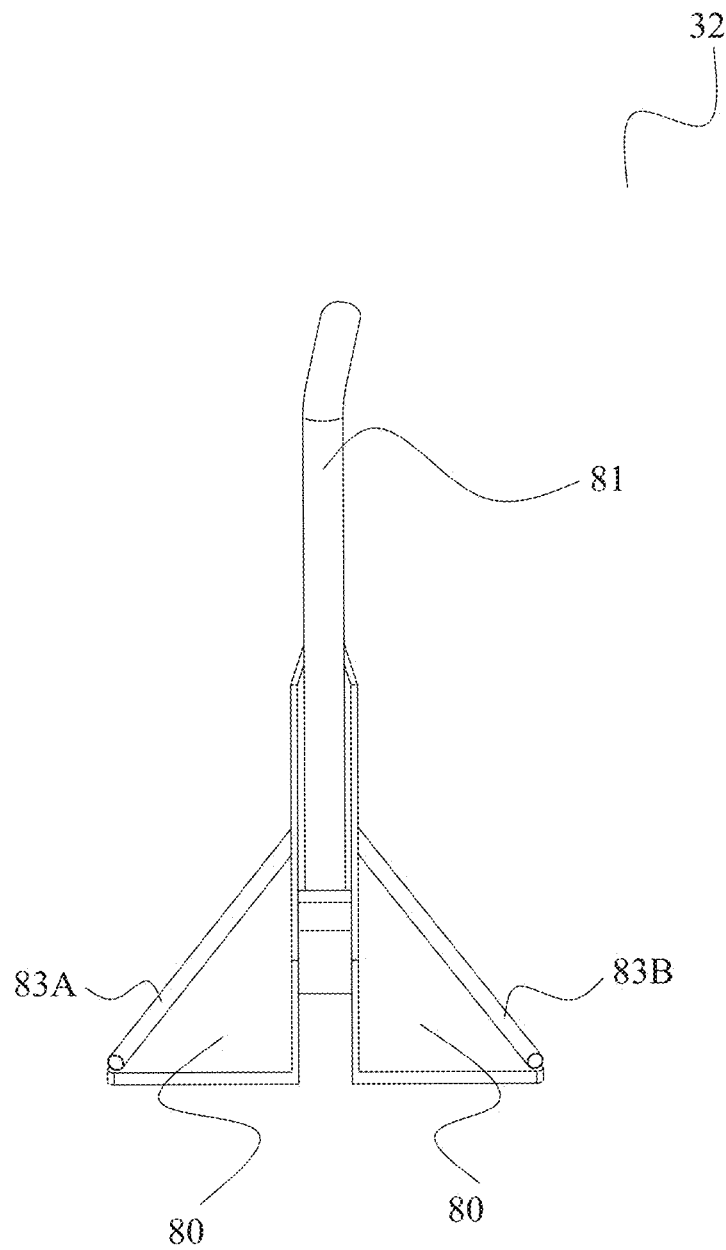
FIG. 37 is a rear view of a sweep with fertilizer applicator, according to one implementation.
Figure 38:
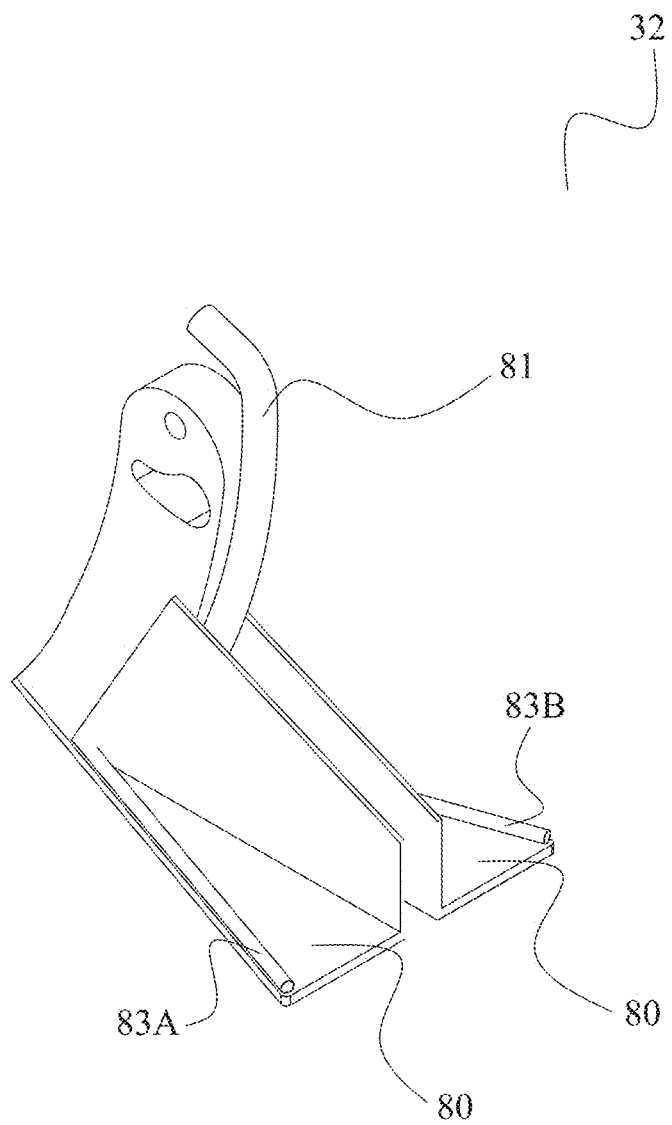
FIG. 38 is a rear perspective view of a sweep with fertilizer applicator, according to one implementation.

In various implementations, the sweep 32 can comprise a breakaway mechanism 35, such as a shear bolt 35 shown in FIG. 35, configured to allow the sweep 32 and the frame 66 to release rearward if it encounters an underground obstacle, such as a rock. In these implementations, the breakaway mechanism may allow for the sweep 32 and/or frame 66 to release upon encountering an obstacle, such as a rock, to prevent or minimize damage to the sweep 32, soil engaging assembly 30, and/or row unit 20.

In various implementations, the sweep 32 and soil engaging assembly 30 may include one or more moisture sensors 82. Shown best in FIG. 35, a moisture sensor 82A may be attached to the bottom horizontal surface of the sweep 32 and be configured to sense soil moisture. A further moisture sensor 82B may be attached to the upper surface of the sweep 32. In these implementations, the control system 100 may be further configured to vary seed planting depth to ensure that seeds are planted in adequate but not excess moisture, as will be discussed further herein.

In various implementations, the moistures sensors 82A, 82B are configured to measure and monitor soil moisture on-the-go such that the system 100 may dynamically adjust planting depth to ensure seeds are planting in adequate moisture.

In a further implementation, the sweep 32 and soil engaging assembly 30 may be configured to place liquid fertilizer alongside a seed, on one or both sides or on top of undisturbed soil as the sweep 32 passes through the soil. Shown variously in FIGS. 36-38, the sweep 32 may optionally include a fertilizer input tube 81 in communication with a liquid fertilizer pump. In various implementations, the fertilizer input tube 81 includes a tee at the base of the sweep 32 connecting the input tube 81 to the side discharges 83A, 83B. In these and other implementations, the side discharges 83A, 83B are located along the wings 80 for discharging liquid fertilizer to the side of the planted row. In certain implementations, only one side discharge 83A, 83B is included, or operated.

Figure 39:
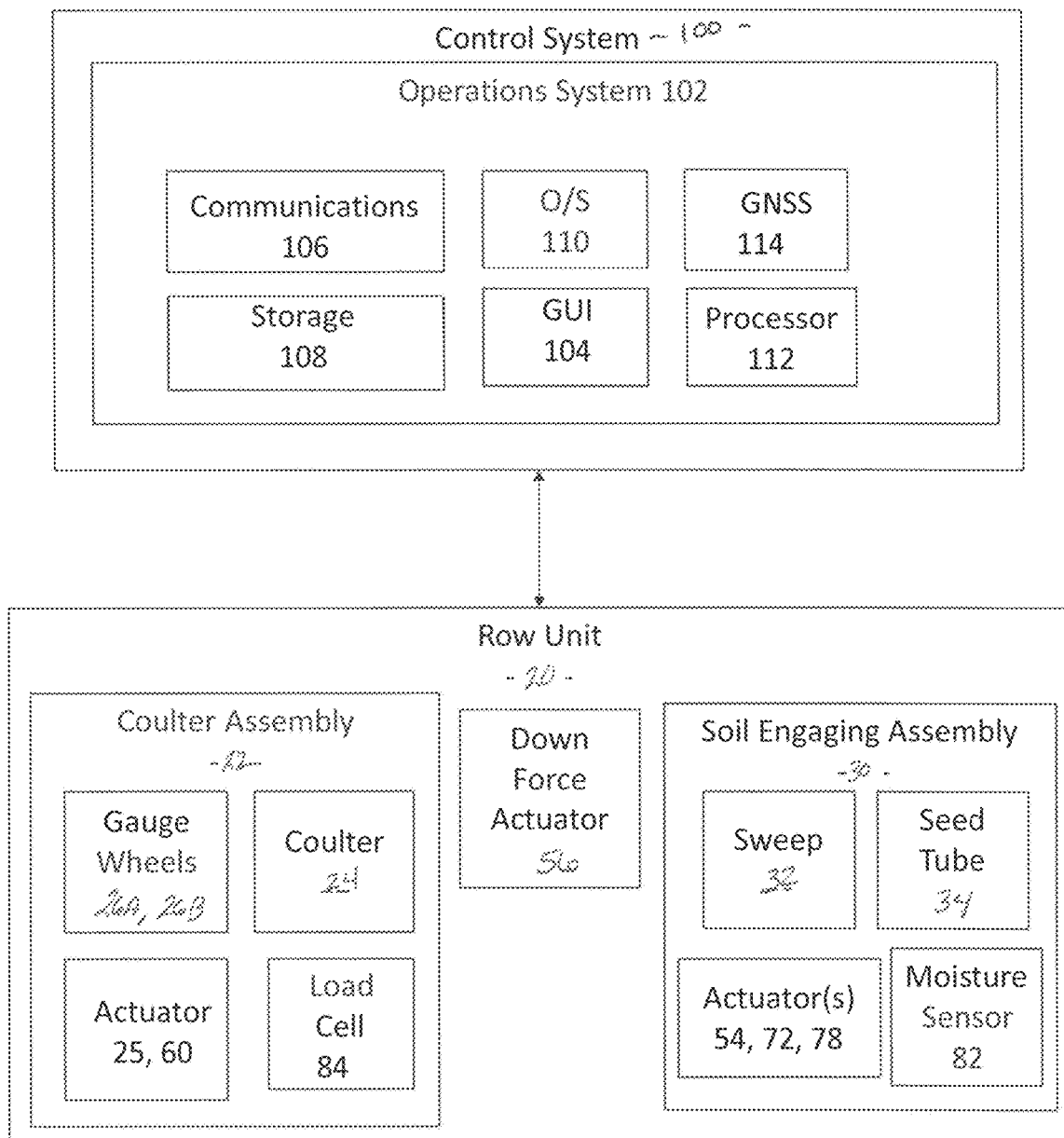
FIG. 39 is a schematic diagram of a control system, according to one implementation.

Turning now to FIG. 39, in some implementations, the system 100 provides an operations system 102 optionally comprising a variety of components necessary to accomplish the functions described herein. For example, in certain implementations the operations system comprises an on-board computer, such as the InCommand® display from Ag Leader®. In alternative implementations, the operations system 102 may optionally be disposed on a cloud-based system, and/or comprise both local/display based components, as well as cloud based components, as would be understood.

The control system 100/operations system 102 may optionally include a graphical user interface ("GUI") 104, and optionally a graphics processing unit ("GPU") in various implementations. In these and other implementations, the GUI 104 and/or GPU allows for the display of information to a user and optionally for a user to interact with the displayed information, as would be readily appreciated. It would be understood that various input methods are possible for user interaction including but not limited to a touch screen, various buttons, a keyboard, or the like, as would be readily appreciated.

Further implementations of the operations system 102 include a communications component 106. The communications component 106 may be configured for sending and/or receiving communications to and from one or more of vehicles 6, the various sensors 58, 68, 70, 82, the cloud system, the various actuators 25, 54, 56, 60, 72, 78, or any other system 100 components, as would be appreciated. That is, the communications component 106 may comprise one or more of wireless or wired connections to a variety of such components, as would be appreciated.

The operations system 102, in various implementations, may also include storage 108, an operating system 110, a processor 112, a GNSS unit 114 and various other electronic, hardware, and/or software components necessary to effectuate the various processes and methods described herein.

Turning now to the row unit 20 in use, in various implementations, the coulter 24, sweep 32, seed tube 34, meter 36, and hopper assembly are all adjustable as a unit on-the-go relative to the gauge wheels 26A, 26B. This on-the-go functionality ensures that the accuracy of the metering and seed placement are maintained. In such implementations, changing the planting depth does not affect the place of ejection of seed relative to the sweep 32, as would be appreciated. That is, while the sweep 32 and seed tube 34 and other components can move in tandem in response to on-the-go commands to adjust the planting depth in response to feedback provided to the system 100. It is understood that various inputs such as soil moisture and other factors can indicate that an increase or decrease in planting depth is desirable, and "up" or "down" adjustment of the planting depth via the sweep 32 assembly can be adjusted accordingly.

As would be understood, in various implementations, the coulter 24, sweep 32, seed tube 34, meter 36, and hopper assembly can be raised as a unit to prevent disturbance when entering a previously planted area based on GPS mapping, or other guidance as would be understood. In various implementations, the coulter 24 and sweep 32 can be pulled out of the ground if conditions allow it or at previously mapped area boundaries. In various implementations, the planting depth control actuator 54 can be used to lift the sweep 32 out of the soil at mapped boundaries, buried obstructions and the like, according to certain implementations.

In certain implementations, the coulter 24 could be used to sense buried obstructions, such as rocks, and that information could be used to raise the sweep 32 out of the ground to prevent damage to the sweep 32 and/or row unit 20. Subsurface obstructions could also be mapped for future reference utilizing technologies previously described.

In various implementations, the row unit 20 and control system 100 are configured to monitor and actively or passively adjust planting depth, optionally on-the-go. Certain implementations the of the row unit 20 and control system 100 execute a variable depth planting system for adjusting planting depth on-the-go. In these implementations, the row unit 20 and control system 100 can plant seed at the optimal depth and optionally in optimal moisture even as conditions change across a field.

In various implementations, the user inputted value for the seed channel 2 depth is entered into a control system 100 and the row unit 20 including the various sensors and actuators, described variously herein, maintain the depth of the seed channel 2 relative to the soil surface. In certain implementations, the seed channel 2 depth value is automatically generated, as would be appreciated. The coulter 24 and sweep 32, according to certain implementations, have separate electronic depth control configured to allow seed placement depth to track with the soil surface maintaining constant seed depth for consistent emergence or variable depth placement to track with moisture. Moisture sensing can be done at the coulter 24 blade location, in addition to or instead of at optional moisture sensors 82A, 82B on the wings 80 of the sweep 32 so that planting depth can be adjusted to soil moisture conditions, as will be discussed further below.

Gauge wheel 26A, 26B position and movement along with row unit 20 parallel arm 16 rotation and attitude of the implement and towing tractor are examples of the types of information used to set the sweep 32 depth, in certain implementations. In various implementations, the gauge wheels 26A, 26B track the ground elevation changes and make slight changes to the sweep 16 depth via the described components and control systems.

In use according to certain implementations, automated depth control can be changed while planting—on-the-go. Such implementations include a load cell (shown in FIG. 23 at 84) configured to monitor gauge wheel 26A, 26B load thereby ensuring that the coulter 24 is fully penetrating to the set depth. In this embodiment, the coulter 24, sweep 32, seed tube 34, meter 36 are adjusted relative to the toolbar 12, rather than based on the position of the gauge wheels 26A, 26B as is done on most known row crop planters. The movement of the coulter 24 is performed such that the optimum penetration point relative to the ground contact point of the gauge wheels 26A, 26B is maintained. This will also ensure that the range of travel for the equalizing gauge wheels 26A, 26B is not affected by the planting depth.

In certain implementations, the coulter blade 24 depth is gauged mechanically by the gauge wheels 26A, 26B but the depth the coulter blade 24 operates at is determined by the offset value to determine the planting depth. That is, according to various implementations, the coulter 24 operating depth is determined by a setting entered by the operator or automatically in response to a sensor setting, such as a moisture sensor (shown for example at 82A, 82B in FIG. 35). Movement to maintain the operating depth of the coulter 24 in such implementations is determined by the gauge wheels 26A, 26B that operate directly alongside the coulter 24.

Certain implementations of the row unit 20 feature mechanical depth control. In such implementations, the operating depth of the coulter 24 is set to operate at the maximum planting depth. That is, in these implementations the coulter assembly 22 operating depth is not adjustable on-the-go. In these implementations, immediate elevation changes determined by the gauge wheels 26A, 26B also affect the coulter assembly 22 operating position.

In various active control implementations, the sweep 32 depth and therefore the planting depth is not directly tied to the gauge wheels 26A, 26B, as is the case on conventional row units. In these implementations, the gauge wheels 26A, 26B roll over the soil surface 4 causing the row unit 20 parallel arms 16 to move up and down at the trailing end relative to the leading end. A sensor, such as a rotational sensor (shown at 68 in FIG. 2), that is attached to at least one parallel arm 16 and measures the movement of the parallel arms 16 and creates a profile line—a 2D soil contour profile for that row.

In various implementations, this contour line can be used by the control system 100 to control the depth of the sweep 32 as an offset value. In such implementations, if the gauge wheels 26A, 26B roll over a rise in the soil contour, the sweep 32 does not immediately rise with the gauge wheels 26A, 26B. Instead, the depth control system 100 causes the sweep 32 to stay at the correct depth based on the generated contour line and/or sensed soil moisture. Changing the offset either by manual operator control or by an automated means will change the planting depth but continue to follow the contour line. For example, the depth control system 100 may include one or more soil moisture sensors (shown for example at 82 in FIG. 35) configured to provide feedback to the system 100 regarding soil moisture at the current planting depth such that appropriate adjustment can be made if needed, as will be discussed in more detail below.

Certain implementations of the row unit 20 and control system 100 are configured to operate without regard to parallel arm 16 position. That is, it is understood that under current practice, row crop planter components are typically designed to work at a nominal toolbar height, such as about 20" from the ground to the bottom of the toolbar, at a nominal planting depth, such as about 1½".

At these nominal settings, the parallel arms 16 are essentially horizontal, such that the draft forces are normal to the direction of travel. However, if the toolbar 12 height changes to something larger, for example 23", such a change has the effect of lifting the forward end of the row unit 20 parallel arms 16 relative to the rear ends such that the draft forces change. The effect of such a change is that the rear end of the parallel arms 16 will be urged upward or otherwise lift, thereby causing the row unit 20 to ride out of the ground, as would be appreciated. Such a lift effectively mitigates the available downforce and is not as efficient. In certain circumstances, lift also can reduce the ability of the row unit 20 to follow the ground contour, as would likewise be understood. Further, a similar effect occurs when a typical row unit planting depth changes. In effect, many factors can affect the proper position of the parallel arms 16.

In various of the disclosed implementations of the row unit 20, however, the parallel arm 16 operating position is affected only by the position of the gauge wheels 26A, 26B relative to the toolbar 12. That is, if the toolbar height is set to about 23", the gauge wheels 26A, 26B can be adjusted to compensate for the difference, and ensure that the parallel arms 16 remain parallel to the soil surface 4, while the other components such as the coulter 24 and sweep 32 maintain proper depth. As such, planting depth changes may not have an effect on the position of the parallel arms 16, and thereby overcome the above-described problems in the prior art.

In addition to the row unit gauge wheels 26A, 26B, the relative position of the implement toolbar 12 to the soil surface can be used as an input to accurately maintain planting depth. In one such implementation, the depth control system 100 monitoring the parallel arm 16 sensors 68 can be configured to determine if a pattern exists in adjacent row units 20 that would be caused by toolbar 12 movement and adjust the depth control accordingly. For example, in use according to certain implementations, the toolbar 12 may rise due to a rise of a toolbar gauge wheel (shown in FIG. 1 at 18), such as in response to a berm. In another example, the toolbar gauge wheels 18 could run up on a rise or into a valley causing the relative position of the row unit parallel arms 16 to change without any change in the soil surface at the location of the row unit 20. These conditions detected by such toolbar gauge wheels 18 can be used as an input in the control system 100.

Accordingly, all of the row units 20 along the length of the toolbar 12 would begin running with their parallel arms 16 in a down position, meaning that the ends of the parallel arms 16 opposite the toolbar 12 are lower than the toolbar 12. In such an example, the control system 100 is configured to identify the various positions of the arms 16 and recognize the pattern created in the parallel arm 16 sensors 68 in adjacent rows and/or inertia sensors (shown at 70 in FIG. 1) on the toolbar 12 via logic, and to correspondingly interpret the terrain pattern so as to maintain proper planting depth. It is understood that conditions that cause adjacent rows to move in a pattern are interpreted differently than conditions that affect individual rows, according to certain implementations.

Figure 40:
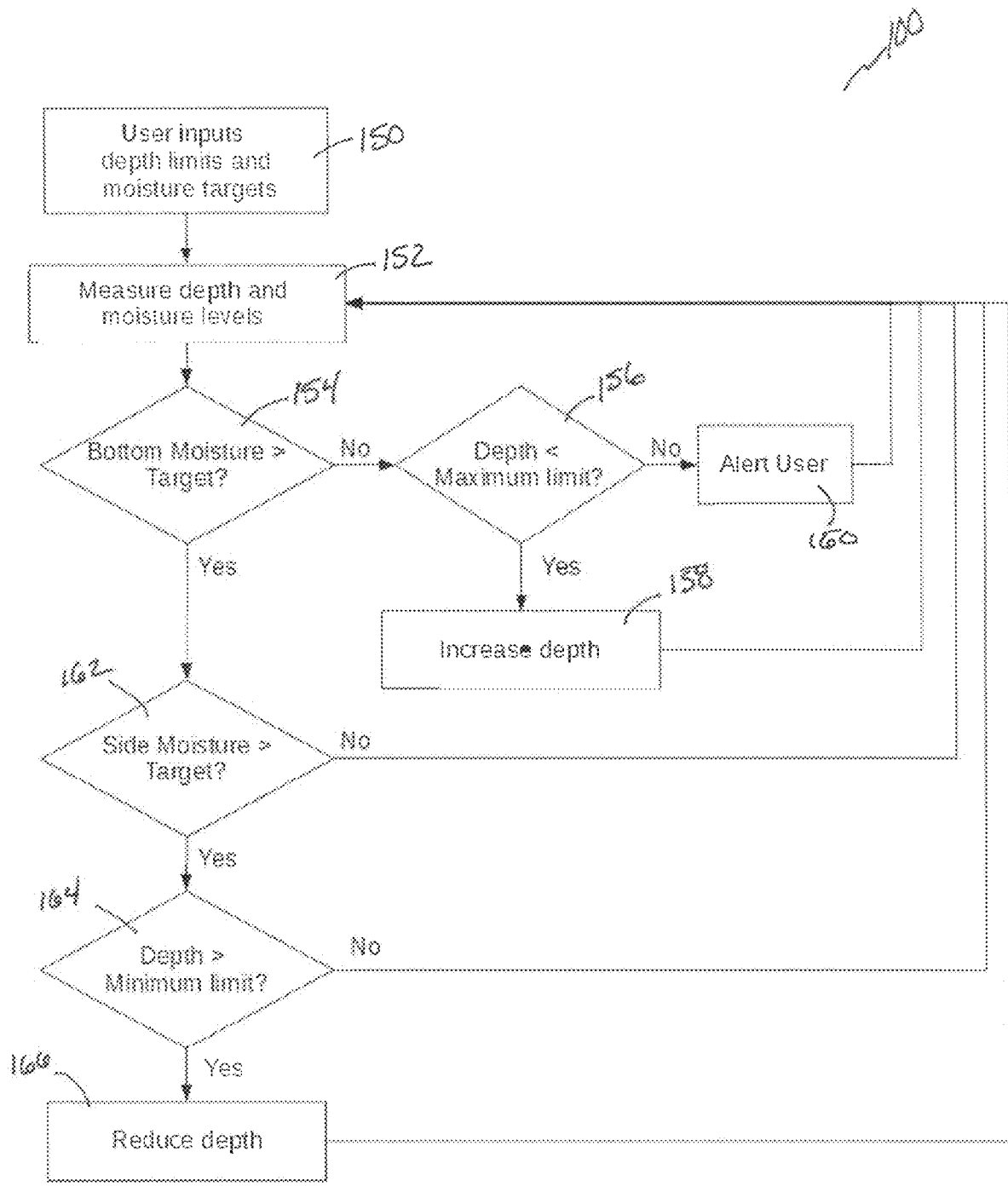
FIG. 40 is a flow diagram of a control system executing variable depth control, according to one implementation.

FIG. 40 shows an exemplary flow diagram for a control system 100. In an optional step, both desired soil moisture and seed depth are entered by a user (box 150). Alternatively, soil moisture and seed depth values/ranges may be set by the system 100, or determined by machine learning or artificial intelligence techniques, such as by analyzing prior year planting and harvest data, as would be appreciated.

During planting operations, the moisture sensors 82A, 82B measure moisture levels while the row unit 20 optionally also monitors planting depth (box 152). The system 100 may then compare the detected soil moisture detected by the bottom soil moisture sensor 82A to the target soil moisture (box 154) via onboard logic to issue commands to adjust or maintain planting depth.

For example, if the bottom moisture sensor 82A detects inadequate moisture in the soil below the sweep 32 (that is below a defined target moisture value or range), and the depth of the sweep 32 is not greater than the maximum depth (box 156), the system 100 may cause the sweep 32 and/or soil engaging assembly 30 to be lowered via the issuance of a command, thereby increasing planting depth relative to the gauge wheels 26A, 26B (box 158) until sufficient moisture is sensed. Conversely, if the system 100 detects that there is inadequate moisture at the maximum depth setting, the system 100 may be configured to warn the operator of such conditions (box 160), such that, for example, the operator may decide to continue or pause planting until conditions improve.

The system 100 is further configured to compare the soil moisture detected by the upper moisture sensor 82B to the target moisture (box 162). If the upper moisture sensor 82B detects sufficient/excess moisture, and this measurement approximately matches the moistures sensed by the bottom moisture sensor 82A, and the depth of the sweep 32 is greater than the minimum planting depth (box 164) then the system 100 may cause the sweep 32/soil engaging assembly 30 to be lifted, thereby decreasing planting depth (box 166) relative to the gauge wheels 26A, 26B until the desired soil moisture (range or value) and seed depth is achieved.

Monitoring of soil moisture and depth and comparison to target ranges may be done on-the-go such that row unit 20 setting may be dynamically adjusted to maximize potential yields. In these implementations, the steps of boxes 150-166 may be done iteratively. It would be further appreciated that the steps may be performed in any order or not at all.

Although the disclosure has been described with references to various embodiments, persons skilled in the art will recognized that changes may be made in form and detail without departing from the spirit and scope of this disclosure.

What is claimed is:

1. A planter row unit comprising:
   (a) a coulter assembly comprising a coulter blade and at least one gauge wheel, the coulter assembly disposed on a toolbar via a first set of parallel bars;
   (b) a soil engaging assembly comprising a sweep configured to create a seed channel, the soil engaging assembly in communication with the toolbar via a second set of parallel bars; and
   (c) a downforce actuator in communication with the coulter assembly configured to apply downforce to the coulter,
   wherein a depth of the coulter is independently controllable from a depth of the sweep.

2. The planter row unit of claim 1, wherein the sweep comprises horizontal wings and wherein the sweep is configured to generate down draft on the planter row unit when creating the seed channel.

3. The planter row unit of claim 1, further comprising a first moisture sensor disposed on the sweep configured to measure soil moisture at a bottom of the seed channel.

4. The planter row unit of claim 3, further comprising a second moisture sensor disposed on the sweep configured to measure soil moisture at a side of the seed channel.

5. The planter row unit of claim 4, wherein the measured soil moisture from the first moisture sensor and the second moisture sensor are compared to a target soil moisture range.

6. The planter row unit of claim 1, further comprising a linear actuator in communication with the first set of parallel bars and the soil engaging assembly.

7. The planter row unit of claim 1, wherein the seed channel does not expose an open furrow.

8. An agricultural planter comprising a plurality of row units, each of the plurality of row units disposed on a toolbar, comprising:
   (a) a coulter;
   (b) a sweep;
   (c) a downforce actuator in communication with the coulter; and
   (d) a depth control actuator in communication with the sweep,
   wherein actuation of the downforce actuator adjusts the depth of the coulter and actuation of the depth control actuator adjusts the depth of the sweep, and wherein the depth of the sweep is independently controlled from the depth of the coulter.

9. The agricultural planter of claim 8, further comprising a first set of parallel bars and a second set of parallel bars, wherein the first set of parallel bars attach the coulter to the toolbar and wherein the second set of parallel bars attach the sweep to the toolbar.

10. The agricultural planter of claim 8, further comprising one or more toolbar gauge wheels in communication with the toolbar.

11. The agricultural planter of claim 8, further comprising one or more inertia sensors disposed on the toolbar.

12. The agricultural planter of claim 9, further comprising a linear actuator connected to the first set of parallel bars and the sweep.

13. The agricultural planter of claim 12, wherein the linear actuator maintains a sweep depth relative to one or more gauge wheels in communication with the first set of parallel bars.

* * * * *